(12) United States Patent
Edwards et al.

(10) Patent No.: US 12,613,608 B2
(45) Date of Patent: Apr. 28, 2026

(54) USER INTERFACES FOR MANAGING INPUT MODES

(71) Applicant: Apple Inc., Cupertino, CA (US)

(72) Inventors: Dylan R. Edwards, San Jose, CA (US); Robert W. Hanley, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/643,954

(22) Filed: Apr. 23, 2024

(65) Prior Publication Data

US 2024/0361875 A1     Oct. 31, 2024

Related U.S. Application Data

(60) Provisional application No. 63/462,486, filed on Apr. 27, 2023.

(51) Int. Cl.
| | |
|---|---|
| *G06F 3/0481* | (2022.01) |
| *G06F 3/0484* | (2022.01) |
| *G06F 3/0487* | (2013.01) |
| *G06F 3/16* | (2006.01) |

(52) U.S. Cl.
CPC .......... *G06F 3/0481* (2013.01); *G06F 3/0484* (2013.01); *G06F 3/0487* (2013.01); *G06F 3/167* (2013.01); *G06F 2203/04804* (2013.01)

(58) Field of Classification Search
None
See application file for complete search history.

(56) References Cited

U.S. PATENT DOCUMENTS

| | | |
|---|---|---|
| 8,587,547 B2 | 11/2013 | Koch et al. |
| 9,922,651 B1 | 3/2018 | Nelson et al. |
| 11,003,839 B1 | 5/2021 | Hatch |
| 11,290,684 B1 | 3/2022 | C S et al. |
| 11,681,364 B1 | 6/2023 | Zhang et al. |
| 2003/0210270 A1 | 11/2003 | Clow et al. |
| 2004/0186732 A1 | 9/2004 | Okura et al. |
| 2005/0140660 A1 | 6/2005 | Valikangas |
| 2006/0075359 A1 | 4/2006 | Bauchot et al. |
| 2009/0319266 A1 | 12/2009 | Brown et al. |
| 2010/0031143 A1 | 2/2010 | Rao et al. |
| 2010/0141590 A1 | 6/2010 | Markiewicz et al. |

(Continued)

FOREIGN PATENT DOCUMENTS

| | | |
|---|---|---|
| CN | 1620642 A | 5/2005 |
| CN | 103064629 A | 4/2013 |

(Continued)

OTHER PUBLICATIONS

My RSI Life (Dragon Naturally Speaking Tutorial #3—Using Dragon with Microsoft Excel; https://www.youtube.com/watch?v=EuLu3x-gQ28; Mar. 12, 2023) (Year: 2023).*

(Continued)

*Primary Examiner* — Matthew Yeung
(74) *Attorney, Agent, or Firm* — YHE Law LLP

(57) ABSTRACT

The present disclosure generally relates to managing keyboard mode indicators, displaying user interfaces based on the state of a dictation mode, displaying effects while a dictation mode is active, and displaying a transcription when an utterance includes a command keyword.

45 Claims, 24 Drawing Sheets

(56)  References Cited

U.S. PATENT DOCUMENTS

| | | |
|---|---|---|
| 2011/0153325 A1 | 6/2011 | Ballinger et al. |
| 2012/0092381 A1 | 4/2012 | Hoover et al. |
| 2012/0094700 A1 | 4/2012 | Karmarkar et al. |
| 2012/0127206 A1 | 5/2012 | Thompson et al. |
| 2012/0206363 A1 | 8/2012 | Kyprianou et al. |
| 2013/0067399 A1 | 3/2013 | Elliott et al. |
| 2013/0234942 A1 | 9/2013 | Yoo et al. |
| 2014/0350924 A1 | 11/2014 | Zurek et al. |
| 2015/0110263 A1 | 4/2015 | Johnston et al. |
| 2015/0242391 A1 | 8/2015 | Goel et al. |
| 2015/0293602 A1 | 10/2015 | Kay et al. |
| 2015/0346905 A1 | 12/2015 | Winer et al. |
| 2015/0364140 A1 | 12/2015 | Thörn |
| 2016/0077793 A1 | 3/2016 | Disano et al. |
| 2016/0085441 A1 | 3/2016 | Mitchell |
| 2016/0147435 A1 | 5/2016 | Brody et al. |
| 2017/0109039 A1 | 4/2017 | Lemay et al. |
| 2017/0154464 A1 | 6/2017 | Lanier et al. |
| 2017/0185581 A1 | 6/2017 | Bojja et al. |
| 2017/0206002 A1 | 7/2017 | Badger et al. |
| 2017/0263248 A1 | 9/2017 | Gruber et al. |
| 2017/0302809 A1 | 10/2017 | Shogaki |
| 2018/0011688 A1 | 1/2018 | Wei et al. |
| 2018/0307303 A1 | 10/2018 | Powderly et al. |
| 2019/0005030 A1 | 1/2019 | Reese et al. |
| 2019/0042645 A1 | 2/2019 | Othmer et al. |
| 2019/0122658 A1 | 4/2019 | Nakagawa et al. |
| 2019/0129501 A1 | 5/2019 | Nistico et al. |
| 2019/0212815 A1 | 7/2019 | Zhang et al. |
| 2019/0279622 A1 | 9/2019 | Liu et al. |
| 2019/0362557 A1 | 11/2019 | Lacey et al. |
| 2020/0020319 A1 | 1/2020 | Malhotra et al. |
| 2020/0020334 A1 | 1/2020 | Kang et al. |
| 2020/0035235 A1 | 1/2020 | Lee |
| 2020/0103963 A1 | 4/2020 | Kelly et al. |
| 2020/0126538 A1 | 4/2020 | Han et al. |
| 2020/0168038 A1 | 5/2020 | Schwartz |
| 2020/0379632 A1 | 12/2020 | Edwards et al. |
| 2021/0125706 A1 | 4/2021 | Spottiswoode et al. |
| 2021/0241771 A1 | 8/2021 | Yun |
| 2021/0264188 A1 | 8/2021 | Matsumura et al. |
| 2021/0264212 A1 | 8/2021 | Paik et al. |
| 2021/0326525 A1 | 10/2021 | Kwon et al. |
| 2022/0011860 A1 | 1/2022 | Cappello et al. |
| 2022/0028396 A1 | 1/2022 | Li et al. |
| 2022/0147703 A1 | 5/2022 | Martinez et al. |
| 2022/0262358 A1 | 8/2022 | Meriaz et al. |
| 2022/0270590 A1 | 8/2022 | Beaufays et al. |
| 2022/0284904 A1 | 9/2022 | Pu et al. |
| 2022/0313082 A1 | 10/2022 | Andersson et al. |
| 2022/0366910 A1 | 11/2022 | Carbune et al. |
| 2023/0011551 A1 | 1/2023 | Usami et al. |
| 2023/0122824 A1 | 4/2023 | Narayanan |
| 2023/0134269 A1 | 5/2023 | Zer |
| 2023/0260156 A1 | 8/2023 | Wedig |
| 2024/0086055 A1 | 3/2024 | Edwards et al. |
| 2024/0185856 A1 | 6/2024 | Paek et al. |

FOREIGN PATENT DOCUMENTS

| | | |
|---|---|---|
| CN | 113448430 A | 9/2021 |
| CN | 113808592 A | 12/2021 |
| EP | 2391101 A1 | 11/2011 |
| GB | 2597917 A | 2/2022 |
| WO | 2021/153024 A1 | 8/2021 |

OTHER PUBLICATIONS

My RSI Life (Dragon Naturally Speaking Tutorial #1 (Professional Individual version 15); https://www.youtube.com/watch?v=G2m0kUkYHuQ; Oct. 6, 2022) (Year: 2022).*

Apple Support (How to show a continuous overlay for Voice Control on iPhone, iPad, and iPod touch Apple Support; https:// www.youtube.com/watch?v=kYTmdWpf8uo; Dec. 17, 2020 (Year: 2020).*

Mailtag (How To Use Gmail Smart Compose; https://www.youtube.com/watch?v=_hBJiN5OdVM; Oct. 16, 2018) (Year: 2018).*

Jacob QuickTips for iPhone (How to use Voice Dictation to transcribe text on iPad; https://www.youtube.com/watch?v=qhXMBbZf8zQ; Mar. 2, 2020 (Year: 2020).*

Advisory Action received for U.S. Appl. No. 18/519,979, mailed on May 9, 2025, 3 pages.

Non-Final Office Action received for U.S. Appl. No. 18/519,979, mailed on Jun. 9, 2025, 28 pages.

Applicant-Initiated Interview Summary received for U.S. Appl. No. 16/825,908, mailed on Feb. 2, 2023, 3 pages.

Applicant-Initiated Interview Summary received for U.S. Appl. No. 16/825,908, mailed on Jun. 5, 2023, 2 pages.

Applicant-Initiated Interview Summary received for U.S. Appl. No. 16/825,908, mailed on Oct. 31, 2022, 2 pages.

Examiner-Initiated Interview Summary received for U.S. Appl. No. 16/825,908, mailed on May 25, 2023, 2 pages.

Final Office Action received for U.S. Appl. No. 16/825,908, mailed on Dec. 14, 2022, 38 pages.

Howcast, "How to Move the iPad Keyboard I Mac Basics", Available online at: https://www.youtube.com/watch?v=se0kucTrNXk, May 11, 2014.

International Preliminary Report on Patentability received for PCT Patent Application No. PCT/IB2020/000308, mailed on Dec. 16, 2021, 12 pages.

International Search Report and Written Opinion received for PCT Patent Application No. PCT/IB2020/000308, mailed on Oct. 9, 2020, 17 pages.

Invitation to Pay Additional fees received for PCT Patent Application No. PCT/IB2020/000308, mailed on Aug. 14, 2020, 9 pages.

Non-Final Office Action received for U.S. Appl. No. 16/825,908, mailed on Apr. 11, 2023, 41 pages.

Non-Final Office Action received for U.S. Appl. No. 16/825,908, mailed on Sep. 6, 2022, 31 pages.

Notice of Allowance received for U.S. Appl. No. 16/825,908, mailed on Jul. 19, 2023, 10 pages.

Nuance, "Dragon NaturallySpeaking", Version 13, End-User Workbook, 2014, 125 pages.

Office Action received for Chinese Patent Application No. 202080039148.X, mailed on Feb. 7, 2024, 22 pages (13 pages of English Translation and 9 pages of Official Copy).

Applicant-Initiated Interview Summary received for U.S. Appl. No. 18/519,979, mailed on Apr. 21, 2025, 3 pages.

Applicant-Initiated Interview Summary received for U.S. Appl. No. 18/519,979, mailed on Mar. 4, 2025, 3 pages.

Castellini Rick, "How to enable and use dictation with an iPhone or iPad", Online Available at: <https://www.youtube.com/watch?v=8w133yN6rTU>, Sep. 7, 2017, 3 pages.

Final Office Action received for U.S. Appl. No. 18/519,979, mailed on Mar. 14, 2025, 28 pages.

International Preliminary Report on Patentability received for PCT Patent Application No. PCT/US2022/042331, mailed on Mar. 14, 2024, 19 pages.

International Search Report and Written Opinion received for PCT Patent Application No. PCT/US2022/042331, mailed on Mar. 13, 2023, 25 pages.

Invitation to Pay Additional Fees and Partial International Search Report received for PCT Patent Application No. PCT/US2022/042331, mailed on Dec. 21, 2022, 15 pages.

Maindola Amit, "Google Voice Type in Hindi-English", Online available at: https://www.youtube.com/watch?v=W_Q9hKpCtlc, Dec. 24, 2016, 3 pages.

Non-Final Office Action received for U.S. Appl. No. 18/519,979, mailed on Feb. 18, 2025, 26 pages.

Office Action received for Chinese Patent Application No. 202080039148.X, mailed on Aug. 20, 2024, 19 pages (12 pages of English Translation and 7 pages of Official Copy).

Office Action received for Chinese Patent Application No. 202080039148.X, mailed on Jun. 26, 2024, 20 pages (13 pages of English Translation and 7 pages of Official Copy).

(56) References Cited

OTHER PUBLICATIONS

Office Action received for European Patent Application No. 20732308. 0, mailed on Oct. 31, 2024, 7 pages.

Products for Pals—ALS Tech, "Skyle for iPad Pro eye gaze control real world review", Online Available at: <https://www.youtube.com/watch?v=_3TxZtDJpFo>, Aug. 13, 2020, 4 pages.

Roman Daniel, "Gboard Keyboard Gets Voice Typing, iOS Emojis", YouTube, Online Available at: https://www.youtube.com/watch?v=kF0vcdc1V9Q, Feb. 24, 2017, 3 pages.

Applicant-Initiated Interview Summary received for U.S. Appl. No. 18/519,979, mailed on Jul. 9, 2025, 2 pages.

Applicant-Initiated Interview Summary received for U.S. Appl. No. 18/442,910, mailed on Sep. 29, 2025, 5 pages.

Notice of Allowance received for U.S. Appl. No. 18/519,979, mailed on Oct. 10, 2025, 22 pages.

Menges et al., "Improving User Experience of Eye Tracking-based Interaction: Introspecting and Adapting Interfaces", ACM Transactions on Computer-Human Interaction, vol. 26, No. 6, Article 37, Oct. 2019, 46 pages.

Nikolopoulos et al., "Signal processing to drive human-computer interaction: EEG and eye-controlled interfaces", The Institution of Engineering and Technology, 2020, 292 pages.

Non-Final Office Action received for U.S. Appl. No. 18/442,910, mailed on Sep. 10, 2025, 33 pages.

Rivu et al., "GazeButton: Enhancing Buttons with Eye Gaze Interactions", Proceedings of the 11th ACM Symposium on Eye Tracking Research & Applications, Jun. 2019, 7 pages.

Yu Jiayao, "Gaze-typing for Everyday Use: Keyboard Usability Observations and a "Tolerant" Keyboard Prototype", KTH Royal Institute of Technology, Aalto University, Stockholm, Sweden, 2018, 16 pages.

* cited by examiner

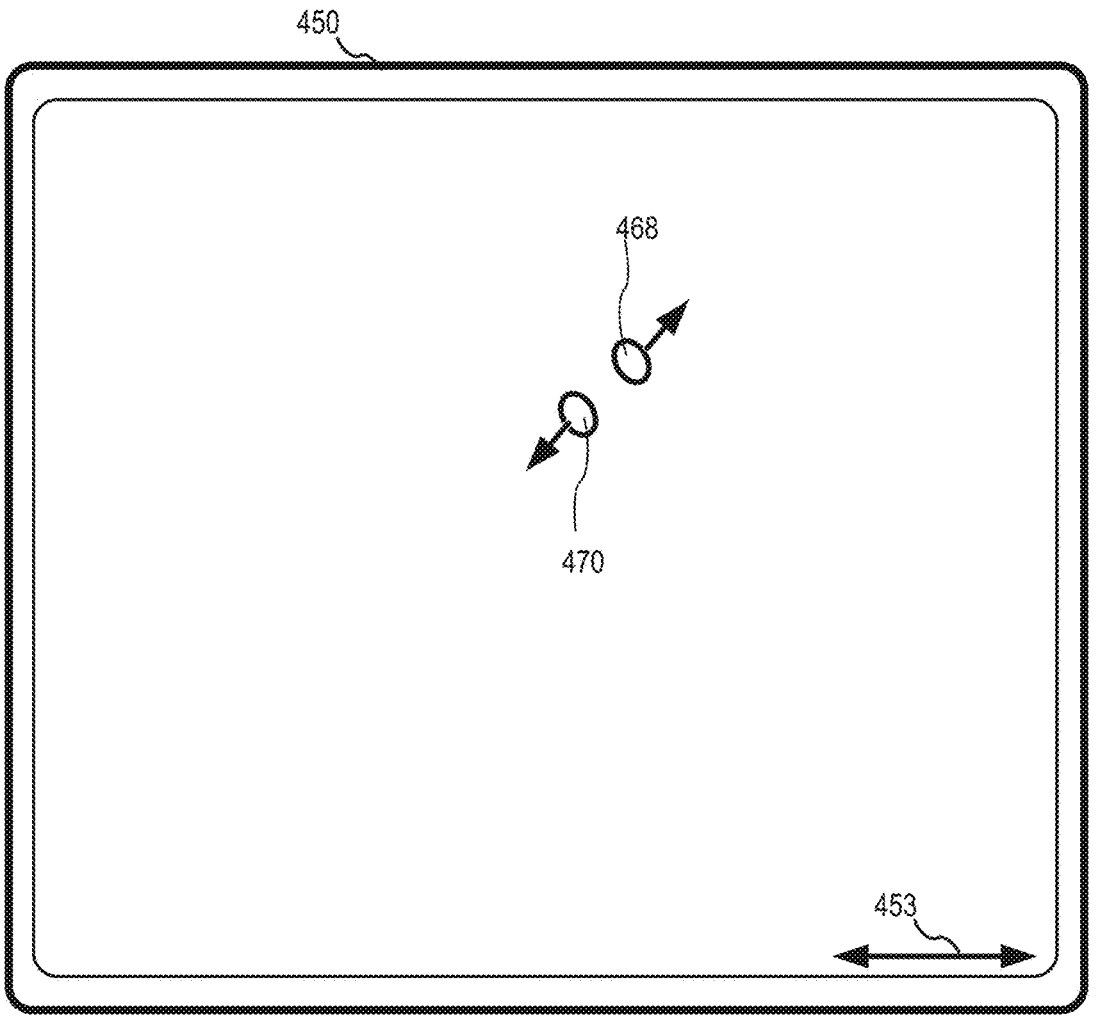
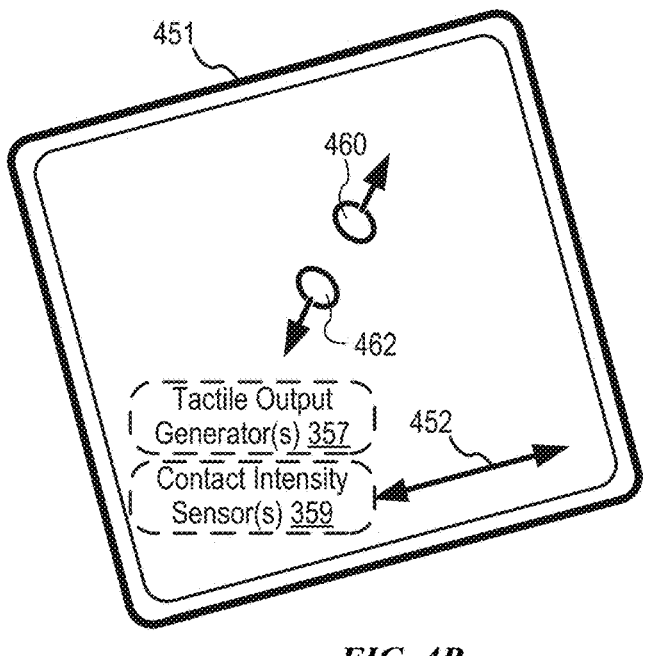
*FIG. 4B*

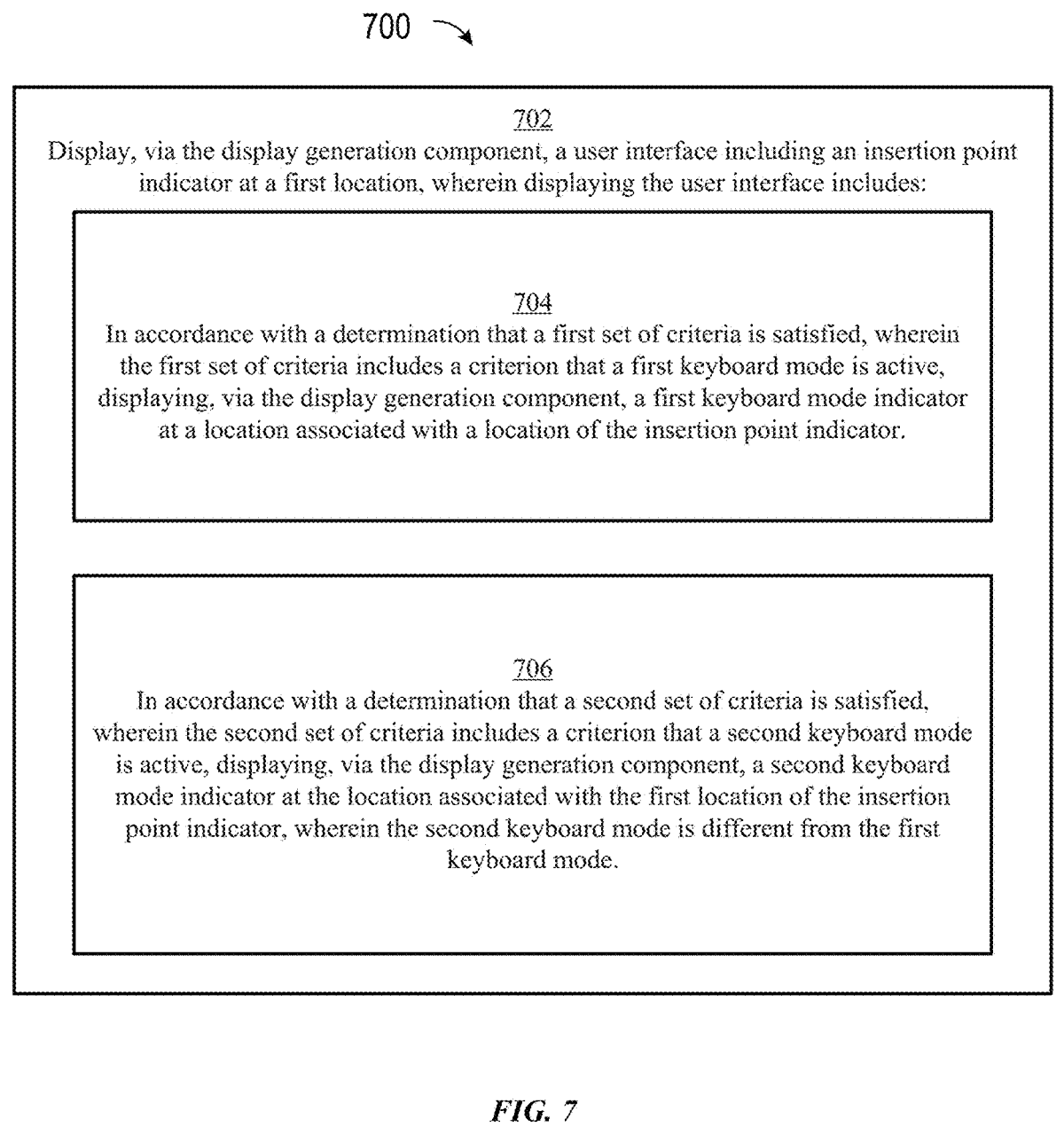

700 ↘

702
Display, via the display generation component, a user interface including an insertion point indicator at a first location, wherein displaying the user interface includes:

704
In accordance with a determination that a first set of criteria is satisfied, wherein the first set of criteria includes a criterion that a first keyboard mode is active, displaying, via the display generation component, a first keyboard mode indicator at a location associated with a location of the insertion point indicator.

706
In accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

*FIG. 7*

| UTTERANCE | 822 | TRANSCRIPTION | 824 | CRITERIA | 826 |
|---|---|---|---|---|---|
| SEND | 822a | *NOT TRANSCRIBED* | 824a | KEYWORD | 826a |
| I LIKE VANILLA ICE CREAM | 822b | I LIKE VANILLA ICE CREAM | 824b | KEYWORD | 826a |
| IT'S OPEN LATER THAN THE RESTAURANT. *<LEADING PAUSE THRESHOLD MET>* SEND | 822c | IT'S OPEN LATER THAN THE RESTAURANT. | 824c | LEADING PAUSE | 826b |
| IT'S OPEN LATER THAN THE RESTAURANT. *<LEADING PAUSE THRESHOLD NOT MET>* SEND | 822d | IT'S OPEN LATER THAN THE RESTAURANT. SEND | 824d | LEADING PAUSE | 826b |
| IT'S OPEN LATER THAN THE RESTAURANT. SEND *<TRAILING PAUSE THRESHOLD MET>* | 822e | IT'S OPEN LATER THAN THE RESTAURANT. | 824e | TRAILING PAUSE | 826c |
| IT'S OPEN LATER THAN THE RESTAURANT. SEND *<TRAILING PAUSE THRESHOLD NOT MET>* ME THE ADDRESS. | 822f | IT'S OPEN LATER THAN THE RESTAURANT. SEND ME THE ADDRESS. | 824f | TRAILING PAUSE | 826c |
| I DON'T HAVE THE ADDRESS. SEND MESSAGE. | 822g | I DON'T HAVE THE ADDRESS. | 824g | SEMANTIC | 826d |
| I DON'T HAVE THE ADDRESS. SEND IT WHEN YOU CAN. | 822h | I DON'T HAVE THE ADDRESS. SEND IT WHEN YOU CAN. | 824h | SEMANTIC | 826d |
| LET'S GET GOING. SEND | 822i | LET'S GET GOING | 824i | SYNTACTIC BREAK | 826e |
| LET'S GET GOING. CAN YOU SEND IT? | 822j | LET'S GET GOING. CAN YOU SEND IT? | 824j | SYNTACTIC BREAK | 826e |
| CHANGE TODAY TO TONIGHT | 822k | *NOT TRANSCRIBED* | 824k | TARGET PRESENCE | 826f |
| I NEED TO CHANGE CLOTHES BEFORE WE MEET UP. | 822l | I NEED TO CHANGE CLOTHES BEFORE WE MEET UP. | 824l | TARGET PRESENCE | 826f |

Figure 9:
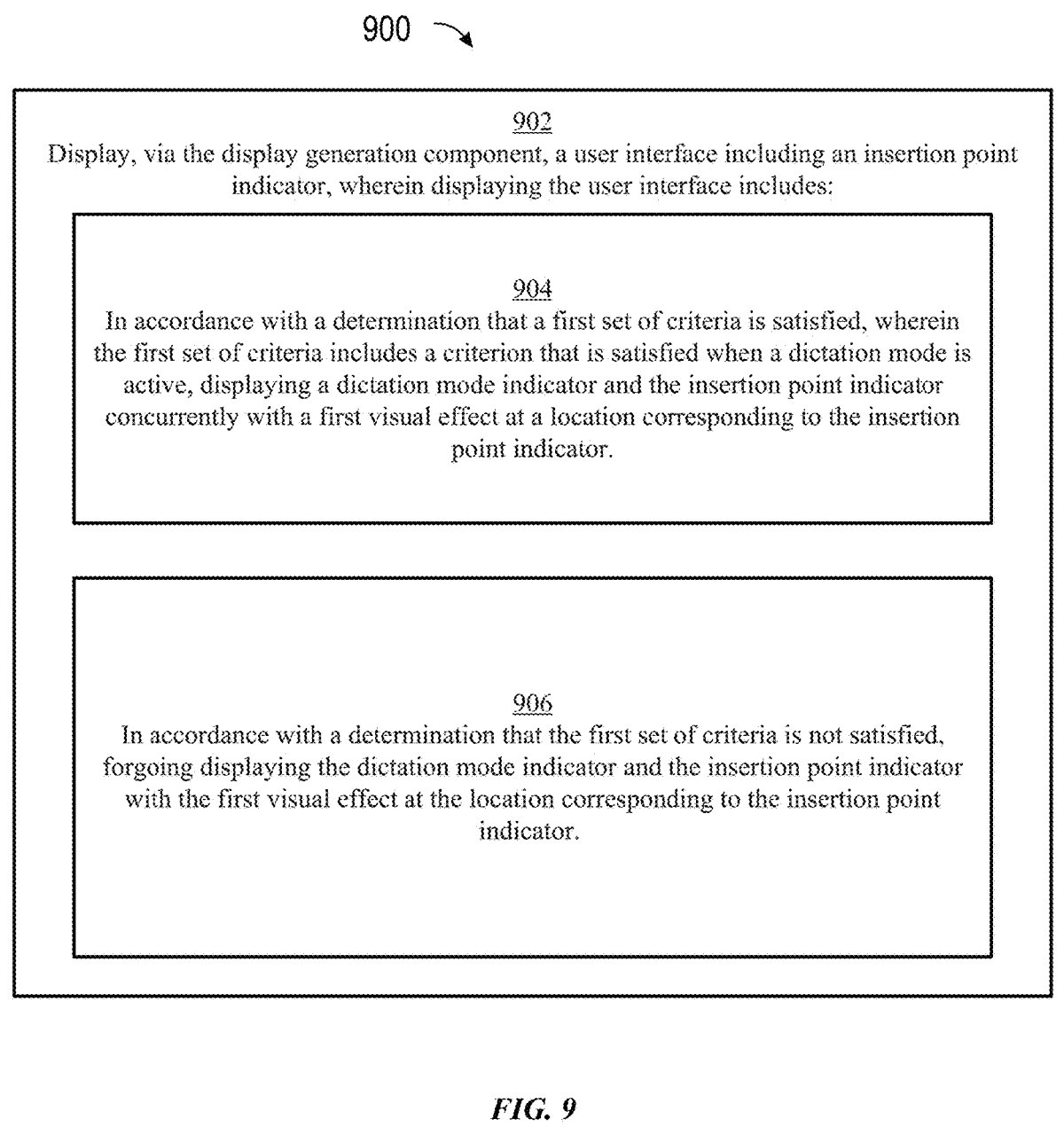

902
Display, via the display generation component, a user interface including an insertion point indicator, wherein displaying the user interface includes:

904
In accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator.

906
In accordance with a determination that the first set of criteria is not satisfied, forgoing displaying the dictation mode indicator and the insertion point indicator with the first visual effect at the location corresponding to the insertion point indicator.

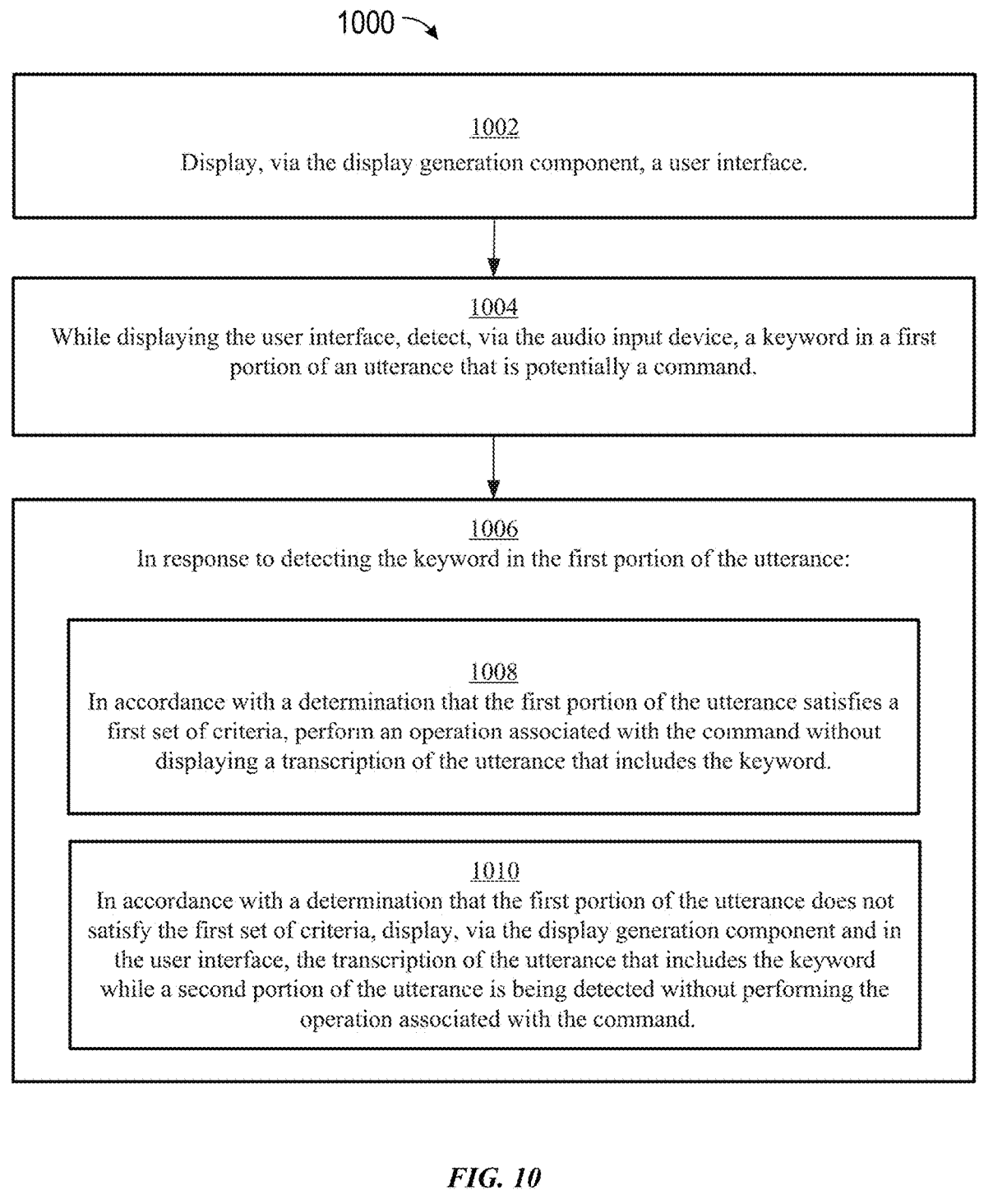

```
┌─────────────────────────────────────────────────────────────────────────┐
│                                  1002                                      │
│         Display, via the display generation component, a user interface.   │
└─────────────────────────────────────────────────────────────────────────┘
                                     │
                                     ▼
┌─────────────────────────────────────────────────────────────────────────┐
│                                  1004                                      │
│  While displaying the user interface, detect, via the audio input device,  │
│     a keyword in a first portion of an utterance that is potentially a      │
│                                command.                                    │
└─────────────────────────────────────────────────────────────────────────┘
                                     │
                                     ▼
┌─────────────────────────────────────────────────────────────────────────┐
│                                  1006                                      │
│  In response to detecting the keyword in the first portion of the utterance:│
│                                                                            │
│  ┌───────────────────────────────────────────────────────────────────┐   │
│  │                              1008                                    │   │
│  │  In accordance with a determination that the first portion of the    │   │
│  │  utterance satisfies a first set of criteria, perform an operation   │   │
│  │  associated with the command without displaying a transcription of   │   │
│  │           the utterance that includes the keyword.                   │   │
│  └───────────────────────────────────────────────────────────────────┘   │
│                                                                            │
│  ┌───────────────────────────────────────────────────────────────────┐   │
│  │                              1010                                    │   │
│  │  In accordance with a determination that the first portion of the    │   │
│  │  utterance does not satisfy the first set of criteria, display, via   │   │
│  │  the display generation component and in the user interface, the     │   │
│  │  transcription of the utterance that includes the keyword while a    │   │
│  │  second portion of the utterance is being detected without performing │   │
│  │         the operation associated with the command.                   │   │
│  └───────────────────────────────────────────────────────────────────┘   │
└─────────────────────────────────────────────────────────────────────────┘
```

*FIG. 10*

USER INTERFACES FOR MANAGING INPUT MODES

CROSS-REFERENCE TO RELATED APPLICATIONS

This application claims priority to U.S. Provisional Patent Application No. 63/462,486, entitled "USER INTERFACES FOR MANAGING INPUT MODES," filed on Apr. 27, 2023, the entire contents of the application is hereby incorporated by reference in its entirety.

FIELD

The present disclosure relates generally to computer user interfaces, and more specifically to techniques for managing input modes.

BACKGROUND

Computer systems provide various input modes using different input devices including, for example, a keyboard and/or a microphone.

BRIEF SUMMARY

Some techniques for managing input modes using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing input modes. Such methods and interfaces optionally complement or replace other methods for managing input modes. Such methods and interfaces reduce the cognitive burden on a user and produce a more efficient human-machine interface. For battery-operated computing devices, such methods and interfaces conserve power and increase the time between battery charges. Such methods and interfaces provide visual feedback as to the state of the electronic device and what input modes (and/or input devices) are active.

In accordance with some embodiments, a method performed at a computer system that is in communication with a display generation component is described. The method comprises: displaying, via the display generation component, a user interface including an insertion point indicator at a first location, wherein displaying the user interface includes: in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a user interface including an insertion point indicator at a first location, wherein displaying the user interface includes: in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a transitory computer-readable storage medium is described. The transitory computer-readable storage medium stores one or more programs configured to be executed by one or more processors of a computer system that is configured to communicate with a display generation component, the one or more programs including instructions for: displaying, via the display generation component, a user interface including an insertion point indicator at a first location, wherein displaying the user interface includes: in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a computer system that is configured to communicate with a display generation component is described. The computer system comprises: one or more processors; and memory storing one or more programs configured to be executed by the one or more processors, the one or more programs including instructions for: displaying, via the display generation component, a user interface including an insertion point indicator at a first location, wherein displaying the user interface includes: in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a computer system that is configured to communicate with a display generation component is described. The computer system comprises: means for displaying, via the display generation component, a user interface including an insertion point indicator at a first location, wherein displaying the user interface includes: means for, in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and means for, in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a computer program product is described. The computer program product comprises one or more programs configured to be executed by one or more processors of a computer system that is in communication with a display generation component. The one or more programs include instructions for: displaying, via the display generation component, a user interface including an insertion point indicator at a first location, wherein displaying the user interface includes: in accordance with a determination that a first set of criteria is satisfied, wherein the first set of criteria includes a criterion that a first keyboard mode is active, displaying, via the display generation component, a first keyboard mode indicator at a location associated with a location of the insertion point indicator; and in accordance with a determination that a second set of criteria is satisfied, wherein the second set of criteria includes a criterion that a second keyboard mode is active, displaying, via the display generation component, a second keyboard mode indicator at the location associated with the first location of the insertion point indicator, wherein the second keyboard mode is different from the first keyboard mode.

In accordance with some embodiments, a method performed at a computer system that is in communication with a display generation component is described. The method comprises: displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

In accordance with some embodiments, a transitory computer-readable storage medium is described. The transitory computer-readable storage medium stores one or more programs configured to be executed by one or more processors of a computer system that is configured to communicate with a display generation component, the one or more programs including instructions for: displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

In accordance with some embodiments, a computer system that is configured to communicate with a display generation component is described. The computer system comprises: one or more processors; and memory storing one or more programs configured to be executed by the one or more processors, the one or more programs including instructions for: displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

In accordance with some embodiments, a computer system that is configured to communicate with a display generation component is described. The computer system comprises: means for displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

The computer program product comprises one or more programs configured to be executed by one or more processors of a computer system that is in communication with a display generation component. The one or more programs include instructions for: displaying, via the display generation component, a user interface including an insertion point indicator, wherein displaying the user interface includes: in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator; and in accordance with a determination that the first set of criteria is not satisfied, forgoing displaying the dictation mode indicator and the insertion point indicator with the first visual effect at the location corresponding to the insertion point indicator.

In accordance with some embodiments, a method performed at a computer system that is in communication with a display generation component and an audio input device is described. The method comprises: displaying, via the display generation component, a user interface; while displaying the user interface, detecting, via the audio input device, a keyword in a first portion of an utterance that is potentially a command; in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

In accordance with some embodiments, a non-transitory computer-readable storage medium is described. The non-transitory computer-readable storage medium stores one or more programs configured to be executed by one or more processors of a computer system that is in communication with a display generation component and an audio input device, the one or more programs including instructions for: displaying, via the display generation component, a user interface; while displaying the user interface, detecting, via the audio input device, a keyword in a first portion of an utterance that is potentially a command; in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

In accordance with some embodiments, a transitory computer-readable storage medium is described. The transitory computer-readable storage medium stores one or more programs configured to be executed by one or more processors of a computer system that is configured to communicate with a display generation component and an audio input device, the one or more programs including instructions for: displaying, via the display generation component, a user interface; while displaying the user interface, detecting, via the audio input device, a keyword in a first portion of an utterance that is potentially a command; in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

In accordance with some embodiments, a computer system that is configured to communicate with a display generation component and an audio input device is described. The computer system comprises: one or more processors; and memory storing one or more programs configured to be executed by the one or more processors, the one or more programs including instructions for: displaying, via the display generation component, a user interface; while displaying the user interface, detecting, via the audio input device, a keyword in a first portion of an utterance that is potentially a command; in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

In accordance with some embodiments, a computer system that is configured to communicate with a display generation component and an audio input device is described. The computer system comprises: means for displaying, via the display generation component, a user interface; means, while displaying the user interface, for detecting, via the audio input device, a keyword in a first portion of an utterance that is potentially a command; means for in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

In accordance with some embodiments, a computer program product is described. The computer program product comprises one or more programs configured to be executed by one or more processors of a computer system that is in communication with a display generation component and an audio input device. The one or more programs include instructions for: displaying, via the display generation component, a user interface; while displaying the user interface, detecting, via the audio input device, a keyword in a first portion of an utterance that is potentially a command; in response to detecting the keyword in the first portion of the utterance: in accordance with a determination that the first portion of the utterance satisfies a first set of criteria: performing an operation associated with the command without displaying a transcription of the utterance that includes the keyword; and in accordance with a determination that the first portion of the utterance does not satisfy the first set of criteria: displaying, via the display generation component and in the user interface, the transcription of the utterance that includes the keyword while a second portion of the utterance is being detected without performing the operation associated with the command.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing input modes, thereby increasing the effectiveness, efficiency, and user satisfaction with such devices. Such methods and interfaces may complement or replace other methods for managing input modes.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for managing keyboard mode indicators, in accordance with some embodiments.

FIGS. 8A-8K, illustrate exemplary user interfaces based on the state of a dictation mode, in accordance with some embodiments.

FIG. 9 is a flow diagram illustrating a method for displaying effects while a dictation mode is active, in accordance with some embodiments.

FIG. 10 is a flow diagram illustrating a method for displaying a transcription when an utterance includes a command keyword, in accordance with some embodiments.

DESCRIPTION OF EMBODIMENTS

Figure 1A:
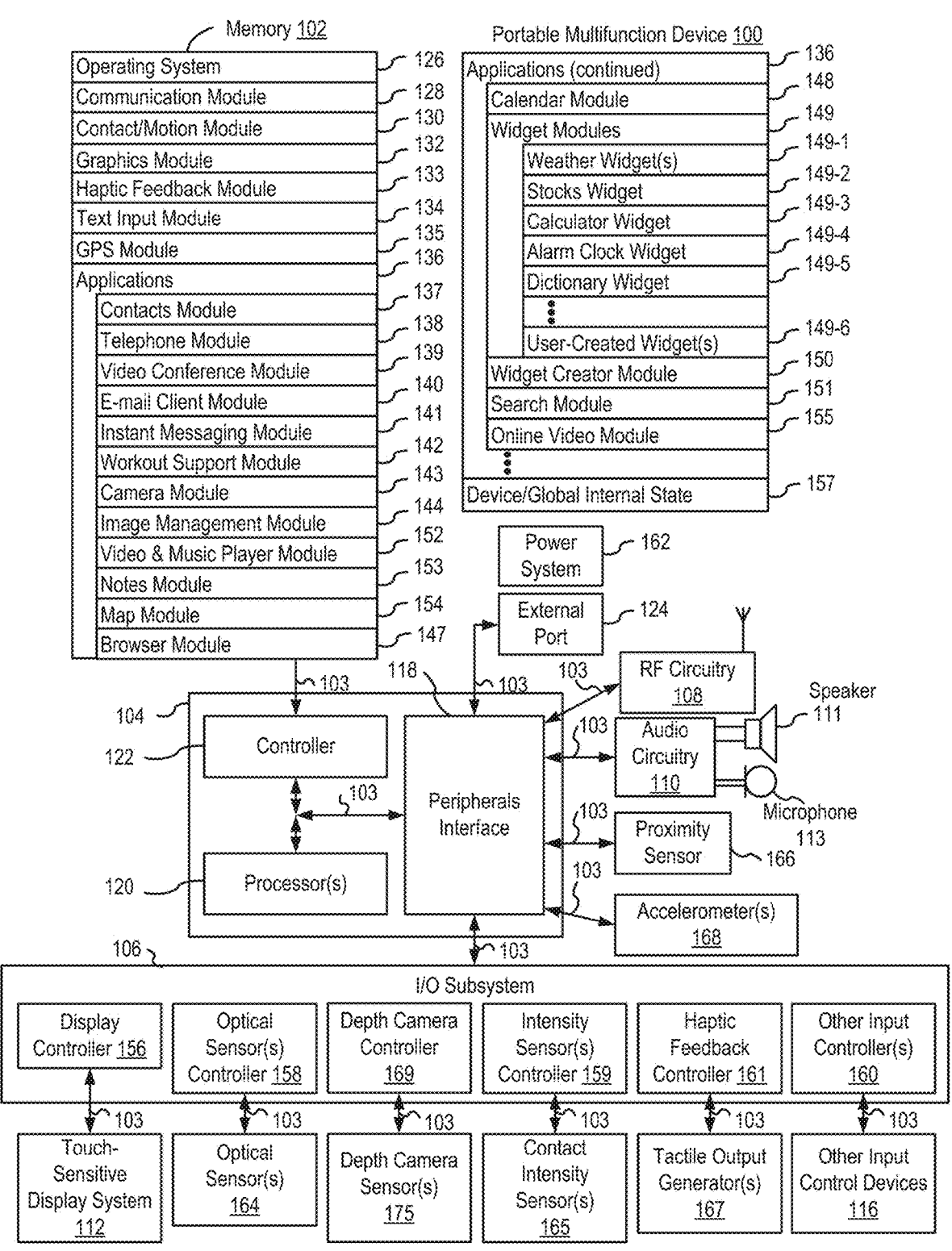
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing input modes. Since electronic devices can be in communication with multiple input devices and/or have multiple input modes, it is difficult for a user to determine which input mode is currently active. Such techniques can reduce the cognitive burden on a user who manages input modes, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6L illustrate exemplary user interfaces for managing event notifications. FIG. 7 is a flow diagram illustrating methods of managing event notifications in accordance with some embodiments. The user interfaces in FIGS. 6A-6L are used to illustrate the processes described below, including the processes in FIG. 7. FIGS. 8A-8K illustrate exemplary user interfaces based on the state of a dictation mode. FIG. 9 is a flow diagram illustrating a method for displaying effects while a dictation mode is active. FIG. 10 is a flow diagram illustrating a method for displaying a transcription when an utterance includes a command keyword. The user interfaces in FIGS. 8A-8K are used to illustrate the processes described below, including the processes in FIGS. 9-10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, controlling which input mode is active, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience and is sometimes known as or called a "touch-sensitive display." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touch-pad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in por-table devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodi-ments, at least one contact intensity sensor is located on the back of device 100, opposite touch screen display 112, which is located on the front of device 100.

Device 100 optionally also includes one or more prox-imity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally per-forms as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
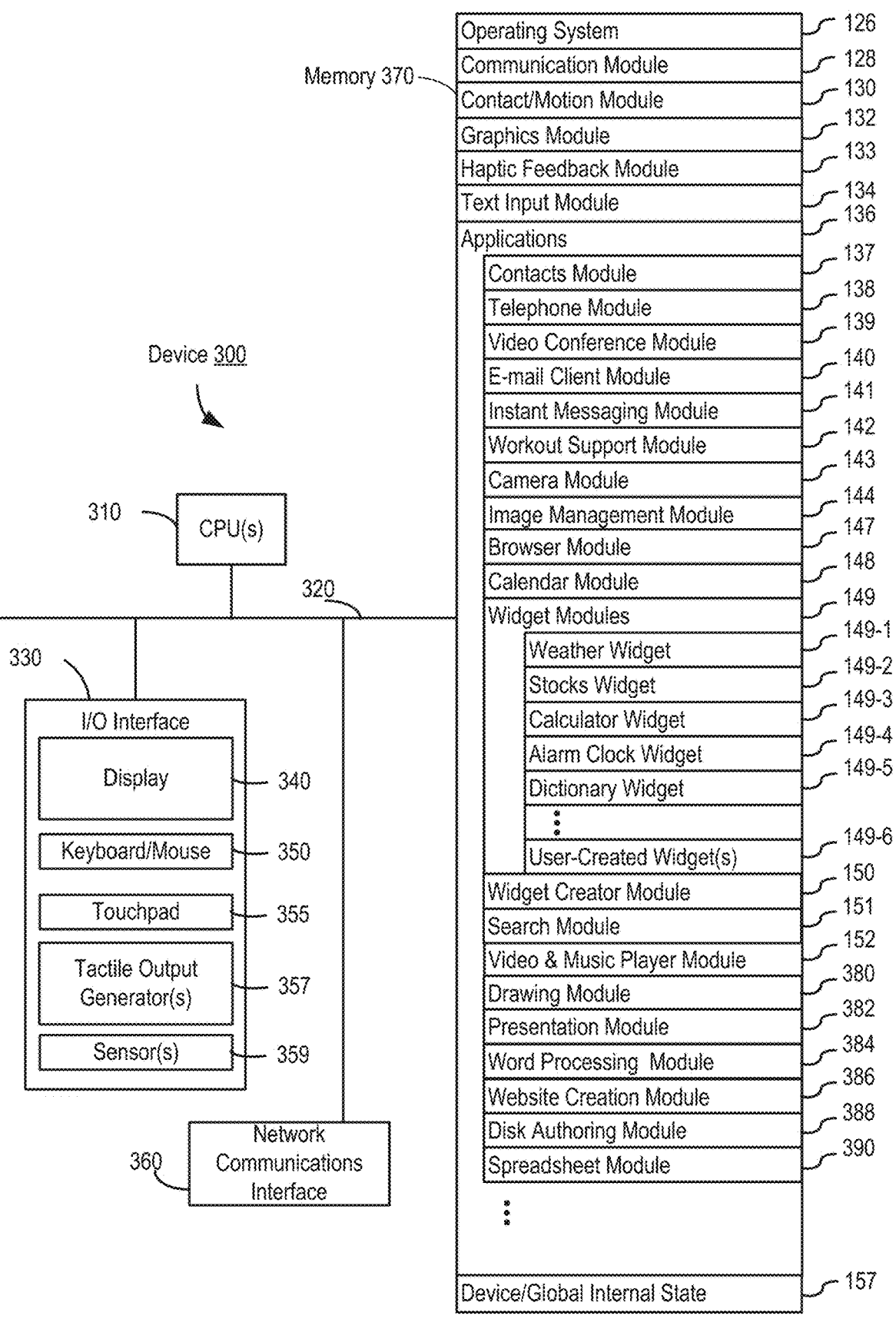
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as Vx Works) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;

Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
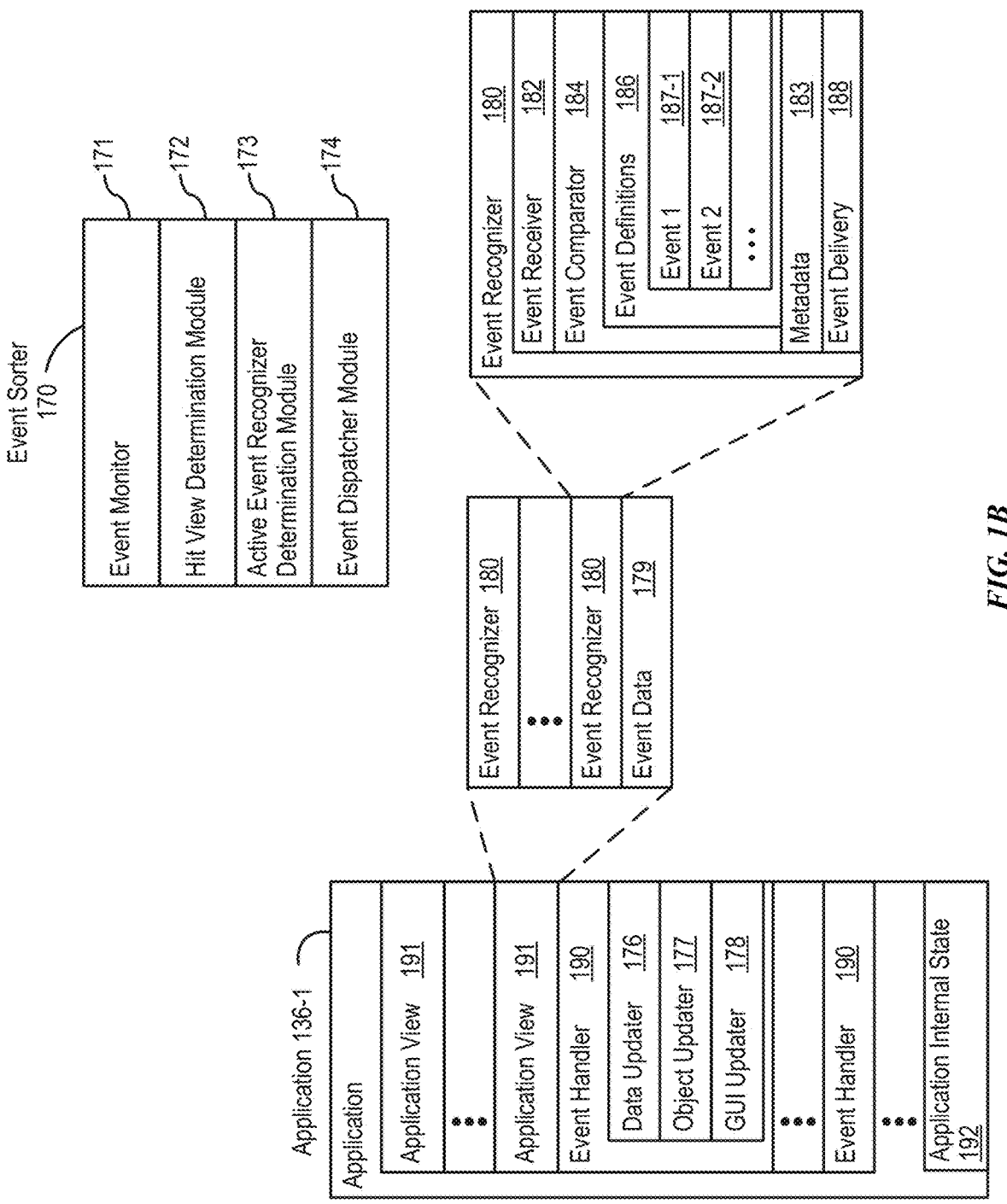
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
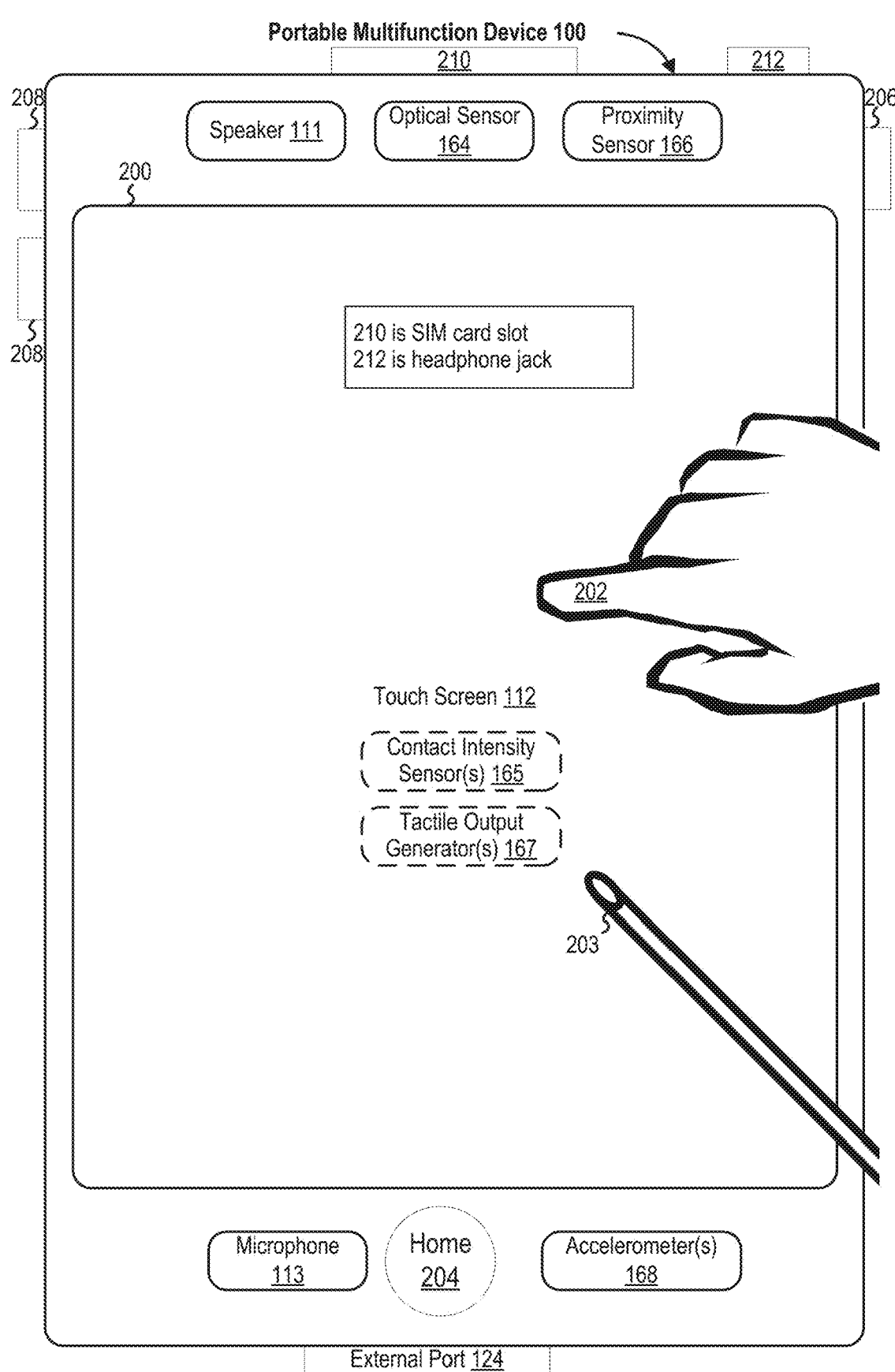
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
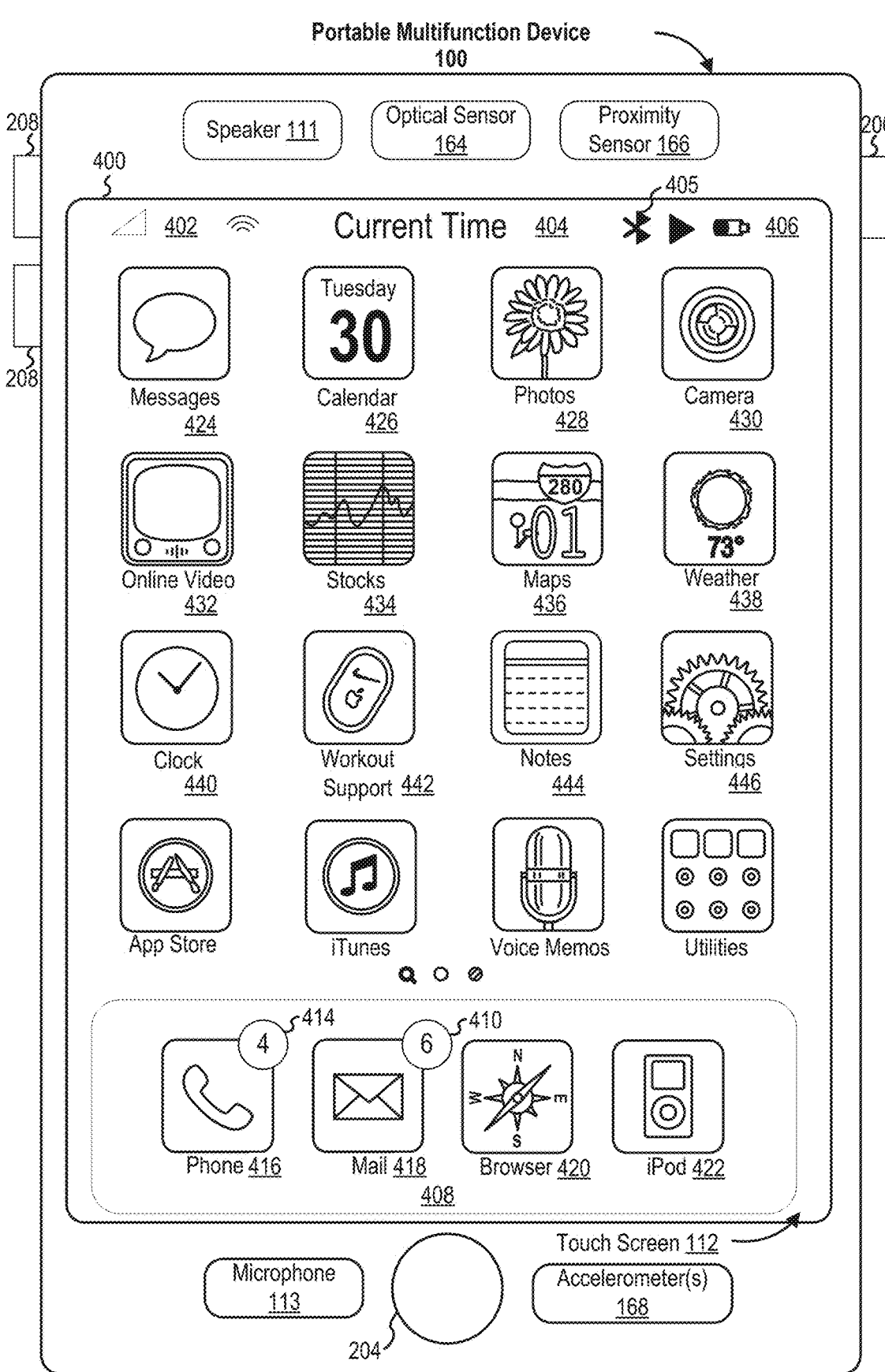
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
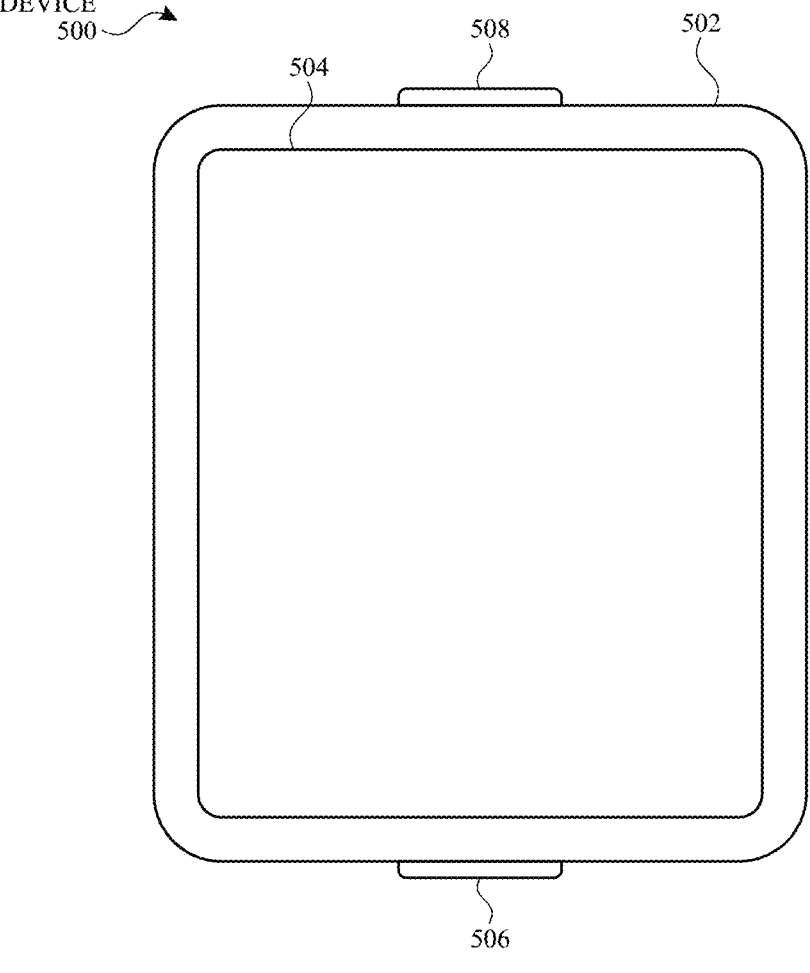
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
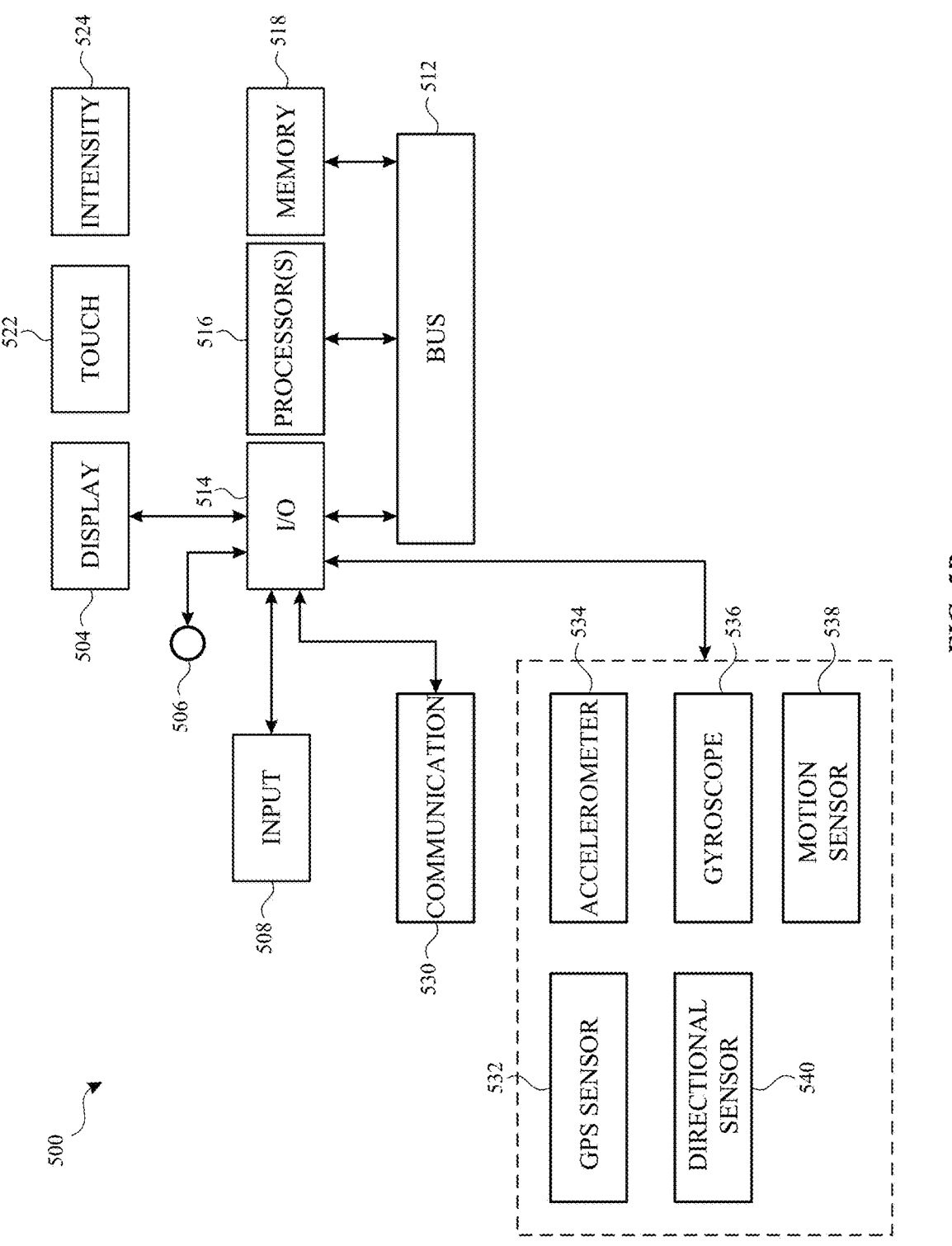
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to touch screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900-1000 (FIGS. 7 and 9-10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6L illustrate exemplary user interfaces for managing keyboard mode indicators, in accordance with some embodiments. The user interfaces in these figures are used to illustrate the processes described below, including the processes in FIG. 7.

Figures 6A, 6B:
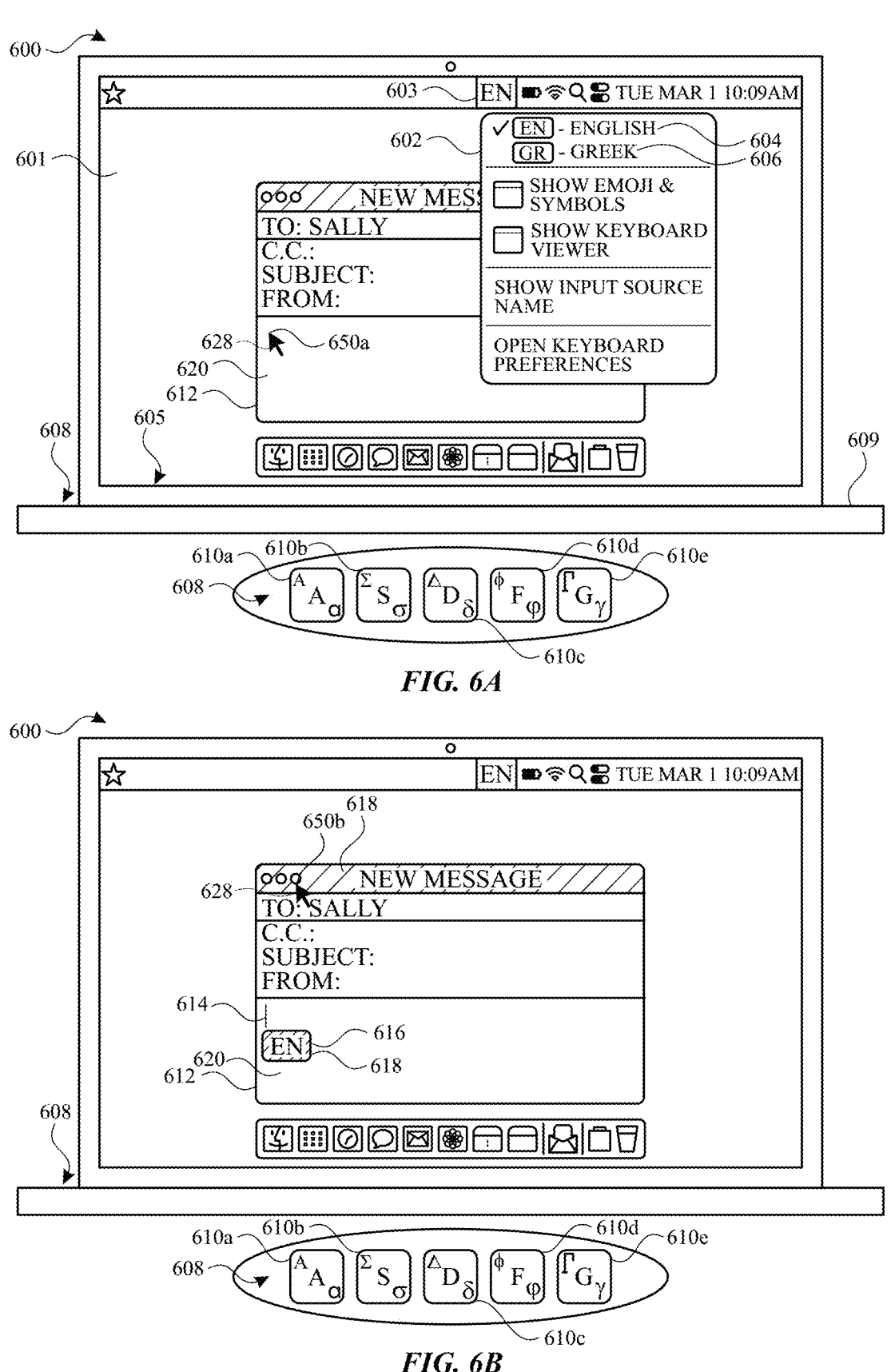
FIGS. 6A-6L, illustrate exemplary user interfaces for managing keyboard mode indicators, in accordance with some embodiments.

At FIG. 6A, device 600 (e.g., a laptop computer) includes display 601, a mouse track pad 605, microphone 609, and keyboard 608. Keyboard 608 includes keys, such as keys 610a-610c. Keys 610a-610e will generate different content (e.g., alphanumeric text, symbols, or punctuation marks) based on what keyboard mode is currently active. To activate a particular keyboard mode, device 600 includes settings toolbar that includes keyboard mode affordance 603 that, when selected, causes display of keyboard menu 602. As illustrated, keyboard menu 602 includes English keyboard affordance 604 and Greek keyboard affordance 606, indicating English and Greek keyboards are installed (e.g., driver is installed) and/or are immediately available for activation for use on device 600 (e.g., and/or without any requiring any further input to install the keyboards). In some embodiments, device 600 has to detect one or more user inputs to install a particular keyboard mode in order for the keyboard mode to display the keyboard mode in keyboard menu 602. In some embodiments, device 600 includes one or more features of device 100, 300, and/or 500 (e.g., keyboard 608 is coupled to input controller(s) 160).

At FIG. 6A, when English keyboard affordance 604 is selected (and/or activated), device 600 generates an English letter (e.g., a, s, d, f, or g) in response to detecting an input via a respective key (key 610a, key 610b, key 610c, key 610d, or key 610e). When Greek keyboard affordance 606 is selected (and/or activated), device 600 generates a Greek letter (e.g., α, σ, δ, φ, or γ) in response to detecting an input via the respective key (key 610a, key 610b, key 610c, key 610d, or key 610c). In some embodiments, additional or alternative keyboard modes are activatable on device other than those depicted. In some embodiments, the same language includes different keyboard modes (e.g., compare a QWERTY keyboard to a QWERTZ keyboard or a AZERTY keyboard). In some embodiments, different languages do not have different keyboard modes (e.g., compare a QWERTY English keyboard to a QWERTY Brazilian keyboard).

Figures 8A, 8B:
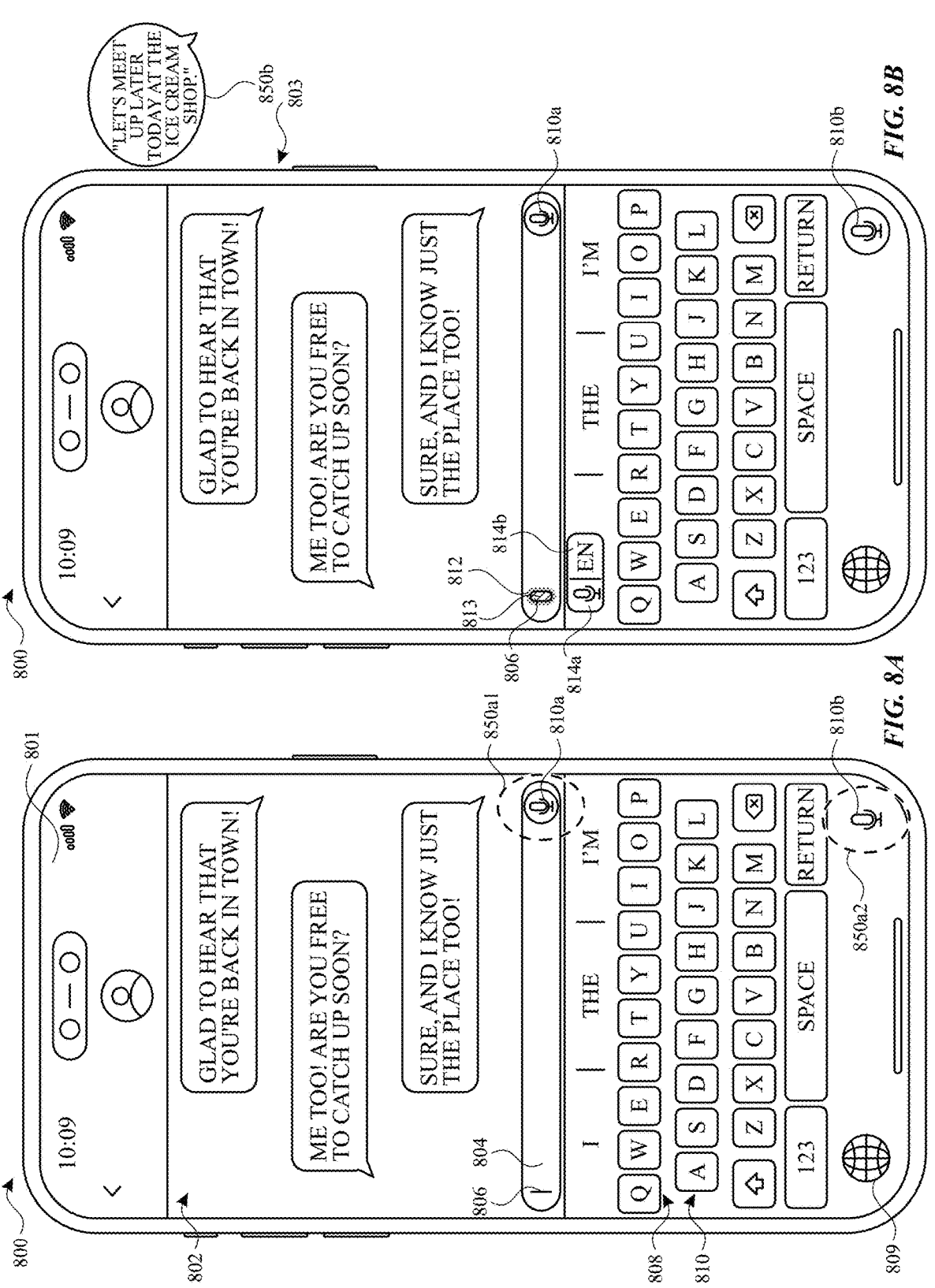

In some embodiments, device 600 includes a software keyboard, such as software keyboard 808 of FIG. 8A. In such embodiments, when English keyboard affordance 604 is selected (and/or activated), device 600 displays a set of electronic keys (e.g., English electronic keys 810 as shown in FIG. 8A). When Greek keyboard affordance 606 is selected (and/or activated), device 600 displays a different set of keys (e.g., Greek electronic keys as shown in FIG. 8F).

At FIG. 6A, device 600 displays application user interface 612 for a communication application (e.g., e-mail application). Device 600 detects an input 650a (e.g., a mouse click via mouse pointer 628, a gesture, and/or a speech input) directed at application user interface 612.

Figures 6C, 6D:
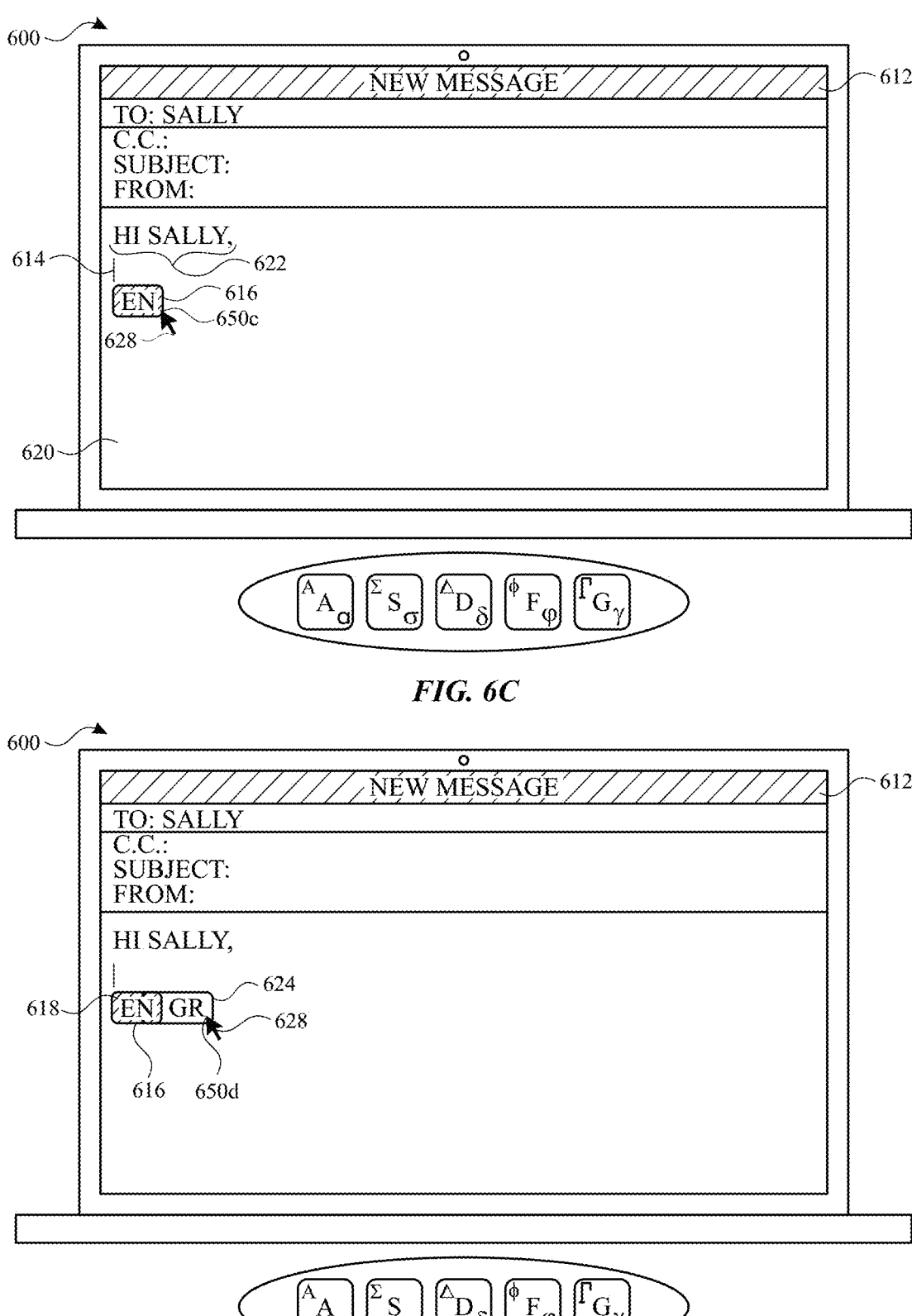

At FIG. 6B, in response to input 650a, device 600 displays text cursor 614 and English keyboard icon 616. Text cursor 614 indicates a location in which content will be added to text field 620 when input is detected via one or more input devices (e.g., keyboard 608 and/or microphone 609). English keyboard icon 616 indicates that the English keyboard (e.g., the keyboard mode corresponding to English keyboard affordance 604) is active. Accordingly, device 600 will add text corresponding to the English keyboard when input is detected via keyboard 608, such as via keys 610a-610e. As illustrated, English keyboard icon 616 is attached to the text cursor 614. For example, as depicted in FIGS. 6B-6C, English keyboard icon 616 moves as text cursor 614 moves. Additionally, as described herein, English keyboard icon 616 has different orientations (e.g., top, bottom, left, or right) relative to text cursor 614. In some embodiments, a keyboard icon (such as English keyboard icon 616) is (or is not) displayed if a threshold number (e.g., 1, 2, 3, and/or 4) of keyboard modes are available for selection keyboard menu 602, are available for activation, and/or are installed on device 600. In some embodiments, device 600 does not display English keyboard icon 616 if a threshold number of keyboard modes (e.g., 2, 3, and/or 4) are not installed or selectable by the user from keyboard menu 602.

At FIG. 6B, English keyboard icon 616 and application user interface 612 are depicted with hatching 618 to indicate that a color of English keyboard icon 616 corresponds to (e.g., is associated with, is based on, is the same as, and/or is similar to) a color associated with a window banner of the communication application. In some embodiments, the color of English keyboard icon 616 corresponds to a color of application user interface 612 and/or a color of an icon representing the communication application. In some embodiments, a color of text cursor 614 also corresponds to the color associated with the window banner of the communication application. In some embodiments, the color of text cursor 614 corresponds a color of the application user interface 612 and/or a color of an icon representing the communication application. In some embodiments, device 600 displays English keyboard icon 616 with the same (or, in some embodiments, different) color as text cursor 614. In some embodiments, device 600 changes the color of English keyboard icon 616 (and/or text cursor 614) when English keyboard icon 616 (and/or text cursor 614) is displayed in a text field of a different application (e.g., English keyboard icon 616 and/or text cursor 614 are displayed with a color that corresponds to the different application).

At FIG. 6B, while displaying application user interface 612, device 600 detects input 650b (e.g., a mouse click via mouse pointer 628, a gesture, and/or a speech input) corresponding to a request to expand application user interface 612. In response to detecting input 650b, device 600 displays application user interface 612 of FIG. 6C. Additionally, while displaying application user interface 612, device 600 detects keystroke input (e.g., input via keyboard 608 on keys 610a-610e and/or via keyboard 808 on electronic keys). In response detecting the keystroke input, device 600 displays content 622 of FIG. 6C.

At FIG. 6C, device 600 displays an expanded window of application user interface 612 as compared to the window of application user interface 612 of FIG. 6B. Application user interface 612 of FIG. 6C maintains display of English keyboard icon 616 despite the application user interface 612 of FIG. 6C hiding keyboard mode affordance 603 of FIG. 6A. Accordingly, a user can still view which keyboard mode is active.

At FIG. 6C, device 600 displays English keyboard icon 616 based on a position of text cursor 614 (and/or as content is added to text field 620). Text cursor 614 has moved from one position in FIG. 6B, to a new position as illustrated in FIG. 6C. In response to the change in position of text cursor 614, device 600 displays English keyboard icon 616 in a new position (compare the position of English keyboard icon 616 of FIG. 6B with the position of English keyboard icon 616 of FIG. 6B). At FIG. 6C, English keyboard icon 616 has the same orientation (e.g., below) with respect to text cursor 614 as does English keyboard icon 616 of FIG. 6B. In some embodiments, English keyboard icon 616 has a different orientation (e.g., above, to the left, or to the right) relative to text cursor 614 as text cursor 614 moves and/or based on surrounding content, as described with reference to FIG. 6L.

At FIG. 6C, application user interface 612 includes content 622 in text field 620. In some embodiments, while the keystroke input of FIG. 6B is being detected (and/or within a threshold amount of time since detecting the keystroke input of FIG. 6B), device 600 ceases to display English keyboard icon 616. In some embodiments, after the keystroke input of FIG. 6B is detected (and/or when the threshold amount of time since detecting the respective keystroke input has been met), device 600 redisplays English keyboard icon 616. In some embodiments, the threshold amount of time for redisplaying the keyboard icon is 0.5 seconds, 1 second, 2 seconds, 3 seconds, or 4 seconds. In some embodiments, the threshold amount of time for redisplaying the keyboard icon corresponds a time value that is selected from the range of 0.1 seconds to 1 second, or a time value that is selected from the range of 0.1 second to 4 seconds.

While displaying application user interface 612 of FIG. 6C, device 600 detects input 650c (e.g., a mouse click via mouse pointer 628, a gesture, and/or a speech input) directed at English keyboard icon 616. In response to detecting input 650c, device 600 displays Greek keyboard icon 624 of FIG. 6D.

At FIG. 6D, device 600 displays both English keyboard icon 616 and Greek keyboard icon 624. Similar to Greek keyboard affordance 606, selecting Greek keyboard icon 624 will activate the Greek keyboard mode such that device 600 will display Greek letters (e.g., α, σ, δ, φ, or γ) in response to detecting an input via keys 610a-610e. As illustrated, device 600 displays English keyboard icon 616 as having a different appearance (e.g., different color and/or shading) than Greek keyboard icon 624 to indicate the English keyboard is still active. For example, English keyboard icon 616 is displayed with hatching 618 while Greek keyboard icon 624 is displayed without hatching.

In some embodiments, device 600 displays an animated transition between FIGS. 6C-6D. In some embodiments, the animated transition includes gradually shifting Greek keyboard icon 624 (e.g., the Greek keyboard icon 624 is gradually shifted out from being hidden by English keyboard icon 616 to being positioned adjacent to English keyboard icon 616). In some embodiments, the animated transition includes gradually fading Greek keyboard icon 624 in (e.g., gradually increasing the opacity of Greek keyboard icon 624).

While displaying application user interface 612 of FIG. 6D, device 600 detects input 650d (e.g., a mouse click via mouse pointer 628, a gesture, and/or a speech input) directed at Greek keyboard icon 624. In response to detecting input 650d, device 600 activates the Greek keyboard (and/or deactivates the English keyboard).

Figures 6E, 6F:
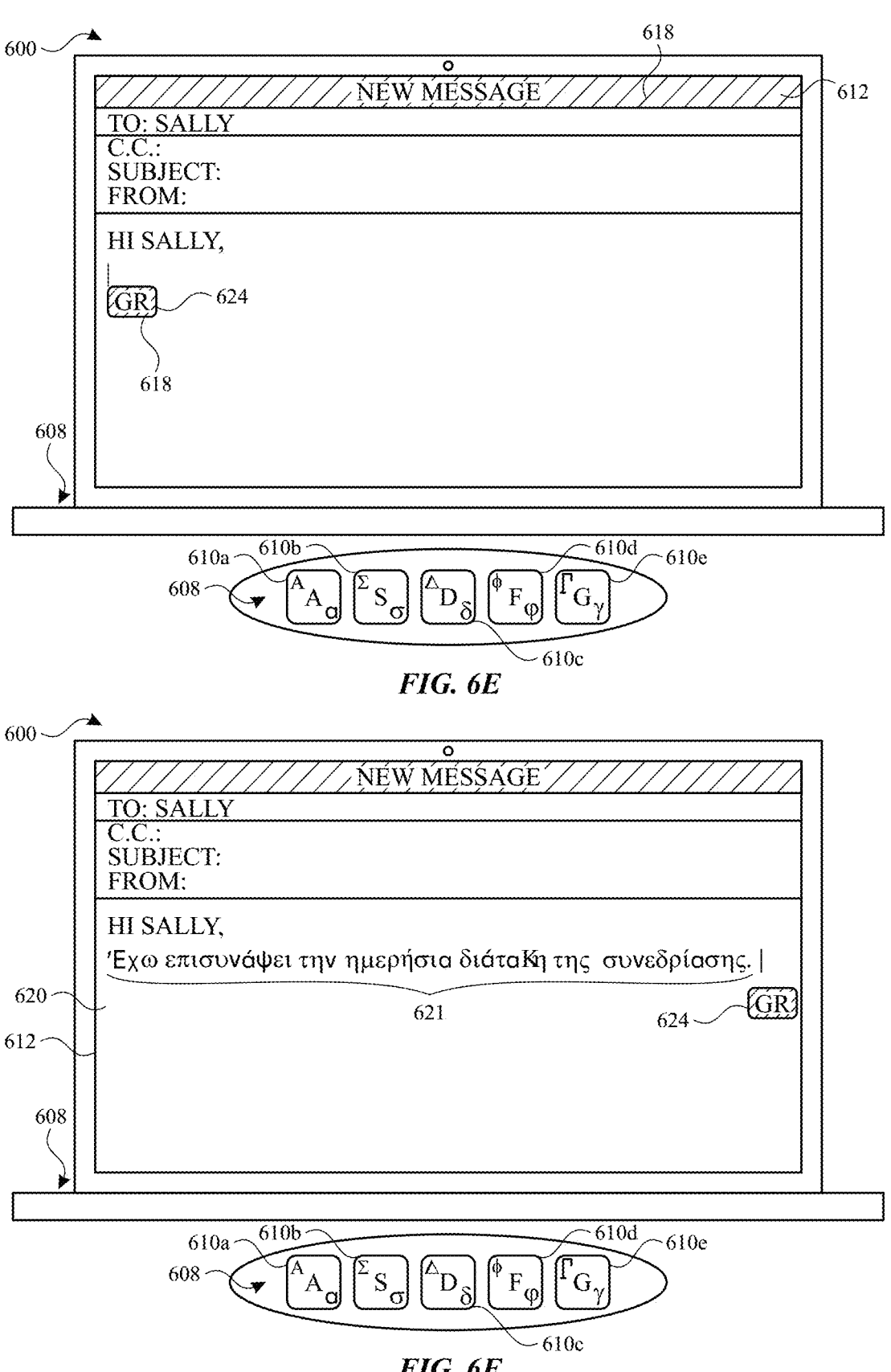

At FIG. 6E, device 600 displays Greek keyboard icon 624 and ceases to display English keyboard icon 616. As illustrated, Greek keyboard icon 624 is displayed with hatching 618, similar to hatching 618 of application user interface

612, to indicate that Greek keyboard icon 624 includes a color that corresponds to the color of application user interface 612. In some embodiments, Greek keyboard icon 624 is displayed in a portion of application user interface 612 that was previously occupied by English keyboard icon 616. In some embodiments, Greek keyboard icon 624 replaces English keyboard icon 616.

In some embodiments, device 600 displays an animated transition between FIGS. 6D-6E. In some embodiments, the animated transition includes gradually shifting Greek keyboard icon 624 (e.g., the Greek keyboard icon 624 is gradually shifted from being positioned adjacent to English keyboard icon 616 to being overlaid on or hiding English keyboard icon 616). In some embodiments, the animated transition includes gradually fading English keyboard icon 616 out (e.g., gradually decreasing the opacity of English keyboard icon 616).

In some embodiments, device 600 transitions from FIG. 6C to FIG. 6E in response to a single input. In such embodiments, device 600 detects a keyboard switch command (e.g., a selection of hotkey, a selection of a predetermined set of keys, a gesture, and/or a speech input). In response to detecting the keyboard switch command, device 600 displays an animated transition from FIG. 6C to FIG. 6E. In some embodiments, in response to detecting the keyboard switch command, device 600 does not display an animated transition from FIG. 6C to FIG. 6E. In some embodiments, device 600 does not display application user interface 612 of FIG. 6D (e.g., device 600 does not concurrently display English keyboard icon 616 and displays Greek keyboard icon 624), either during the animation or otherwise (e.g., in response to 650c). In such embodiments, device 600 cycles through the keyboard modes.

At FIG. 6E, while displaying application user interface 612 of FIG. 6D (e.g., and while the Greek keyboard is active), device 600 detects keystroke input (e.g., input via keyboard 608 on keys 610a-610e and/or via keyboard 808 on electronic keys). In response detecting the keystroke input, device 600 displays Greek content 621 of FIG. 6F.

At FIG. 6F, device 600 displays Greek content 621 ("Έχω επισυνάψει την ημερήσια διάταξη της συνεδρίασης") in text field 620 in response to detecting the keystroke input of FIG. 6E. In some embodiments, while the keystroke input of FIG. 6E is being detected (and/or the threshold amount of time for redisplaying the keyboard icon has not been met), device 600 ceases to display Greek keyboard icon 624, similar to what is described with respect to FIG. 6C regarding the English keyboard icon 616. In some embodiments, after the keystroke input of FIG. 6E is detected (and/or when the threshold amount of time has been met), device 600 redisplays Greek keyboard icon 624.

Figures 6G, 6H:
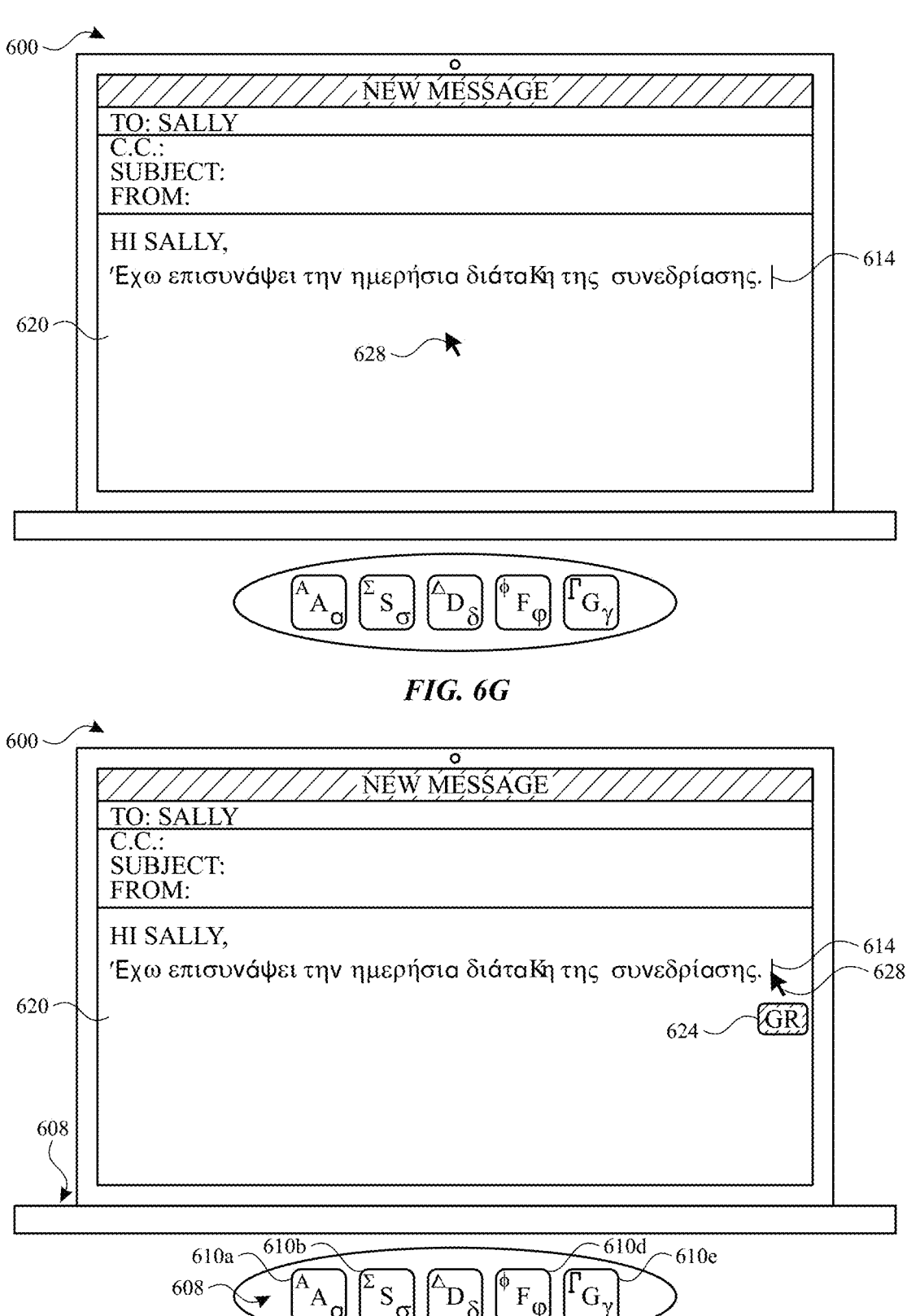

At FIG. 6G, device 600 displays text cursor 614 without displaying Greek keyboard icon 624 when specific conditions are met. In some embodiments, device 600 displays text cursor 614 without displaying Greek keyboard icon 624 (and/or English keyboard icon 616) when keystroke input is being detected and/or the threshold amount of time for redisplaying the keyboard icon has not been met. In some embodiments, device 600 ceases to display Greek keyboard icon 624 (and/or English keyboard icon 616) if text cursor 614 is not displayed. In such embodiments, device 600 does not display text cursor 614 when device 600 is not in a mode to add content to text field 620 (e.g., the user has selected a menu, which causes device 600 to not display text cursor 614, as illustrated in FIG. 6A). In some embodiments, device 600 temporarily ceases to display Greek keyboard icon 624 (and/or English keyboard icon 616) after a threshold period of inactivity (e.g., a lack of input has been detected) has been met (e.g., 30 seconds, 1 minutes, and/or 5 minutes). In some embodiments, device 600 ceases to display, at least temporarily, Greek keyboard icon 624 (and/or English keyboard icon 616) when a dictation mode is active, while microphone affordance 814*a* is displayed, and/or while English dictation language affordance 814*b* is displayed.

At FIG. 6G, while displaying text cursor 614, device 600 detects a triggering event. In response to the triggering event, device 600 displays Greek keyboard icon 624, as illustrated in FIG. 6H. In some embodiments, the triggering event includes a request to display Greek keyboard icon 624 (e.g., a gesture, and/or a speech input). In some embodiments, the triggering event includes a movement of mouse pointer 628 to correspond to a location of text cursor 614 (e.g., so as to hover over text cursor 614). In some embodiments, the triggering event includes detecting that an input device (e.g., an external keyboard and/or not an external keyboard) has been connected to device 600. In some embodiments, the triggering event includes detecting that gibberish or nonsense (e.g., for the currently selected language) has been typed (e.g., because the user thought a different keyboard mode was active). In some embodiments, device 600 detects that gibberish has been typed based on specific conditions being met (such as a detected amount of the spelling and/or grammatical errors). In some embodiments, the triggering event includes detecting that a threshold period of inactivity has been met (e.g., device 600 has not detected keystroke input, an utterance, and/or other input). In some embodiments, the triggering event includes detecting that Greek keyboard icon 624 has not been displayed for a threshold amount of time (e.g., 10 seconds, 30 seconds, 1 minute, and/or 5 minutes).

At FIG. 6H, while displaying Greek keyboard icon 624, device 600 detects an input corresponding to a request to change keyboard input modes (e.g., a mouse selection, a gesture, and/or a speech input). In some embodiments, the input corresponding to the request to change keyboard input modes includes a set of inputs directed at Greek keyboard icon 624 and/or English keyboard icon 616 (similar to the inputs of input 650*c* and input 650*d* described with reference to FIGS. 6C and 6D). In some embodiments, the input corresponding to the request to change keyboard input modes includes a selection of a hotkey and/or a change in system setting. In response to detecting the input corresponding to a request to change keyboard input modes, device 600 displays an English keyboard icon similar to English keyboard icon 616 of FIG. 6J.

At FIG. 6H, device 600 also detects keystroke input (e.g., input via keyboard 608 on keys 610*a*-610*e* and/or via keyboard 808 on electronic keys) while device 600 is in the English keyboard mode. In response detecting the keystroke input, device 600 displays English content 623 of FIG. 6I.

Figures 6I, 6J:
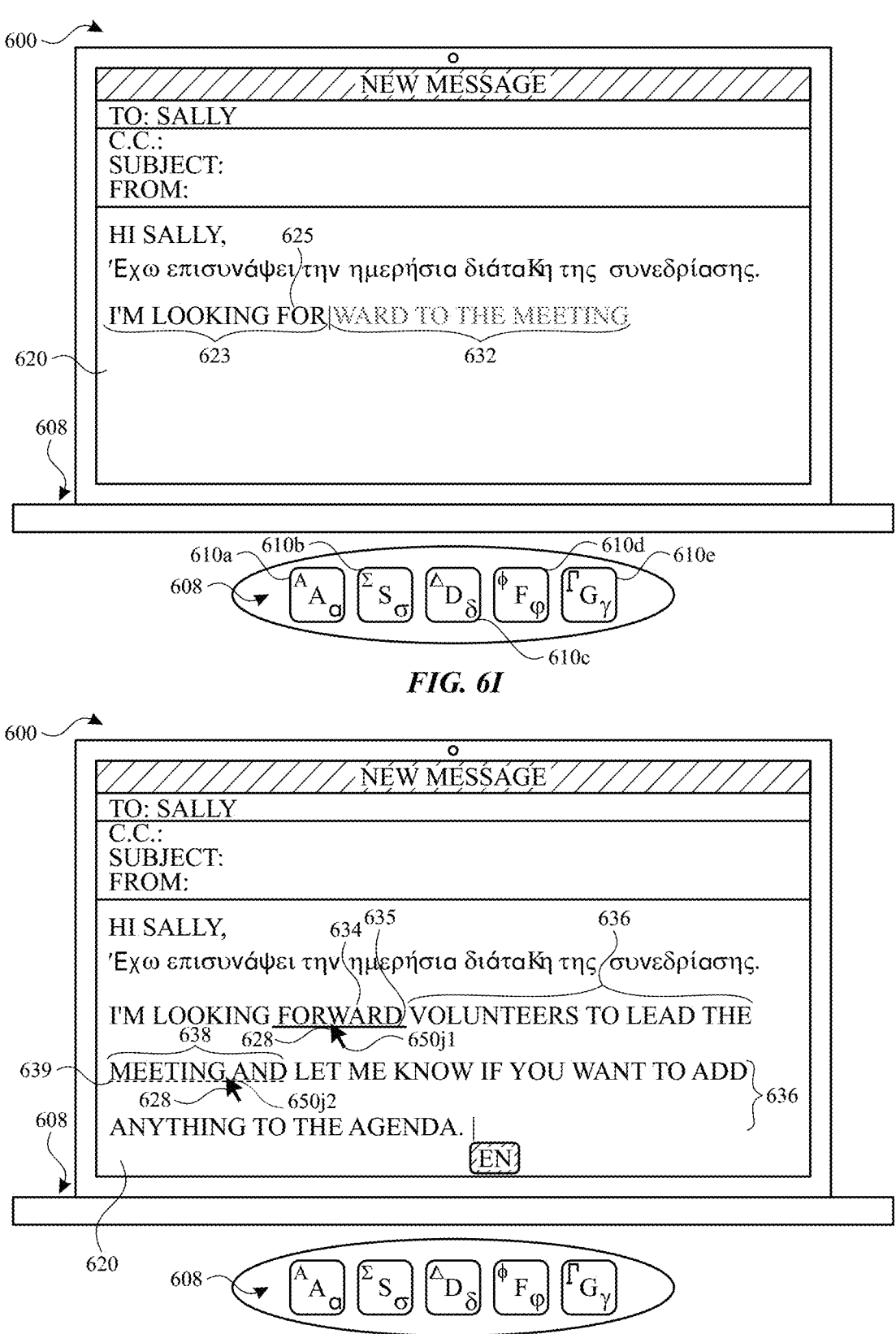

At FIG. 6I, device 600 displays English content 623 ("I'm looking for") in text field 620. Additionally, device 600 does not display English keyboard icon 616 at FIG. 6I in response to detecting keystroke input and/or detecting that the threshold amount of time for redisplaying the keyboard icon has been met (as described with respect to FIGS. 6C, 6F, and 6G).

At FIG. 6I, device 600 also displays predicted content 632. Device 600 displays predicted content 632 as having a lighter (e.g., grayed out and/or faded) appearance than the appearance of English content 623 to indicate that it is predicted text. In some embodiments, predicted content 632 is accepted sequentially (e.g., in response to device 600 detecting separate inputs over time). For example, in some embodiments, a prediction for a remaining portion ("ward") of initially typed word 625 ("for") is accepted in response to device 600 detecting a single input (e.g., keystroke input on keyboard 608, mouse click, and/or tap). In some embodiments, a prediction for the next predicted word ("to") is accepted in response to device 600 detecting another single input (e.g., keystroke input on keyboard 608, mouse click, and/or tap). In some embodiments, a prediction for the next predicted word (e.g., "the") is accepted in response to device 600 detecting yet another single input (e.g., keystroke input on keyboard 608, mouse click, and/or tap) and so on.

At FIG. 6I, in some embodiments, device 600 sequentially deletes content that has been accepted. In some embodiments, device 600 sequentially deletes predicted content 632 after it has been accepted and in response to detecting separate inputs over time. For example, in some embodiments, the accepted word "the" is deleted in response to device 600 detecting a single input (e.g., keystroke input on keyboard 608, mouse click, and/or tap). In some embodiments, the accepted word "to" is deleted in response to device 600 detecting another single input (e.g., keystroke input on keyboard 608, mouse click, and/or tap). In some embodiments, the accepted remaining portion ("ward") of initially typed word 625 ("for") is deleted in response to device 600 detecting yet another single input (e.g., keystroke input on keyboard 608, mouse click, and/or tap). In some embodiments, after the accepted predicted text has been deleted, a single input (e.g., keystroke input on keyboard 608, mouse click, and/or tap) will delete a single character at a time.

At FIG. 6I, while displaying predicted content 632, device 600 detects an input (e.g., a mouse click, a gesture, a speech input, and/or keystroke) accepting at least a portion of predicted content 632 (e.g., user accepts predicted remaining portion "ward" in the word "forward"). In response to an input accepting at least a portion of predicted content 632, device 600 displays accepted content 634 of FIG. 6J. Additionally, device 600 detects keystroke input (e.g., input via keyboard 608 on keys 610*a*-610*e* and/or via keyboard 808 on electronic keys). In response to detecting the keystroke input, device 600 displays content 636 of FIG. 6J.

At FIG. 6J, device 600 displays accepted content 634 ("forward") as being distinguished from non-accepted content, such as the words "volunteers to lead" in content 636. As illustrated, device 600 displays accepted content 634 with solid line 635. In some embodiments, accepted content 634 is highlighted and/or displayed with additional and/or different graphical elements. In some embodiments, device 600 displays accepted content 634 as being distinguished until specific conditions are met. In some embodiments, device 600 displays accepted content 634 as being distinguished until a threshold number of words (e.g., 2 words, 5 words, or 10 words) (and/or characters) are added after accepted content 634 has been accepted. In such embodiments, device 600 ceases to distinguish accepted content 634 after the word "lead" has been added to text field 620. In some embodiments, device 600 displays accepted content 634 as being distinguished until a threshold amount of time (e.g., 1 minute, 4 minutes, or 7 minutes) has been met since the time accepted content 634 was accepted. Distinguishing the accepted content 634 from non-accepted content allows the user to quickly identify what content was added in response to an accepted prediction in case the user did not intend to accept the predicted content.

At FIG. 6J, device 600 distinguishes words surrounding a grammatical error. As illustrated, device 600 distinguishes content 638 ("meeting and") from other content in content 636 that are not associated with a grammatical error (e.g., "volunteers to lead"). As illustrated, device 600 displays content 638 with dotted line 639. In some embodiments, content 638 is highlighted and/or displayed with additional and/or different graphical elements. Device 600 also distinguishes content 638 in response to detecting a grammatical error and/or detecting that different text should be suggested. Device 600 distinguishes content 638 in response to detecting that device 600 should suggest adding a comma between the words "meeting" and "and" to separate two clauses. In some embodiments, device 600 distinguishes accepted content 634 ("forward") from other content in content 636 that are not associated with a grammatical error (e.g., "volunteers to lead"). In such embodiments, accepted content 634 is displayed with a dotted line similar to dotted line 639 (or some other graphical element) to indicate that it is associated with a grammatical error. As described herein, accepted content 634 ("forward") is illustrated with a solid line 635 to indicate that it is accepted content. In some embodiments, device 600 displays content that is both accepted content and corresponding with a grammatical error with a graphical element that is in addition to or different from a dotted line and/or solid line (e.g., a solid line with a highlight and/or a semi-dashed line) to indicate that it is was both accepted content and associated with a grammatical error.

At FIG. 6J, device 600 detects input 650j1 (e.g., a mouse click via mouse pointer 628, a gesture, and/or a speech input) directed at accepted content 634 ("forward"). In response to detecting input 650j1, device 600 displays reversion affordance 640 of FIG. 6K. In some embodiments, device 600 detects input 650j1 while accepted content 634 is being distinguished from other content. In some embodiments, device 600 detects input 650j1 while accepted content 634 is not being distinguished from other content (e.g., because a threshold number of words has been met and/or the threshold amount of time has been met). Additionally, at FIG. 6J, device 600 detects input 650j2 (e.g., a mouse click via mouse pointer 628, a gesture, and/or a speech input) directed at content 638 ("meeting and"). In response to detecting input 650j2, device 600 displays grammar suggestion affordance 642 of FIG. 6K. In some embodiments, device 600 detects input 650j2 while content 638 is being distinguished from other content. In some embodiments, device 600 detects input 650j1 while content 638 is not being distinguished from other content.

Figures 6K, 6L:
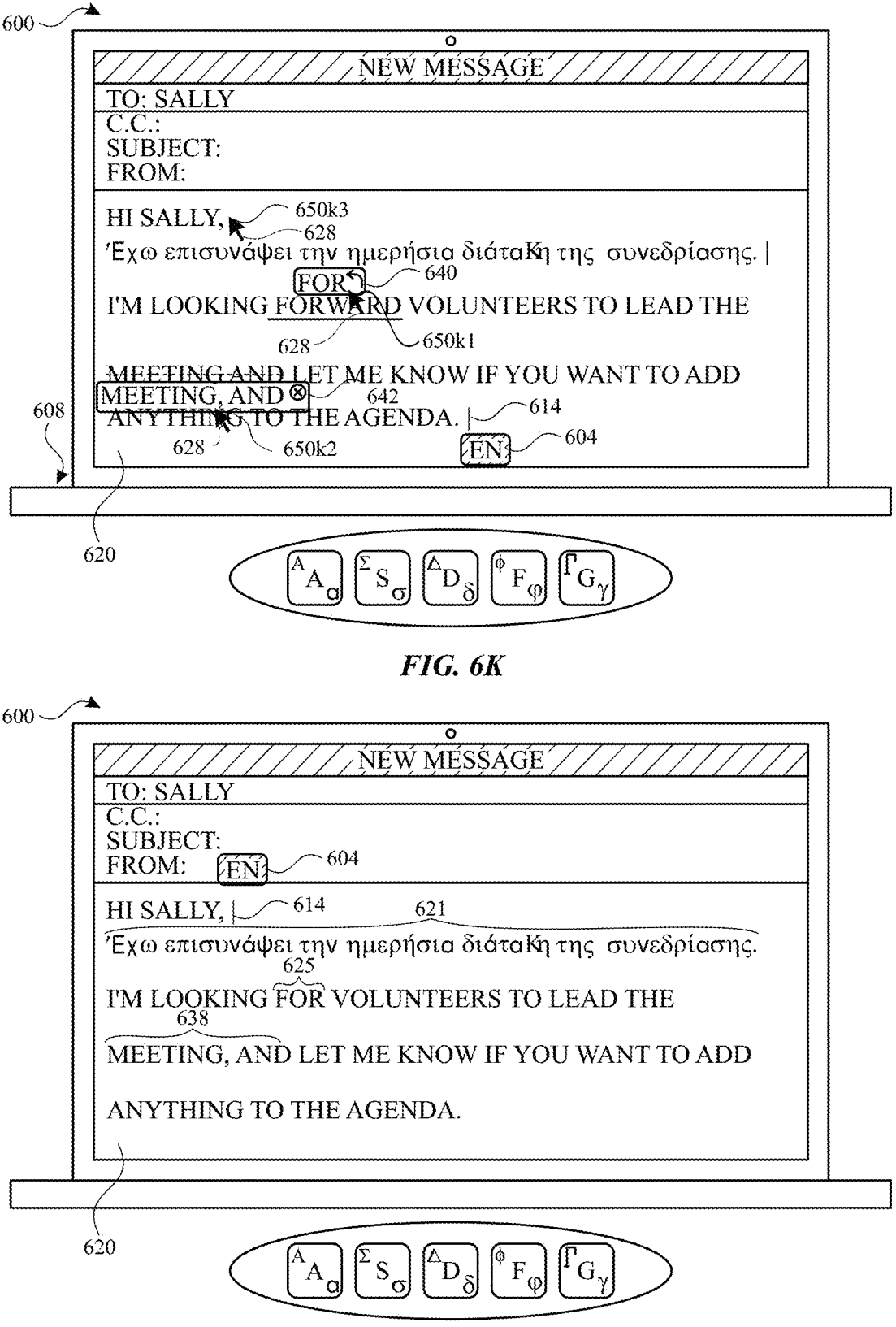

At FIG. 6K, device 600 displays reversion affordance 640 and grammar suggestion affordance 642. Reversion affordance 640 includes an indication of initially typed word 625. Grammar suggestion affordance 642 includes content 638 with a suggested comma separating content 638. As illustrated, reversion affordance 640 and grammar suggestion affordance 642 are displayed inline (e.g., in text field 620 and/or adjacent to accepted content 634 and content 638 respectively). In some embodiments, reversion affordance 640 and grammar suggestion affordance 642 are displayed in an additional and/or alternative locations, such as a suggestions bar that is in a different location than the text field (e.g., in another portion of a user interface and/or in a suggestions bar on a surface of the keyboard 608).

At FIG. 6K, device 600 detects input 650k1 (e.g., a mouse click via mouse pointer 628, a gesture, and/or speech input) directed at reversion affordance 640. Device 600 also detects input 650k2 (e.g., a mouse click, a gesture, and/or speech input) directed at grammar suggestion affordance 642.

Device 600 also detects input 650k3 (e.g., a mouse click, a gesture, and/or speech input) corresponding to a request to move text cursor 614.

At FIG. 6L, in response to detecting input 650k1 directed at reversion affordance 640, device 600 reverts accepted content 634 ("forward") to initially typed word 625 ("for"). Device 600 also stops distinguishing initially typed word 625 from other content in text field 620. In response to detecting input 650k2 directed at grammar suggestion affordance 642, device 600 accepts the suggestion of adding a comma between content 638 ("meeting and"). Device 600 also stops distinguishing content 638 from other content in text field 620 that is not associated with a grammatical error.

At FIG. 6L, in response to input 650k3 corresponding to a request to move text cursor 614, device 600 displays text cursor 614 and English keyboard icon 616 at a new location as compared to the location of text cursor 614 and English keyboard icon 616 in FIG. 6K. At FIG. 6L, device 600 displays English keyboard icon 616 as having a different orientation relative to text cursor 614 as compared to the orientation of English keyboard icon 616 relative to text cursor 614 in FIG. 6K. In some embodiments, device 600 displays English keyboard icon 616 at a respective orientation (e.g., above, below, left, and/or right) when different conditions are met (e.g., if English keyboard icon 616 would hide a button and/or if English keyboard icon 616 would be displayed off-screen). At FIG. 6L, device 600 displays English keyboard icon 616 above text cursor 614 so as to not hide Greek content 621.

At FIG. 6L, in some embodiments, device 600 displays an inline emoji menu, such as, in response to a request to display an emoji menu (e.g., a tap input on an emoji menu button, a selection of a hotkey and/or a set of predetermined keys). In such embodiments, device 600 detects whether a respective word that is adjacent to (e.g., that precedes or is next to) text cursor 614 corresponds to (e.g., is associated with or matches) one or more respective emojis associated with (e.g., installed on or loaded on) device 600. If so, device 600 displays a respective emoji in the inline emoji menu as a suggested emoji that the user can select and insert the respective emoji in text field 620. If not, device 600 does not display the respective emoji. In some embodiments, if the word does correspond to any respective emojis associated with device 600, device 600 displays an emoji (e.g., a frequently used emoji and/or a most recently used emoji) other than the respective emoji. In some embodiments, device 600 concurrently displays, in the inline emoji menu, the respective as a suggested emoji with an affordance to display an expanded emoji menu (e.g., a menu including a different emoji that is not included in the inline emoji menu). In some embodiments, device 600 replaces the respective word with the respective emoji based on a position of text cursor 614 relative to the respective word. In some embodiments, if the respective word immediately precedes text cursor 614 (and/or is not separated from text cursor 614 by a space character), device 600 replaces the respective word with the respective emoji. In such embodiments, device 600 displays an indication (e.g., highlighting, underline, and/or glow) that the respective word is going to be replaced by the emoji while device 600 displays the emoji menu. In some embodiments, if the respective word does not immediately precede text cursor 614 (and/or is separated from text cursor 614 by a space character), device 600 does not replace the respective word with the respective emoji. In such embodiments, device 600 does not display an indication that the respective word is going to be replaced.

FIG. 7 is a flow diagram illustrating a method for displaying a keyboard mode icon a using a computer system, in accordance with some embodiments. Method 700 is performed at a computer system (e.g., 100, 300, 500, 600, and/or 800) (e.g., a smartwatch, a smartphone, a tablet computer, a head mounted device (e.g., a head mounted augmented reality and/or extended reality device), and/or a laptop computer) that is in communication with a display generation component (e.g., 601 and/or 801) (e.g., a display controller, a head mounted display system, a touch-sensitive display system, and/or a monitor). Some operations in method 700 are, optionally, combined, the orders of some operations are, optionally, changed, and some operations are, optionally, omitted.

As described below, method 700 provides an intuitive way for displaying a keyboard mode icon. The method reduces the cognitive burden on a user for determining which keyboard mode is active, thereby reducing input errors and creating a more efficient human-machine interface. For battery-operated computing devices, enabling a user to search for relevant medications faster and more efficiently conserves power and increases the time between battery charges.

The computer system displays (702), via the display generation component, a user interface (e.g., 612 and/or 802) (e.g., a user interface of an application) including an insertion point indicator (e.g., 614 and/or 806) (e.g., a caret or text cursor that demarks where content will be inserted) at a first location (e.g., within an input field of the user interface). Displaying the user interface includes, in accordance with a determination that a first set of criteria is satisfied, wherein the first set of criteria includes a criterion that a first keyboard mode (e.g., the English keyboard mode associated with 604 and/or 616; the Greek keyboard mode associated with 606 and/or 624) (e.g., a first keyboard layout and/or a first keyboard for a first language) is active, displaying (704), via the display generation component, a first keyboard mode indicator (e.g., 616 and/or 624) (e.g., a graphical element or a user interface selectable object) (e.g., that indicates the first keyboard mode is active) at a location (e.g., the location of 616 and/or 624 in FIGS. 6B-6F, 6H, and 6J-6L) (e.g., position or orientation) associated with (e.g., corresponding to or defined at least in part by) a location of the insertion point indicator (e.g., the location of 614 in FIGS. 6B-6F, 6H, 6J-6L, 8A-8F, and 8I-8K) (in some embodiments, the of the first keyboard mode indicator moves as the insertion point indicator moves). Displaying the user interface also includes, in accordance with a determination that a second set of criteria is satisfied, wherein the second set of criteria includes a criterion that a second keyboard mode (e.g., the English keyboard mode associated with 604 and/or 616; the Greek keyboard mode associated with 606 and/or 624) (e.g., a second keyboard layout and/or a second keyboard for a second language) is active, displaying (706), via the display generation component, a second keyboard mode indicator (e.g., 616 and/or 624) (e.g., a graphical element or a user interface selectable object) (e.g., that indicates the second keyboard mode is active) at the location associated with the first location of the insertion point indicator, wherein the second keyboard mode is different (e.g., QWERTY as compared to QWERTZ or AZERTY) (e.g., a respective key on the different types of keyboards corresponds to a different character) from the first keyboard mode (e.g., 610a-610e of 608 causes device 600 to display different content depending on whether the English keyboard mode associated with 604 (or 616) or the Greek keyboard mode associated with 606 (or 624) are activated as discussed with respect to and illustrated in FIGS. 6A-6H; and/or 808 includes English electronic keys in FIG. 8E as compared to 808 including Greek electronic keys in FIG. 8F). In some embodiments, the insertion point indicator indicates a location in which content (e.g., alphanumerical text, image, object, or symbol) will be (or is) inserted. In some embodiments, the computer system is in communication with one or more input devices (e.g., a touch-sensitive surface, a keyboard, a controller, a rotatable input device, microphone, and/or a mouse) that detects user input that is added as content (e.g., alphanumerical text, an image, an object, and/or a symbol) to the location associated with the location of the insertion point indicator. In some embodiments, a location of the insertion point indicator is updated as content is added. In some embodiments, the different types of keyboard layouts are specific layouts for specific languages (e.g., English, German, Chinese, or Korean). In some embodiments, the first keyboard mode corresponds to a keyboard mode in which a keyboard function (e.g., caps lock) is active and the second keyboard mode corresponds to a keyboard mode in which the keyboard function (e.g., caps lock) is inactive, or vice versa. In some embodiments, the first keyboard mode indicator is not displayed while the second keyboard mode indicator is displayed, or vice versa (e.g., only one indicator is displayed at a time). In some embodiments, in accordance with a determination that the first set of criteria (and/or the second set of criteria) is not satisfied, the first keyboard mode indicator (and/or the second keyboard mode indicator) is not displayed. In some embodiments, displaying the first keyboard mode indicator at the location associated with the first location of the insertion point indicator occurs while a dictation mode is inactive. In some embodiments, displaying the second keyboard mode indicator at the location associated with the first location of the insertion point indicator occurs while a dictation mode is inactive. Displaying a first keyboard mode indicator or a second keyboard mode indicator at a location associated with the first location of the insertion point indicator based on satisfying criteria improves the computer system because it performs an operation when a set of conditions has been met without requiring further user input, provides visual feedback of which keyboard mode is active if the user desires to change the keyboard mode, and provides a relevant location of the keyboard mode indicator (e.g., since the location of keyboard mode indicator is associated with the location of the insertion point).

In some embodiments, the first keyboard mode indicator is a first selectable object (e.g., 616 and 624 are selectable as described with respect to FIGS. 6C-6D, and 6H) (e.g., affordance and/or button). In some embodiments, the second keyboard mode indicator is a second selectable object (e.g., 616 and 624 are selectable as described with respect to FIGS. 6C-6D, and 6H). In some embodiments, in accordance with a determination that the first selectable object is selected (e.g., and while the first selectable object is displayed in the user interface), the computer system displays a selectable object (e.g., the second selectable object and/or a selectable object different from the second selectable object) that initiates a process (e.g., initiates the display of additional keyboard modes in response an input on 616 and/or 624 and/or automatically changes or cycles through different keyboard modes in response an input on 616 and/or 624) for activating a keyboard mode (e.g., the English keyboard mode associated with 604 and/or 616; the Greek keyboard mode associated with 606 and/or 624; and/or keyboard mode such as an QWERTY keyboard, an QWERTZ keyboard, or an AZERTY keyboard; and/or a keyboard mode for a language different from English or Greek) different from the first keyboard mode (e.g., the second keyboard mode and/or a keyboard mode different from the second keyboard mode). In some embodiments, in accordance with a determination that the second selectable object is selected (e.g., and while the second selectable object is displayed in the user interface), the computer system displays a selectable object (e.g., the first selectable object and/or a selectable object different from the first selectable object) that initiates a process (e.g., initiates the display of additional keyboard modes in response an input on 616 and/or 624 and/or automatically changes or cycles through different keyboard modes in response an input on 616 and/or 624) for activating a keyboard mode (e.g., the English keyboard mode associated with 604 and/or 616; the Greek keyboard mode associated with 606 and/or 624; and/or keyboard mode such as an QWERTY keyboard, an QWERTZ keyboard, or an AZERTY keyboard; and/or a keyboard mode for a language different from English or Greek) different from the second keyboard mode (e.g., the first keyboard mode and/or a keyboard mode different from the first keyboard mode). Conditionally displaying a selectable object that initiates a process for activating a keyboard mode different from the first or second keyboard mode improves the computer system because it automatically performs an operation when certain conditions are met, and a user can quickly and efficiently change the keyboard mode when needed.

In some embodiments, displaying the user interface includes, in accordance with a determination that a third set of criteria is satisfied, wherein the third set of criteria includes a criterion that a dictation mode (e.g., a speech input mode and/or audio input mode) is active (e.g., the dictation mode of FIGS. 8A-8I), displaying, via the display generation component, a dictation indicator (e.g., 614a and/or 614b) (e.g., a graphical element or a user interface selectable object) (e.g., that indicates the dictation mode is active) at a location (e.g., location of 614a and/or 614b in FIGS. 8B, 8E, 8F, 8G, and/or 8I) (e.g., position or orientation) associated with (e.g., corresponding to or defined at least in part by) a location of the insertion point indicator (e.g., location of 812 in FIGS. 8B, 8E, and/or 8F) (in some embodiments, the of the dictation mode indicator moves as the insertion point indicator moves). In some embodiments, the dictation indicator is concurrently displayed with the first keyboard mode indicator (or second keyboard mode indicator) when the first set of criteria (or second set of criteria) and the third set of criteria are satisfied. In some embodiments, the computer system detects the activation of the dictation mode while the first keyboard mode indicator (or second keyboard mode indicator) and, in response, ceases to display first keyboard mode indicator (or second keyboard mode indicator) and displays the dictation mode indicator. In some embodiments, the computer system displays the dictation mode indicator in a portion of the user interface previously occupied by the first keyboard mode indicator (or second keyboard mode indicator). Conditionally displaying the dictation indicator at a location associated with a location of the insertion point indicator when the third set of criteria is satisfied improves the computer system because a user can quickly and efficiently view which type of input mode is active and because it automatically performs an operation without further user input.

In some embodiments, while displaying the first keyboard mode indicator, the computer system detects, via one or more input devices, a request to change from the first keyboard mode to a third keyboard mode different from the first keyboard mode (e.g., 650c, 650d, 850f, and/or 850c2). In response to detecting the request to change from the first keyboard mode to the third keyboard mode, the computer system changes from the first keyboard mode to the third keyboard mode (e.g., changing from English keyboard mode to Greek keyboard mode as described in reference to FIGS. 6B-6F; and/or changing 808 from English electronic keys in FIG. 8E to Greek electronic keys in FIG. 8F). In response to detecting the request to change from the first keyboard mode to the third keyboard mode, the computer system ceases display of the first keyboard mode indicator (e.g., 616 is not displayed in FIG. 6E, 624 is not displayed in FIGS. 6K and/or 6L). In response to detecting the request to change from the first keyboard mode to the third keyboard mode, the computer system displays, via the display generation component, a third keyboard mode indicator (e.g., different from the first keyboard mode indicator) corresponding to the third keyboard mode (e.g., 616 is displayed in FIGS. 6B-6C, and/or 6K-6L; 624 is displayed in FIGS. 6E-6F, and/or 6H). Ceasing display of the first keyboard mode indicator and displaying the third keyboard mode indicator in response to detecting the request to change from the first keyboard mode to the third keyboard mode improves the computer system because it provides visual feedback that a change in keyboard modes has occurred.

In some embodiments, in response to detecting the request to change from the first keyboard mode to the third keyboard mode, and prior to ceasing displaying the first keyboard mode indicator, the computer system changes (e.g., an animated change and/or a gradual change) the first keyboard mode indicator from having a first visual characteristic (e.g., color, shape, and/or size) to having a second visual characteristic (e.g., color, shape, and/or size) different from the first visual characteristic (e.g., English keyboard icon 616 has a different appearance than hatching 618 and/or an appearance of similar to Greek keyboard icon 624 in FIG. 6D to indicate that English keyboard icon 616 is not active). In some embodiments, in response to detecting the request to change from the first keyboard mode to the third keyboard mode, and prior to ceasing displaying the first keyboard mode indicator, the computer system changes the third keyboard mode indicator from having a third visual characteristic (e.g., color, shape, and/or size) to having a fourth visual characteristic (e.g., color, shape, and/or size) different from the third visual characteristic (e.g., Greek keyboard icon 624 is displayed with hatching 618 and/or an appearance of similar to English keyboard icon 616 in FIG. 6D to indicate that Greek keyboard icon 624 is active). In some embodiments, the fourth visual characteristic is the same as (or different from) the first visual characteristic (e.g., the initial appearance of the first keyboard mode indicator is the same as or different the final appearance of the third keyboard mode indicator). In some embodiments, the third visual characteristic is the same as (or different from) the second visual characteristic (e.g., the final appearance of the first keyboard mode indicator is the same or different from as the initial appearance of the third keyboard mode indicator). In some embodiments, displaying the third keyboard mode indicator includes displaying an animated transition of the first keyboard mode indicator being replaced by the third keyboard mode indicator. Changing the first keyboard mode indicator from having a first visual characteristic to a second visual characteristic different from the first visual characteristic and changing the third keyboard mode indicator from having a third visual characteristic to a fourth visual characteristic different from the third visual characteristic in response to the request to change the keyboard mode improves the computer system because it provides visual feedback that a change in keyboard modes has occurred.

In some embodiments, the computer system displays the first keyboard mode indicator (or the second keyboard mode indicator) at a first location (e.g., the location of 616 and/or 624 in FIGS. 6B-6F, 6H, and 6J-6L) (e.g., in an input field and/or in an editable document). In some embodiments, the computer system detects, via one or more input devices (e.g., a touch-sensitive surface, a keyboard, a controller, a rotatable input device, microphone, and/or a mouse), an input corresponding a request to add content (e.g., the keystroke input described with reference to FIGS. 6C, 6E, and/or 6I) (e.g., alphanumerical text, an image, an object, and/or a symbol). In some embodiments, in response to detecting the input corresponding the request to add content, the computer system displays the content (e.g., 622, 623, and/or 636) and displays the first keyboard mode indicator (or the second keyboard mode indicator) at a second location (e.g., the location of 616 and/or 624 in FIGS. 6B-6F, 6H, and/or 6J-6L) (e.g., in an input field and/or in an editable document) different from the first location. Displaying content and the first keyboard mode indicator at a second location different from the first location in response to detecting the input corresponding the request to add content improves the computer system because it updates the position of the keyboard mode indicator when content is added, ensuring that a user can easily view what keyboard mode is active.

In some embodiments, the first set of criteria includes (in some embodiments, the second set of criteria also includes) a criterion that is satisfied when at least two different keyboard modes are enabled on (e.g., added to and/or enabled as a keyboard mode option on) the computer system (e.g., as described in reference to FIG. 6A, for example, where the English keyboard mode and the Greek keyboard mode are displayed as illustrated by 604 and/or 606) (e.g., by a user) (e.g., via a keyboard setting and/or keyboard layout menu). Including a criterion in the first set of criteria (and/or the second set of criteria) that is satisfied when at least two different keyboard modes are enabled on the computer system improves the computer system because would reduce the number of instances the first keyboard mode indicator and the second keyboard mode indicator are displayed, thereby decluttering the user interface.

In some embodiments, the first set of criteria includes (in some embodiments, the second set of criteria also includes) a criterion that is satisfied when the computer system detects a change in an input mode (e.g., as described with reference to FIGS. 6G-6E and/or the change in the English keyboard mode to or from the Greek keyboard mode as described with reference to FIG. 8E) (e.g., to the first keyboard mode and/or from the first keyboard mode to a different input mode, such as a different keyboard mode and/or dictation mode). In some embodiments, the second set of criteria includes a criterion that is satisfied when the computer system detects a change in an input mode to the second keyboard mode and/or from the second keyboard mode a different input mode, such as a different keyboard mode and/or dictation mode. Including a criterion in the first set of criteria (and/or second set of criteria) include that is satisfied when the computer system detects a change in an input mode improves the computer system because it provides visual feedback that a change in keyboard modes has occurred.

In some embodiments, the first set of criteria includes (in some embodiments, the second set of criteria also includes) a criterion that is satisfied when the computer system detects an absence of user input of a first type (e.g., a lack of input detected by a keyboard, dictation, and/or a lack of typing) for a threshold period of time (e.g., as described in reference to FIGS. 6F-6G, for example, when a lack of input is detected after detecting the keystroke input that causes display of content 621) (e.g., 5 seconds, 10 seconds, and/or 1 minute). Including a criterion that is satisfied when the computer system detects a lack of user input for a threshold period of time improves the computer system because it provides visual feedback that reminds the user what keyboard mode is actively employed by the computer system.

In some embodiments, the first set of criteria includes (in some embodiments, the second set of criteria also includes) a criterion that is satisfied when content generated by an active keyboard input mode (e.g., a currently enabled keyboard input mode and/or a keyboard input mode currently being used to generate content) meets an error threshold (e.g., a grammatical or spelling error as described with reference to FIG. 6G) (e.g., the content is gibberish and/or nonsense). In some embodiments, the content generated by the active keyboard input mode meets an error threshold when a predefined number of grammatical errors (e.g., misspellings and/or punctuation errors) occur. Including a criterion that is satisfied when content generated by an active keyboard input mode (e.g., a currently enabled keyboard input mode and/or a keyboard input mode currently being used to generate content) meets an error threshold improves the computer system because it provides visual feedback of what keyboard mode is actively employed by the computer system so that the user can change the input mode if needed.

In some embodiments, the first set of criteria includes (in some embodiments, the second set of criteria also includes) a criterion that is satisfied when the computer system detects that a keyboard (e.g., a mechanical keyboard and/or an external keyboard) has been (e.g., is) connected to the computer system (e.g., when an external keyboard is connected to device 600 as described with reference to FIG. 6G) (e.g., communicatively coupled and/or activated as an input device). Including a criterion that is satisfied when the computer system detects that a keyboard has been connected improves the computer system because it provides timely visual feedback regarding what keyboard mode is actively employed by the computer system when the keyboard is connected so that the user can change the keyboard input mode if needed.

In some embodiments, the first set of criteria includes (in some embodiments, the second set of criteria also includes) a criterion that is satisfied when a location of a mouse indicator (e.g., a pointer and/or an indication corresponding to a mouse input device) corresponds to the location of the insertion point indicator (e.g., when mouse pointer 628 hovers over text cursor 614 in FIG. 6H) (e.g., the moused indicator is hovering over the insertion point indicator). Including a criterion that is satisfied when a location of a mouse indicator corresponds to the location of the insertion point indicator improves the computer system because it provides timely visual feedback of which keyboard input mode is activated so that the user can change the keyboard input mode if needed.

In some embodiments, after displaying the first keyboard mode indicator (and/or the second keyboard indicator), the computer system detects, via one or more input devices, input (e.g., a first input and a second input) corresponding to a request to display content (e.g., the keystroke input of FIGS. 6B, 6F, and/or 6I) (e.g., a letter, a number, and/or a punctuation mark). In some embodiments, in response to detecting the input corresponding to the request to display content, the computer system displays the content (e.g., 621,

622, 623) (e.g., first content corresponding to the first input while not displaying second content corresponding to the first input) and ceases to display the first keyboard mode indicator (e.g., device 600 stops displaying 616 and/or 624 as described with reference to FIGS. 6B, 6F, and/or 6I) (and/or the second keyboard indicator). In some embodiments, the first keyboard mode indicator is not displayed while detecting input corresponding to a request to display content. Displaying content and not displaying the first keyboard mode indicator in response to detecting input corresponding to the request to display content improves the computer system because it declutters the user interface and allows the user to better view the content being added.

In some embodiments, while displaying the first keyboard mode indicator (and/or the second keyboard indicator) and in accordance with a determination that the insertion point indicator is not displayed (e.g., because an input on a keyboard would not cause the computer system to add content and/or the computer system is not in a typing mode where content would be added in response to detecting a keystroke), the computer system ceases to display the first keyboard mode indicator (e.g., user selects keyboard mode affordance 603 of FIG. 6A after displaying 616 in FIG. 6B) (and/or the second keyboard indicator). In some embodiments, while displaying the first keyboard mode indicator (and/or the second keyboard indicator) and in accordance with a determination that the insertion point indicator is displayed (e.g., because an input on a keyboard would cause the computer system to add content and/or the computer system is in a typing mode where content would be added in response to detecting a keystroke), continuing to display the first keyboard mode indicator (e.g., 614 is displayed in FIGS. 6B-6C) (and/or the second keyboard indicator). Conditionally displaying the first keyboard mode indicator and/or the second keyboard indicator if the insertion point indicator displayed improves the computer system because it declutters the user interface and causes the computer system to display the first keyboard mode indicator and/or the second keyboard indicator when they are relevant.

In some embodiments, displaying the first keyboard indicator (and/or the second indicator) includes, in accordance with a determination that a first set of orientation criteria is satisfied, displaying, via the display generation component, the first keyboard mode indicator (and/or the second keyboard indicator) as having a first orientation (e.g., top, bottom, left, and/or right) with respect to the insertion point indicator (e.g., 616 is displayed below 614 in FIG. 6C). In some embodiments, displaying the first keyboard indicator (and/or the second indicator) includes, in accordance with a determination that the a second set of orientation criteria is satisfied (e.g., the second set of orientation criteria is satisfied when the first set of orientation criteria is not satisfied), displaying, via the display generation component, the first keyboard mode indicator (and/or the second keyboard indicator) as having a second orientation (e.g., top, bottom, left, and/or right) with respect to the insertion point indicator different from the first orientation (e.g., 616 is displayed above 614 in FIG. 6L). In some embodiments, the first set of orientation criteria includes a criterion that the first keyboard mode indicator (and/or the second keyboard indicator) would not hide a (e.g., obstruct a view of) respective portion of the user interface (e.g., previously added content, one or more selectable objects, and/or images). In some embodiments, the first set of orientation criteria includes a criterion of a location of the insertion point indicator within an input field (e.g., at the top or beginning of the input field versus the bottom and/or end of the text field). Conditionally displaying the first keyboard mode indicator (and/or the second keyboard indicator) at different orientations with respect to the insertion indicator improves the computer system because it declutters the user interface and does not hide a respective portion of the user interface.

In some embodiments, displaying the user interface includes, in accordance with a determination that a first set of appearance criteria is satisfied, wherein the first set of appearance criteria includes a criterion that is satisfied when the insertion point indicator is displayed in an input field (e.g., 620 and/or 804) (e.g., a text field and/or a document) of a first application (e.g., e-mail application of FIGS. 6A-6L and/or text message application of FIGS. 8A-8K), displaying, via the display generation component, the insertion point indicator with a first visual characteristic (e.g., a visual characteristic similar to hatching 618 and/or as described with reference to FIG. 6B) (e.g., color, shape, and/or size). In some embodiments, displaying the user interface includes, in accordance with a determination that a second set of appearance criteria is satisfied, where the second set of appearance criteria includes a criterion that is satisfied when the insertion point indicator is displayed in an input field of a second application (e.g., an application other than e-mail application of FIGS. 6A-6L and/or text message application of FIGS. 8A-8K) that is different from the first application, displaying, via the display generation component, the insertion point indicator with a second visual characteristic (e.g., a visual characteristic different from hatching 618 and/or as described with reference to FIG. 6B) (e.g., color, shape, and/or size) different from the first visual characteristic. In some embodiments, the first application includes the first visual characteristic (e.g., such that the insertion point indicator has the same visual characteristic as the first application when the first set of appearance criteria is satisfied). In some embodiments, the second application includes the second visual characteristic (e.g., such that the insertion point indicator has the same visual characteristic as the second application when the second set of appearance criteria is satisfied). Conditionally displaying the insertion point indicator with different visual characteristics based on the application improves the computer system because it provides visual feedback of where and to which application content will be added.

In some embodiments, displaying the first keyboard indicator (and/or the second indicator) includes, in accordance with a determination that the first set of appearance criteria is satisfied, displaying, via the display generation component, the first keyboard mode indicator (and/or the second keyboard mode indicator) with a third visual characteristic (e.g., a visual characteristic similar to hatching 618 and/or as described with reference to FIG. 6B) (e.g., color, shape, image, and/or size). In some embodiments, displaying the first keyboard indicator (and/or the second indicator) includes, in accordance with a determination that the second set of appearance criteria is satisfied, displaying, via the display generation component, the first keyboard mode indicator (and/or the second keyboard mode indicator) with a fourth visual characteristic (e.g., a visual characteristic different from hatching 618 and/or as described with reference to FIG. 6B) (e.g., color, shape, image, and/or size) different from the third visual characteristic. In some embodiments, the first application includes the first visual characteristic (e.g., such that the insertion point indicator has the same visual characteristic as the first application when the first set of appearance criteria is satisfied). In some embodiments, the second application includes the second visual characteristic (e.g., such that the insertion point indicator has the same color as a color of the second application when the second set of appearance criteria is satisfied). Conditionally displaying the first keyboard mode indicator (and/or the second keyboard mode indicator) with different visual characteristics based on the application improves the computer system because it provides visual feedback of where and to which application content will be added and what keyboard mode will be used in adding that content.

In some embodiments, the first visual characteristic and the third visual characteristic include a first color (e.g., 614 and 604 have the same color in the e-mail application of FIGS. 6A-6L), and the second visual characteristic and the fourth visual characteristic include a second color (e.g., 614 and 604 have the same color in the e-mail application of FIGS. 6A-6L). In some embodiments, the second color is different from the first color. Conditionally displaying the insertion point indicator and the keyboard mode indicators with the same color improves the computer system because it provides visual feedback of where and to which application content will be added.

In some embodiments, the computer system displays, via the display generation component, a first word (e.g., the word "meeting" in content 638 of FIGS. 6J-6K) and a second word (e.g., the word "and" in content 638 of FIGS. 6J-6K) in the user interface. In some embodiments, displaying the first word and the second word includes, in accordance with a determination that a set of error criteria is satisfied, wherein the set of criteria includes a criterion that a punctuation error is detected (e.g., a punctuation mark is missing and/or an existing punctuation mark is identified as a grammatical error) between the first word and the second word (e.g., device 600 detects that a comma should be placed between the word "meeting" and the word "and" in content 638), emphasizing the first word and second word (e.g., underlining and/or displaying a graphical object beneath the first and second word) with respect to other text (e.g., 639). In some embodiments, displaying the first word and the second word includes, in accordance with a determination that the set of criteria is not satisfied, forgoing emphasizing the first word and the second word (e.g., do not display 639 if device 600 detects that a comma should not be placed between the word "meeting" and the word "and" in content 638) (e.g., the first word and the second word are not underlined and/or a graphical object is not displayed beneath the first and second word). Conditionally emphasizing words when there is a set of punctuation error criteria is satisfied improves the computer system because it provides visual feedback of where grammatical error occurs and what words are associated with the grammatical error.

Note that details of the processes described above with respect to method 700 (e.g., FIG. 7) are also applicable in an analogous manner to the methods described below. For example, methods 900 and 1000 optionally includes one or more of the characteristics of the various methods described above with reference to method 700. For example, methods 900 and 1000 can include displaying a keyboard mode indicator based on the criteria described above and/or changing the keyboard mode as described above. For brevity, these details are not repeated below.

FIGS. 8A-8K illustrate exemplary user interfaces based on the state of a dictation mode, in accordance with some embodiments. The user interfaces in these figures are used to illustrate the processes described below, including the processes in FIGS. 9-10.

At FIG. 8A, device 800 (e.g., a smart phone) displays, on display 801, text message user interface 802 of a text message application. Text message user interface 802 includes message compose region 804 and text cursor 806. Message compose region 804 is similar to text field 620 of FIGS. 6A-6L but has a different state. Text cursor 806 is similar to text cursor 614 of FIGS. 6A-6L but has a different state. As such, the descriptions of text field 620 and text cursor 614 are applicable to message compose region 804 and text cursor 806. In some embodiments, device 800 includes one or more features of device 100, 300, 500, or 600.

At FIG. 8A, device 800 displays software keyboard 808. In response to detecting keystroke input via software keyboard 808 (e.g., via English electronic keys 810), device 800 displays content in message compose region 804. Device 800 further displays keyboard menu affordance 809. In some embodiments, device 800 displays a menu having affordances for different keyboard modes, similar to English keyboard affordance 604 and Greek keyboard affordance 606 of keyboard menu 602 described in reference to FIG. 6A. In some embodiments, device 800 immediately updates the keyboard mode (e.g., without displaying displays a menu having affordances for different keyboard modes) in response to detecting an input directed at keyboard menu affordance 809, as described in reference to FIG. 8E.

At FIG. 8A, device 800 also displays dictation affordances 810a and 810b. While displaying text message user interface 802, device 800 detects input 850a1 (e.g., a mouse click, a gesture, and/or speech input) directed at dictation affordance 810a. In response to detecting input 850a1 directed at dictation affordance 810a, device 800 activates dictation mode. Similarly, in some embodiments, device 800 detects input 850a2 (e.g., a mouse click, a gesture, and/or speech input) directed at dictation affordance 810b. In response to detecting input 850a2 directed at dictation affordance 810b, device 800 activates a dictation mode.

At FIG. 8B, device 800 displays an indication that the dictation mode is activate. In some embodiments, device 800 detects an utterance via microphone 803. Device 800 displays text cursor 806 as having a different appearance than text cursor 806 of FIG. 8A. As illustrated by hatching 813, text cursor 806 of FIG. 8B has a different color than text cursor 806 of FIG. 8A. Additionally, text cursor 806 of FIG. 8B has a different size than text cursor 806 of FIG. 8A. Additionally, device 800 displays text cursor glow 812 around text cursor 806 of FIG. 8B, whereas device 800 does not display text cursor glow 812 around text cursor 806 of FIG. 8A. In some embodiments, text cursor glow 812 partially surrounds text cursor 806 (e.g., text cursor glow 812 is displayed on opposite sides of text cursor 806 but is not displayed at the top or bottom). In some embodiments, device 800 displays an animation (e.g., gradual change in size and/or color) of the text cursor 806 and/or text cursor glow 812 over time when the dictation mode is active. In such embodiments, the size of text cursor 806 and/or text cursor glow 812 increases and/or decreases gradually over time (e.g., pulses). In some embodiments, device 800 displays an animation including a gradual change in transparency and/or color of text cursor 806 over time and/or a gradual change in text cursor glow 812 over time. In some embodiments, device modifies a visual characteristic of text cursor 806 and/or text cursor glow 812 (e.g., a size of text cursor 806, a size of text cursor glow 812, a color of text cursor 806, and/or a color of text cursor glow 812) in response to detecting different attributes (e.g., amplitude, pitch, and/or volume) of an utterance.

At FIG. 8B, device 800 displays microphone affordance 814a. Device 800 deactivates the dictation mode in response to detecting an input directed at microphone affordance 814*a* (and/or an input directed at either one of dictation affordances 810*a*-*b*). Providing a microphone affordance 814*a* near text cursor 806 allows a user to quickly find and deactivate the dictation mode, especially when, in larger devices, dictation affordances 810*a*-*b* are located further from text cursor 806.

At FIG. 8B, device 800 displays English dictation language affordance 814*b*. English dictation language affordance 814*b* indicates that device 800 is currently using an English dictation model to detect utterances. As described with reference to FIG. 8E, device 800 changes or initiates a change in the dictation language in response to detecting an input directed at English dictation language affordance 814*b*. In some embodiments, device 800 displays English dictation language affordance 814*b* if specific conditions are met (e.g., more than one dictation language model is installed or activatable by the user and/or a threshold number of dictation language models are available for activation). In some embodiments, device 800 displays additional dictation options (e.g., another dictation language affordances and/or other input options) in response detecting an input (e.g., a mouse click, a gesture, and/or a speech input) directed at English dictation language affordance 814*b*.

At FIG. 8B, while the dictation mode is activated, device 800 detects utterance 850*b* ("Let's meet up later today at the ice cream shop"). In response to (and/or while) detecting utterance 850*b*, device 800 transcribes utterance 850*b* as illustrated in FIG. 8C.

Figures 8C, 8D:
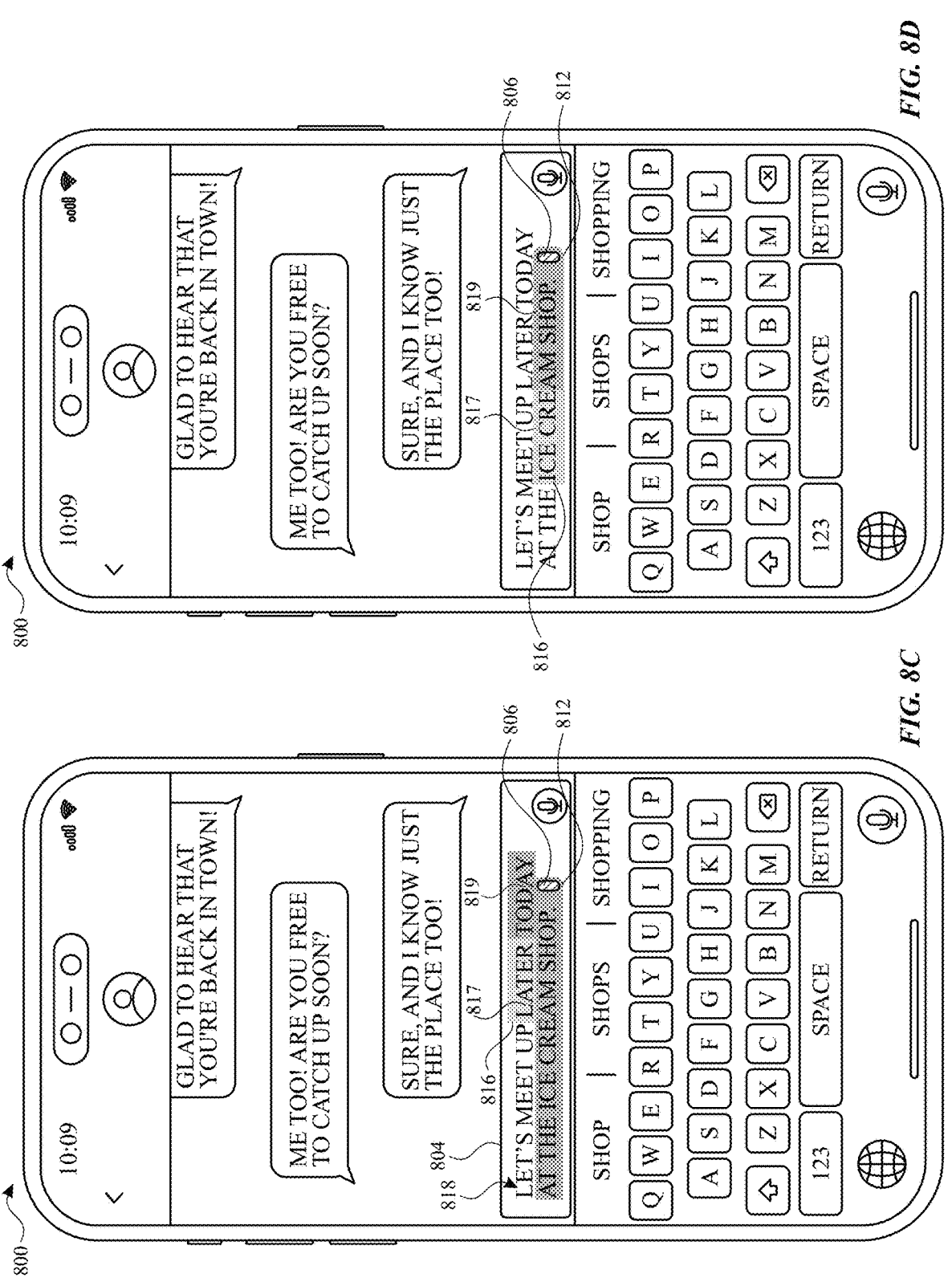
Figures 8E, 8F:
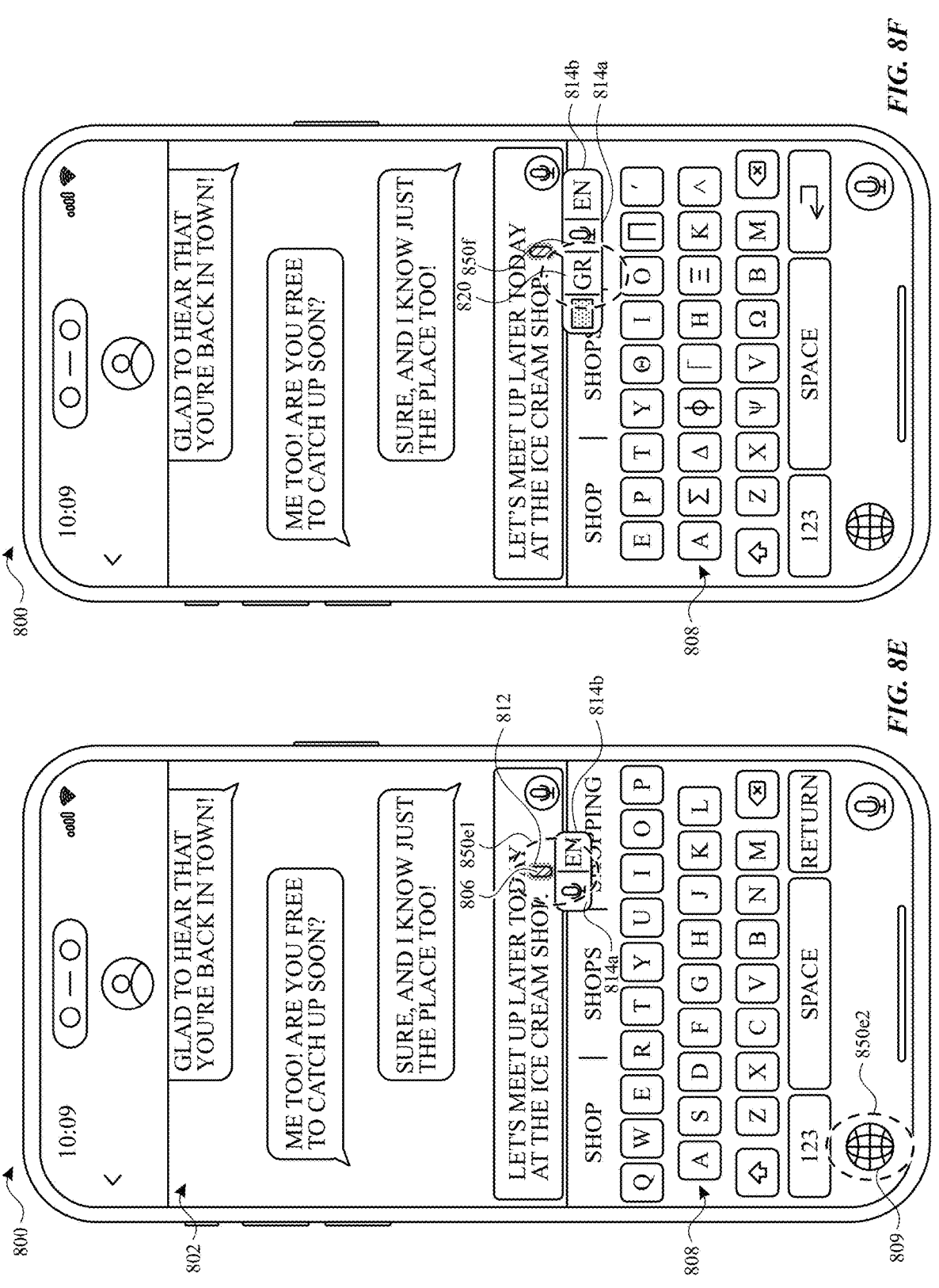

At FIG. 8C, device 800 displays transcription 818 of utterance 850*b* in message compose region 804. Device 800 also displays trailing glow 816 overlaid on transcription 818. In some embodiments, trailing glow 816 is a temporary glow that follows (e.g., lags behind) text cursor 806. Trailing glow 816 optionally includes a visual highlighting and/or emphasis of a portion of text to distinguish it from other portions of text (e.g., using one or more colors, sizes, and/or objects). As described in further detail with respect to FIG. 8D, trailing glow 816 fades (e.g., transparency increases) after being displayed. As illustrated, lighter portion 817 of trailing glow 816 is depicted as being lighter than darker portion 819 to indicate that lighter portion 817 is fading. In some embodiments, device 800 displays trailing glow 816 when content is added (and/or when text cursor 806 moves) based on detecting an utterance. In some embodiments, device 800 does not display trailing glow 816 when content is added (and/or when text cursor 806 moves) in response to detecting an input other than an utterance (e.g., a keystroke input as described in reference to FIG. 6A and/or a moving the text cursor to a different location in response to mouse input as described in reference to FIGS. 6K-6L). In some embodiments, trailing glow 816 is transparent graphical element overlaid on transcription 818.

At FIG. 8C, device 800 also maintains display of text cursor glow 812 around text cursor 806. As illustrated, text cursor glow 812 is depicted as having the same visual appearance (e.g., color) as at least a portion of trailing glow 816. As illustrated, trailing glow 816 has same visual appearance as text cursor glow 812 (e.g., darker portion 819 is depicted as having the same appearance as trailing glow 816). In some embodiments, text cursor glow 812 does not have the same visual appearance (e.g., color) as trailing glow 816.

At FIG. 8C, device 800 displays text cursor 806 as having the same appearance as text cursor 806 of FIG. 8B. In some embodiments, device 800 modifies the appearance of text cursor 806 in response to (and/or while) detecting utterance

850*b*. In such embodiments, device 800 displays text cursor 806 with a different size (and/or different color). In some embodiments, device 800 displays text cursor 806 as having different sizes (e.g., different widths and/or different heights) that are based on detecting different amplitudes (e.g., volume level and/or pitch) in the user's voice while speaking utterance 850*b*. For instance, in some embodiments, device 800 displays text cursor 806 having an increased size when a larger amplitude is detected and having a decreased size when a smaller amplitude is detected, or vice versa.

At FIG. 8D, time has passed since displaying the user interface of FIG. 8C, and device 800 displays trailing glow 816 as being shorter than trailing glow 816 of FIG. 8C. In some embodiments, device 800 displays an animation of a portion (e.g., lighter portion 817) of trailing glow 816 fading away over time (e.g., increasing the transparency of the trailing glow until it is no longer visible). In some embodiments, device 800 fades a portion of trailing glow 816 after specific conditions have been met (e.g., it has been displayed for a threshold amount of time and/or based on a rate at which text cursor 806 is moving in response to device 800 detecting additional transcriptions). As illustrated, device 800 has not re-displayed microphone affordance 814*a* and English dictation language affordance 814*b*.

At FIG. 8E, time has passed since displaying the user interface of FIG. 8D, and device 800 ceases to display trailing glow 816. As illustrated, device 800 redisplays microphone affordance 814*a* and English dictation language affordance 814*b*. In some embodiments, device 800 redisplays microphone affordance 814*a* and English dictation language affordance 814*b* at the same time (and/or within a threshold amount of time, such as 0.5 second, 1 second, and/or 2 seconds) of ceasing to display trailing glow 816. In some embodiments, device 800 displays microphone affordance 814*a* and English dictation language affordance 814*b* as having a different orientation (e.g., top, bottom, left, or right) relative to text cursor 806 based on specific conditions similar to the conditions described with respect to English keyboard icon 604 of FIG. 6L.

In some embodiments, device 800 detects input 850*el* (e.g., a mouse click, a gesture, and/or a speech input) directed at English dictation language affordance 814*b*. In such embodiments, in response to detecting input 850*el*, device 800 initiates a process to change the dictation language. In some embodiments, initiating a process to change the dictation language includes displaying affordances for other dictation languages, such as a Greek dictation language affordance. In some embodiments, initiating a process to change the dictation language includes immediately changing the dictation language to a different dictation language, such as the Greek dictation language.

At FIG. 8E, while displaying text message user interface 802, device 800 detects a triggering event for displaying (e.g., redisplaying) Greek keyboard icon 820. As illustrated, the triggering event for displaying Greek keyboard icon 820 includes device 800 detecting input 850*e2* (e.g., a mouse click, a gesture, and/or speech input) directed keyboard menu affordance 809. In some embodiments, the triggering event for displaying Greek keyboard icon is similar to the triggering events described with reference to FIG. 6G. In response to detecting the triggering event for displaying (e.g., redisplaying) Greek keyboard icon 820, device 800 displays Greek keyboard icon 820 of FIG. 8F.

At FIG. 8F, device 800 displays Greek keyboard icon 820 adjacent to microphone affordance 814*a* and English dictation language affordance 814*b*. Greek keyboard icon 820 includes a representation (e.g., emoji and/or image) of a keyboard to indicate that Greek keyboard icon 820 corresponds to the keyboard mode (e.g., and/or not the dictation language). As illustrated, microphone affordance 814*a* and English dictation language affordance 814*b* are shifted to a new location as compared to the location of microphone affordance 814*a* and English dictation language affordance 814*b* of FIG. 8E. In some embodiments, Greek keyboard icon 820 is not concurrently displayed with microphone affordance 814*a* and English dictation language affordance 814*b*. In such embodiments, device 800 ceases to display microphone affordance 814*a* and English dictation language affordance 814*b* and displays Greek keyboard icon 820 (e.g., in a location previously occupied by microphone affordance 814*a* and/or English dictation language affordance 814*b* and/or in a different location) in response to detecting the triggering event for displaying Greek keyboard icon 820.

At FIG. 8F, device 800 displays software keyboard 808 with Greek electronic keys while English is still the active dictation as indicated by English dictation language affordance 814*b*. As such, device 800 can display content in different languages based on whether an utterance is detected or a keystroke input is detected. In some embodiments, a change in the keyboard mode causes a change in the dictation language (e.g., device 800 changes dictation language to Greek when detecting the keyboard mode has been changed to Greek), or vice versa.

At FIG. 8F, device 800 detects input 850*f* (e.g., a mouse click, a gesture, and/or a speech input) directed at Greek keyboard icon 820. In response to detecting input 850*f*, device 800 initiates a process to change the keyboard mode to the English keyboard mode of FIG. 8G. In some embodiments, initiating a process to change the keyboard mode includes displaying additional keyboard icons, such as English keyboard icon 616 or Greek keyboard icon 624 as described with reference to FIGS. 6C-6E. In some embodiments, initiating a process to change the keyboard mode includes automatically (e.g., without further user input) changing to the English keyboard mode in response to detecting input 850*f*.

Figure 8G:
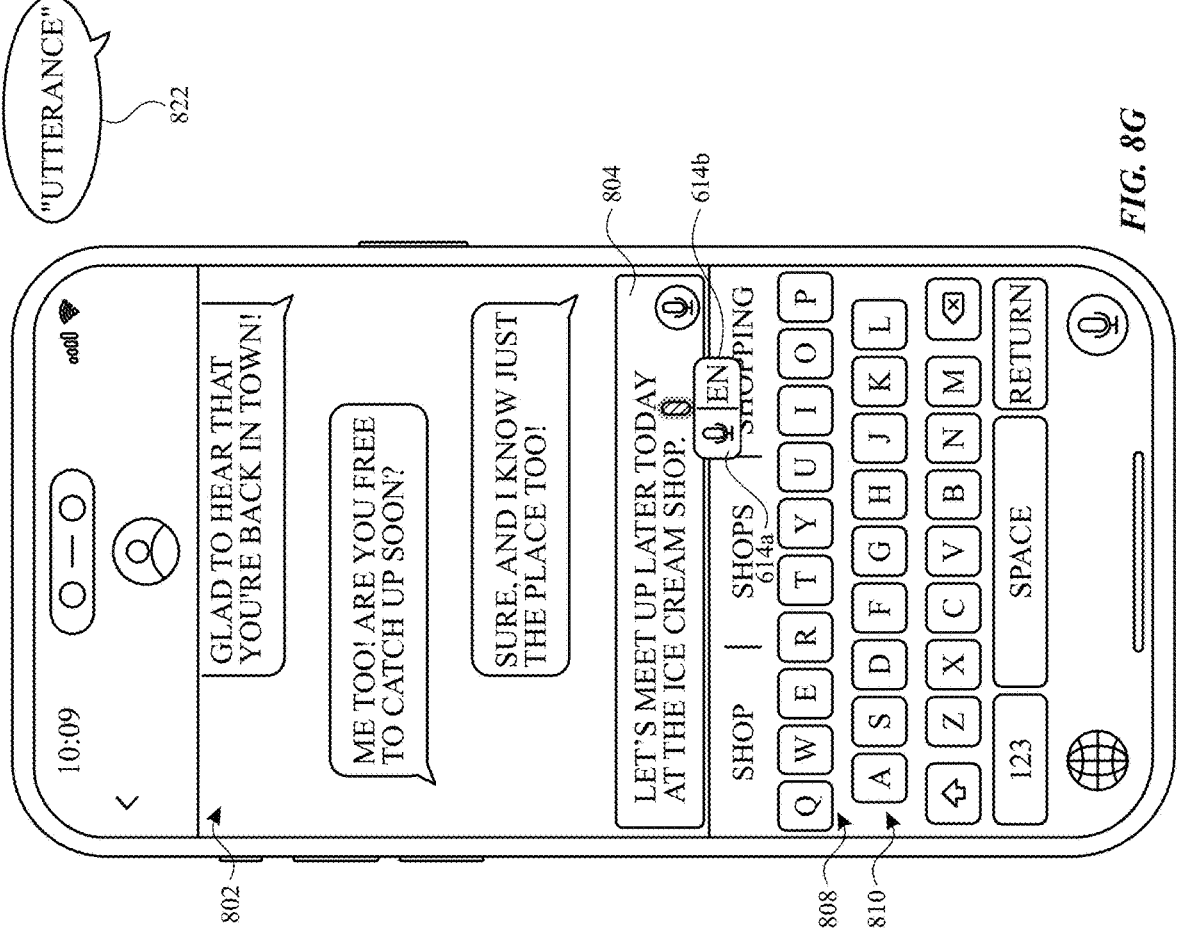

At FIG. 8G, time has passed since changing the keyboard mode and displaying the user interface of FIG. 8F. As illustrated device 800 updates software keyboard 808 to include English electronic keys 810 in response to changing the keyboard mode. Additionally, device 800 displays microphone affordance 814*a* and English dictation language affordance 814*b* while device 800 does not display a keyboard icon.

At FIG. 8G, device 800 detects a respective utterance represented by utterance 822. The respective utterance detected is explained in greater detail with reference to FIG. 8H. In response to detecting the respective utterance, device 800 either executes a command or transcribes the utterance depending on the specific conditions described with reference to FIG. 8H.

FIG. 8H is a table including a column of utterances 822, a column of what is (or is not) transcribed 824, and a column of one or more criteria 826 that is used by device 800 to determine what is (or is not) transcribed. For example, in response to determining whether one or more criteria 826 is satisfied, device 800 either executes a command and/or transcribes the utterance 822 (or at least a portion of the utterance that does not correspond to the command).

As shown in FIG. 8H, when device 800 detects utterance 822*a* ("Send"), device 800 determines whether utterance 822*a* satisfies keyword criteria 826*a*. In some embodiments, keyword criteria 826*a* is (or is not) satisfied if a portion of utterance 822*a* includes a command keyword. In some embodiments, the command keyword is a word associated with executing a respective command on device 800, such as editing text (e.g., change one word to different word, delete a word, insert a word into text, cut, copy, paste), sending a communication, undoing/redoing an operation, and/or starting/stopping dictation. Examples of command keywords include change, delete, insert, cut, copy, paste, send, undo, redo, start, and/or stop. In some embodiments, in response to detecting that utterance 822*a* satisfies keyword criteria 826*a* (e.g., the command keyword "send" is present utterance 822*a*), device 800 executes the command associated with the command keyword "send." In some embodiments, device 800 does not display a transcription of the command keyword (and/or other words associated with the command) in message compose region 804 of FIG. 8G, as depicted by reference number 824*a*.

As shown in FIG. 8H, when device 800 detects utterance 822*b* ("I like vanilla ice cream"), device 800 determines whether utterance 822*b* satisfies keyword criteria 826*a*. In some embodiments, in response to detecting that utterance 822*b* does not satisfy keyword criteria 826*a* (e.g., a command keyword is not detected in the phrase "I like vanilla ice cream"), device 800 displays transcription 824*b* in message compose region 804 of FIG. 8G.

As shown in FIG. 8H, when device 800 detects utterance 822*c* ("It's open later than the restaurant. Send"), device 800 determines whether utterance 822*c* satisfies leading pause criteria 826*b*. In some embodiments, leading pause criteria 826*b* is (or is not) satisfied if a pause before the command keyword meets a leading pause threshold. In some embodiments, the leading pause threshold is a time value that is selected in the range of 0.5 second to 1.1 second. In some embodiments, the leading pause threshold is a time value of 0.8 second. In some embodiments, device 800 determines that utterance 822*c* meets the leading pause threshold is met (e.g., a pause has been detected before the command keyword "send"). In some embodiments, in response to detecting that utterance 822*c* satisfies leading pause criteria 826*b*, device 800 displays transcription 824*c* (excluding the command keyword "send") in message compose region 804 of FIG. 8G.

As shown in FIG. 8H, when device 800 detects utterance 822*d* ("It's open later than the restaurant. Send"), device 800 determines whether utterance 822*d* satisfies leading pause criteria 826*b*. In some embodiments, device 800 determines that the leading pause threshold is not met (e.g., little or no pause has been detected before the command keyword "send"). In some embodiments, in response to detecting that utterance 822*d* does satisfy leading pause criteria 826*b*, device 800 displays transcription 824*d* (e.g., including the command keyword "send") in message compose region 804 of FIG. 8G.

As shown in FIG. 8H, when device 800 detects utterance 822*e* ("It's open later than the restaurant. Send"), device 800 determines whether utterance 822*e* satisfies trailing pause criteria 826*c*. In some embodiments, trailing pause criteria 826*c* is (or is not) satisfied if a pause after the command keyword meets a trailing pause threshold. In some embodiments, the trailing pause threshold is a time value selected in the range of 0.5 second to 1.1 second. In some embodiments, the leading pause threshold is a time value of 0.8 second. In some embodiments, device 800 determines that utterance 822*e* meets the trailing pause threshold (e.g., a pause has been detected after the command keyword "send"). In some embodiments, in response to detecting that utterance 822*e* satisfies trailing pause criteria 826*c*, device

800 displays transcription 824*e* (excluding the command keyword "send") in message compose region 804 of FIG. 8G.

As shown in FIG. 8H, when device 800 detects utterance 822*f* ("It's open later than the restaurant. Send me the address"), device 800 determines whether utterance 822*f* satisfies trailing pause criteria 826*c*. In some embodiments, device 800 detects that utterance 822*f* does not satisfy trailing pause criteria 826*c* (e.g., little or no pause has been detected after the command keyword "send"). In response to detecting that utterance 822*e* does not satisfy trailing pause criteria 826*c*, device 800 displays transcription 824*f* (e.g., including the command keyword "send") in message compose region 804 of FIG. 8G.

As shown in FIG. 8H, when device 800 detects utterance 822*g* ("I don't have the address. Send message."), device 800 determines whether utterance 822*g* satisfies semantic context criteria 826*d*. In some embodiments, semantic context criteria 826*d* is (or is not) satisfied if a semantic analysis of the command keyword (e.g., relationship with other words, other sentences, and/or grammatical structure) indicates that the command keyword corresponds to a command. In some embodiments, device 800 utilizes natural language processing (NLP) and/or a machine learning model to perform the semantic analysis of the command keyword. In some embodiments, device 800 performs a semantic analysis of the utterance "I don't have the address. Send message." to determine that the command keyword of send refers to a command to send the message. In some embodiments, in response to detecting utterance 822*h* satisfies semantic context criteria 826*d*, device 800 displays transcription 824*g* (e.g., without "send message") in message compose region 804 of FIG. 8G.

As shown in FIG. 8H, when device 800 detects utterance 822*h* ("I don't have the address. Send it when you can."), device 800 determines whether utterance 822*h* satisfies semantic context criteria 826*d*. In some embodiments, device 800 performs a semantic analysis of the utterance "I don't have the address. Send it when you can." to determine that the command keyword "send" refers to a request to send an address uttered in the previous sentence. Because the semantic context of the command keyword "send" in utterance 822*g* indicates that utterance 822*g* is not a command, device 800 determines that semantic context criteria 826*d* is not satisfied. In some embodiments, in response to detecting that utterance 822*g* does not satisfy semantic context criteria 826*d*, device 800 displays transcription 824*g* (including the command keyword "send") in message compose region 804 of FIG. 8G.

As shown in FIG. 8H, when device 800 detects utterance 822*i* ("Let's get going. Send"), device 800 determines whether utterance 822*i* satisfies syntactic break criteria 826*c*. In some embodiments, syntactic break criteria 826*e* is (or is not) satisfied if a set of syntax criteria is satisfied. In some embodiments, the set of syntax criteria includes a sentence criterion that is satisfied when a complete sentence occurs before the command keyword, as described herein. In some embodiments, the set of syntax criteria includes a syntactic error criterion that is satisfied when the command keyword introduces a syntactic error, as described herein.

In some embodiments, to determine whether the sentence criterion is satisfied, device 800 utilizes natural language processing (NLP) and/or machine learning to determine whether a complete sentence precedes the command keyword to determine whether a complete sentence occurs before the command keyword. In some embodiments, device 800 determines there is a complete sentence before the command keyword of "send" in utterance 822*i* based on English grammar and/or linguistic rules (e.g., the word "send" follows the complete sentence "Let's get going"). In some embodiments, device 800 determines there is a complete sentence before the command keyword of "send" in utterance 822*i* based on the word "send" following a period (e.g., the user uttered the word "period" in utterance 822*i*). In some embodiments, device 800 determines there is a complete sentence without (or independent of) a punctuation mark. In some embodiments, because a complete sentence occurs before the command keyword, device 800 determines that the sentence criterion is satisfied (which, in some embodiments, satisfies syntactic break criteria 826*c*).

In some embodiments, to determine whether the syntactic error criterion is satisfied, device 800 utilizes natural language processing (NLP) and/or machine learning to determine whether the command keyword introduces a syntactic error (e.g., a grammatical and/or linguistic error is caused by the command keyword). In some embodiments, device 800 determines the command keyword in utterance 822*i* introduces a syntactic error (e.g., the word "send" is a verb that has a missing subject based on English grammar and/or linguistic rules). In some embodiments, because the command keyword in utterance 822*i* introduces a syntactic error, device 800 determines that the syntactic error criterion is satisfied (which, in some embodiments, satisfies syntactic break criteria 826*c*).

In some embodiments, in response to detecting that utterance 822*j* satisfies syntactic break criteria 826*e* (e.g., the sentence criterion is satisfied and/or the syntactic error criterion is satisfied), device 800 displays transcription 824*i* (e.g., without "send") in message compose region 804 of FIG. 8G.

As shown in FIG. 8H, when device 800 detects utterance 822*j* ("Let's get going. Can you send it"), device 800 determines whether utterance 822*j* satisfies syntactic break criteria 826*e*. In some embodiments, device 800 determines there is not a complete sentence before the command keyword of "send" in utterance 822*j* (e.g., the word "can" is an auxiliary verb that supports or helps the verb "send" so the phrase "can you" is not a complete sentence based on English grammar and/or linguistic rules). In some embodiments, because a complete sentence does not precede the command keyword of "send" in utterance 822*j*, device 800 determines that the sentence criterion is not satisfied (which, in some embodiments, causes syntactic break criteria 826*e* to not be satisfied).

In some embodiments, device 800 determines whether utterance 822*j* satisfies the syntactic error criterion. In some embodiments, device 800 determines the command keyword does not introduce a syntactic error based on English grammar and/or linguistic rules (e.g., the word "send" does not introduce a grammatical error in the phrase "Can you send it"). Accordingly, in some embodiments, device 800 determines that the syntactic error criterion is not satisfied (which, in some embodiments, causes syntactic break criteria 826*e* to not be satisfied).

In response to detecting that utterance 822*j* does not satisfy syntactic break criteria 826*e* (e.g., the sentence criterion is not satisfied and/or the syntactic error criterion is not satisfied), device 800 displays transcription 824*j* (including the command keyword "send") in message compose region 804 of FIG. 8G.

As shown in FIG. 8H, when device 800 detects utterance 822*k* ("change today to tonight"), device 800 determines whether utterance 822*k* satisfies target presence criteria 826*f*. In some embodiments, target presence criteria 826*f* is (or is not) satisfied if a word in utterance 822*k* corresponds to a word (e.g., a target word) in text in a text field. In some embodiments, device 800 determines that the word "today" in utterance 822*k* corresponds to the word "today" in the text of message compose region 804 (e.g., "Let's meet up later today at the ice cream shop"). Accordingly, device 800 determines that target presence criteria 826*f* is satisfied. In response to detecting that utterance 822*k* satisfying target presence criteria 826*f*, device 800 does not display a transcription (as depicted by reference number 824*k*) in message compose region 804 of FIG. 8G.

As shown in FIG. 8H, when device 800 detects utterance 822*l* ("I need to change clothes before leaving"), device 800 determines whether utterance 822*l* satisfies target presence criteria 826. In some embodiments, device 800 determines that no words in utterance 822*l* correspond to a word in the text of message compose region 804 (e.g., "Let's meet up later today at the ice cream shop"). Accordingly, device 800 determines that target presence criteria 826*f* is not satisfied. In response to detecting that utterance 822*l* does not satisfy target presence criteria 826*f*, device 800 displays transcription 824*l* (including the command keyword "change") in message compose region 804 of FIG. 8G.

In some embodiments, device 800 begins and/or stops transcribing at different times based on one or more of criteria 826*a*-826*f* being satisfied. Referring to utterance 822*l* ("I need to change clothes before leaving"), in some embodiments, device 800 begins transcribing "I need to". Device 800 then detects the command keyword "change" (e.g., using keyword criteria 826*a*). In response to detecting the command keyword "change," device 800 determines whether change satisfies one or more of criteria 826*b*-826*f*. While device 800 is making this determination, device 800 does not transcribe the command keyword "change" or any subsequent portions (e.g., "clothes before leaving"). Device 800 optionally continues to detect "clothes" and/or "clothes before leaving" while device 800 determines that one or more of criteria 826*b*-826*f* is not satisfied. While detecting the portion of utterance 822*l* including the word "clothes before leaving," device 800 determines that one or more of criteria 826*b*-826*f* is not satisfied (e.g., the command keyword is not associated with a command) and displays a transcription of the command keyword "change" as well as "clothes before leaving." In some embodiments, device 800 begins transcribing "change" as well as the remaining portions of utterance 822*l* (e.g., "clothes before leaving") in real time once device 800 determines that "change" does not correspond to a command. In some embodiments, had device 800 determined that one or more of criteria 826*b*-826*f* was satisfied (e.g., the command keyword "change" corresponded to a command), device 800 would have executed a command while not transcribing at least the portion of the utterance including the command keyword "change." In some embodiments, device 800 does not transcribe any portions of an utterance that is associated with the command keyword.

Figures 8I, 8J:
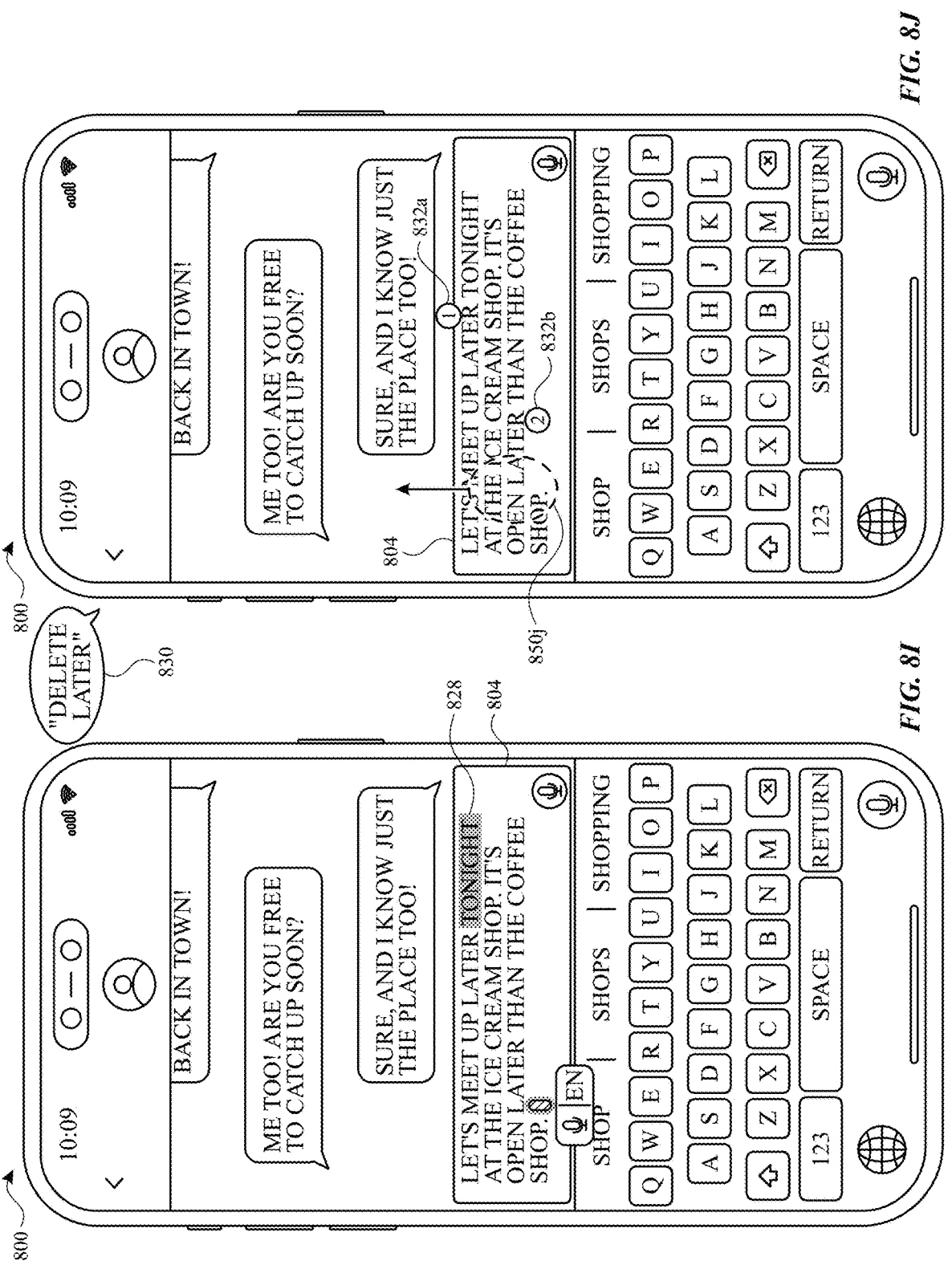

At FIG. 8I, time has passed since displaying the text message user interface 802 of FIG. 8G. Device 800 has updated message compose region 804 to include additional content (e.g., "It's open later than the coffee shop") in response to detecting a keystroke input and/or an utterance. Additionally, device 800 has detected an utterance (e.g., utterance 822*l*) corresponding to a command to change "today" in message compose region 804 of FIG. 8G to "tonight." In response to detecting the command to change "today" to "tonight," device 800 deletes "today" and inserts "tonight" in message compose region 804 of FIG. 8I.

Additionally, device 800 displays glow 828 around the word "tonight" in message compose region 804.

At FIG. 8I, device 800 detects utterance 830 ("delete later"). In response to detecting utterance 830, device 800 displays identifiers 832*a*-832*b* of FIG. 8J.

At FIG. 8J, device 800 displays indicators 832*a*-832*b* in text message user interface 802. Device 800 displays indicator 832*a* at a location associated with (e.g., defined in part by) a first instance of the word "later" in message compose region 804. Device 800 also displays indicator 832*b* at a location associated with a second instance of the word "later" in message compose region 804. Device 800 displays indicators 832*a*-832*b* to help disambiguate the user's utterance 830 ("delete later") as there are two instances of the word "later." In some embodiments, device 800 displays indicators 832*a*-832*b* adjacent to (or within a threshold distance from) the first and second instance of the word "later," respectively. In some embodiments, device 800 displays a transparent overlay on the two instances of the word "later" (and/or highlights the two instances of the word). In some embodiments, indicators 832*a*-832*b* are selectable objects. In such embodiments, in response to detecting an input (e.g., a mouse click, a gesture, and/or a speech input) directed at a respective indicator (e.g., indicator 832*a* or indicator 832*b*). In response, device 800 deletes the respective instance of later (e.g., the first instance of the word "later" or the second instance of the word "later"). In some embodiments, device 800 detects an utterance identifying a respective indicator (e.g., "1" or "2"). In response, device 800 deletes the respective instance of later (e.g., the first instance of the word "later" or the second instance of the word "later").

Figure 8K:
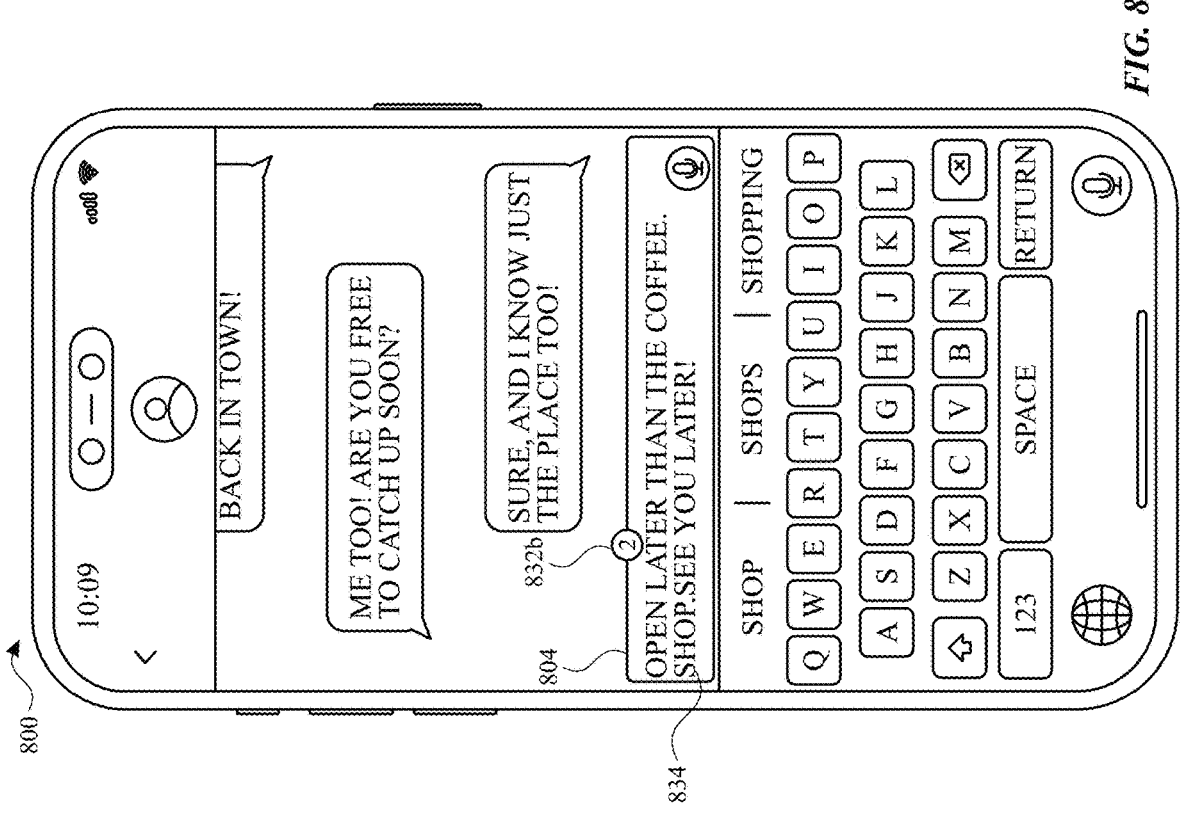

At FIG. 8J, while displaying indicators 832*a*-832*b*, device 800 detects input 850*j* (e.g., swipe, touch and drag, a gesture, and/or a speech input) corresponding to a request to scroll message compose region 804. In response to detecting input 850*j*, device 800 scrolls to a new portion of message compose region 804, as illustrated in FIG. 8K.

At FIG. 8K, device 800 displays third instance 834 of the word "later" in message compose region 804 that was not displayed when utterance 830 of FIG. 8I was detected. Accordingly, device 800 does not display an indicator for the third instance of the word "later." In some embodiments, device 800 displays an indicator for the third instance of the word "later." As depicted, device 800 continues to display indicator 832*b*. Additionally, device 800 has stopped displaying indicator 832*a* because the first instance of the word "later" is no longer displayed.

In some embodiments, device 800 detects an input (e.g., swipe, touch and drag, a mouse click, a gesture, and/or a speech input) corresponding to a request scroll back to the portion of text displayed in message compose region 804 of FIG. 8J. In response to detecting the input corresponding to the request to scroll back to the portion of text displayed in message compose region 804 of FIG. 8J, device 800 displays the first instance of the word "later" but does not display indicator 832*a*. In some embodiments, device 800 redisplays indicator 832*a* in response to detecting the input corresponding to the request to scroll back to the portion of text displayed in message compose region 804 of FIG. 8J.

FIG. 9 is a flow diagram illustrating a method for displaying effects while a dictation mode is active, in accordance with some embodiments. Method 900 is performed at a computer system (e.g., 100, 300, 500, 600, and/or 800) (e.g., a smartwatch, a smartphone, a tablet computer, a head mounted device (e.g., a head mounted augmented reality and/or extended reality device), and/or a laptop computer)

that is in communication with a display generation component (e.g., 601 and/or 801) (e.g., a display controller, a head mounted display system, a touch-sensitive display system, and/or a monitor). Some operations in method 900 are, optionally, combined, the orders of some operations are, optionally, changed, and some operations are, optionally, omitted.

As described below, method 900 provides an intuitive way for displaying effects when a dictation mode is active. The method reduces the cognitive burden on a user for determining when a dictation mode is active, thereby creating a more efficient human-machine interface. For battery-operated computing devices, enabling a user to search for relevant medications faster and more efficiently conserves power and increases the time between battery charges.

The computer system displays (902) a user interface (e.g., 612 and/or 802) (e.g., a user interface of an application) including an insertion point indicator (e.g., 614 and/or 806) (e.g., a caret or text cursor that demarks where content will be inserted). In accordance with a determination that a first set of criteria is satisfied, wherein the first set of criteria includes a criterion that is satisfied when a dictation mode (e.g., the dictation mode described with reference to FIGS. 8A-8K) (e.g., a transcription mode, a mode in which content is added in response to detecting a speech input, and/or a mode in which a computer operation is performed in response to detecting a speech input) (and/or a first input mode, such as a first keyboard input mode and/or a first language mode as described with respect to LINK CS1) is active (e.g., as described with reference to FIG. 6B) (e.g., enabled), the computer system displays (904) a dictation mode indicator (e.g., 814*a*-814*b*) (e.g., a graphical element or a user interface selectable object) (e.g., that indicates a dictation mode is active) (and/or at a location corresponding to the insertion point indicator) and the insertion point indicator concurrently with a first visual effect (e.g., 812 and/or 813) (e.g., a first visual appearance) (e.g., a first amount of transparency, a first size, a first animation, and/or a first color) at a location corresponding to (e.g., defined by and/or associated with) the insertion point indicator (e.g., the location of 812 and/or 813 with respect to text cursor 806) (e.g., the insertion point indicator itself, adjacent to a location of the insertion point indicator, and/or at least partially surrounding the insertion point indicator). In accordance with a determination that the first set of criteria is not satisfied, the computer system forgoes displaying (906) the dictation mode indicator and the insertion point indicator with the first visual effect at the location corresponding (e.g., defined by and/or associated with) to the insertion point indicator (e.g., text cursor 806 does not include 812 and/or 813 as illustrated in FIG. 6A) (e.g., while maintaining display of the insertion point indicator). In some embodiments, in accordance with a determination that the first set of criteria is not satisfied, the computer system displays the insertion point indicator with a second visual effect (e.g., a second amount of transparency, a second size, a second animation, and/or a second color) that is different from the first visual effect (e.g., the insertion point indicator is displayed with a visual effect that it would typically have when the dictation mode is inactive). In some embodiments, the computer system applies the first visual effect to the insertion point indicator (e.g., itself) (e.g., the computer system modifies the visual appearance of the insertion point indicator). In some embodiments, the computer system applies the first visual effect adjacent to (and/or at least partially around) the insertion point indicator. In some embodiments, first visual effect is a transparent (e.g., non-opaque) graphical element (e.g., a gradient graphical element and/or a shading graphical element). In some embodiments, displaying the insertion point indicator with a first visual effect includes concurrently displaying a visual effect at a first orientation relative to (e.g., left, right, top, bottom, and/or on) the insertion point indicator and a visual effect (the same or different visual effect) at a second orientation relative to (e.g., left, right, top, bottom, and/or on) the insertion point indicator. In some embodiments, displaying the insertion point indicator with the first visual effect includes displaying a visual effect on opposite sides (and/or in opposite directions) of the insertion point indicator (e.g., if a visual effect is displayed to the left of the insertion point indicator, then a visual effect (the same or different visual effect) is also displayed to the right of the insertion point indicator; similarly, if a visual effect is displayed above the insertion point indicator then a visual effect (the same or different visual effect) is also displayed below the insertion point indicator). In some embodiments, the first visual effect is overlaid on (e.g., overlaps with and/or touches) content (e.g., user-added text and/or images to a text-input field) on at least one side (e.g., left, right, top, and/or bottom) of the insertion point indicator. In some embodiments, displaying the insertion point indicator with the first visual effect includes displaying a visual effect in line with (e.g., on same horizontal axis as and/or on same line of text as) the insertion point indicator (e.g., the visual effect is in the text-input field and on the same line of text as the insertion point indicator). Displaying a dictation mode indicator and the insertion point indicator concurrently with a first visual effect at a location corresponding to the insertion point indicator when a dictation mode is active performs an operation when a set of conditions has been met and provides visual feedback that the dictation modes is active.

In some embodiments, the first visual effect is an animated effect (e.g., 812 and/or 813 gradually changes over time) (e.g., gradual change in transparency, size, and/or color). Including an animation as the first visual effect improves the computer system as it provides further visual feedback regarding the state of the computer system and that the dictation mode is active.

In some embodiments, the animated effect is decreasing (or varying) an opacity of a transparent overlay (e.g., the opacity of text cursor glow 812 gradually decreases and/or increases over time) (e.g., fading and/or reducing a glow of a text cursor and/or a trailing glow behind the text cursor). Including an animation of decreasing an opacity of a transparent overlay improves the computer system as it provides further visual feedback regarding the state of the computer system and that the dictation mode is active.

In some embodiments, the animation of the first visual effect includes a pulse (e.g., the size of 806 and/or 813 changes over time) (e.g., a gradual change in size of the visual effect and/or the visual effect grows and/or shrinks over time). Displaying a gradual change in size of the visual effect improves the computer system as it provides visual feedback regarding the state of the computer system and that the dictation mode is active.

In some embodiments, while the dictation mode is active, the computer system detects, via an audio input device (e.g., 609 and/or 803), a respective characteristic (e.g., amplitude, a volume, a decibel level, pitch, and/or speed) of an utterance (e.g., 850*b*, 822*a*-822*l*, and/or 830) (e.g., audio input, speech input, and/or vocal input). In response to detecting the respective characteristic of the utterance and in accordance with a determination that the respective characteristic satisfies a first set of utterance input criteria (in some embodiments, the first set of utterance input criteria includes a criterion a first volume threshold, a first decibel threshold, a first pitch threshold, and/or a first speed threshold), the computer system displays the first visual effect with a first visual characteristic (e.g., a size of text cursor 806, a size of text cursor glow 812, a color of text cursor 806, and/or a color of text cursor glow 812 as depicted in FIG. 8B) (e.g., size, color, and/or shape). In response to detecting the respective characteristic of the utterance and in accordance with a determination that the respective characteristic meets a second set of utterance input criteria (in some embodiments, the second set of utterance input criteria includes a criterion for a second volume threshold, a second decibel threshold, a second pitch threshold, and/or a second speed threshold) different from the first set of utterance input criteria, the computer system displays the first visual effect with a second visual characteristic (e.g., a smaller or larger size of text cursor 806, a smaller or larger size of text cursor glow 812, a different color of text cursor 806, and/or a different color of text cursor glow 812 than what is depicted in FIG. 8B) (e.g., size, color, and/or shape) different from the first visual characteristic. Conditionally displaying the first visual effect with different visual characteristics when different utterance input criteria is satisfied improves the computer system as it provides visual feedback that the computer system is receiving audio input while in a dictation mode.

In some embodiments, displaying the dictation mode indicator and the insertion point indicator concurrently with the first visual effect includes displaying a transparent overlay (e.g., 812 and/or 816) (e.g., a glow and/or a graphical element having a first amount of opacity). In some embodiments, the transparent overlay is overlaid on the insertion point indicator. In some embodiments, the transparent overlay is overlaid on a portion of the user interface adjacent to (and/or partially surrounding) the insertion point indicator. In some embodiments, an opacity of a transparent overlay is gradually decreased (e.g., fading and/or reducing a trailing glow). Displaying a transparent overlay improves the computer system as it provides visual feedback regarding the state of the computer system and that the dictation mode is active.

In some embodiments, while the dictation mode is active, the computer system detects, via one or more input devices (e.g., 608, 605, 609, 801, and/or 803) (e.g., a touch-sensitive surface, a keyboard, a controller, a rotatable input device, microphone, and/or a mouse), a request to change a keyboard mode (e.g., 850*e*2, a selection of hotkey, a selection of a predetermined set of keys, speech input, and/or a gesture) (e.g., a change from a first keyboard mode to a second keyboard mode as discussed in reference to FIGS. 6A-6L and FIG. 7). In response to detecting the request to change the keyboard mode, the computer system displays, via the display generation component, a keyboard mode indicator (e.g., 616 and/or 624) that, when selected, initiates a change in a keyboard mode (e.g., to the English keyboard mode and/or Greek keyboard mode as described in reference to FIGS. 6A-6L) (e.g., selecting the keyboard mode indicator immediately causes a change to the keyboard mode and/or selecting the keyboard mode indicator causes display of one or more selectable objects to change the keyboard mode). In some embodiments, the keyboard mode is concurrently displayed with the dictation mode indicator (e.g., 820 is displayed with 814*a* and/or 814*b* as depicted in FIG. 8F) (and/or concurrently with a dictation language selectable object that, when selected, initiates a change in a dictation language). In some embodiments, the computer system detects a selection of the dictation language selectable object and in response, immediately causes a change to the dictation language. In some embodiments, the computer system detects a selection of the dictation language selectable object and in response, causes display of one or more selectable objects to change the dictation language. In some embodiments, the dictation language indicator indicates which language model or algorithm is being used to transcribe detected speech input. Displaying the dictation mode indicator concurrently with a keyboard mode indicator that, when selected, initiates a change in a keyboard mode in response to detecting the request to change the keyboard mode improves the computer system as it provides visual feedback that a keyboard mode has changed while the dictation mode is still active, which improves the user interface of a computer system that utilizes multiple input devices to generate content.

In some embodiments, while the dictation mode is active, the computer system detects a request to change a keyboard mode (e.g., 850*e*2, a selection of hotkey, a selection of a predetermined set of keys, speech input, and/or a gesture) (e.g., a change from a first keyboard mode to a second keyboard mode as discussed in reference to FIGS. 6A-6L and FIG. 7). In response to detecting the change in the keyboard mode, the computer system ceases to display the dictation mode indicator (e.g., 814*a*), ceases to display a dictation language selectable object (e.g., 814*b*) that, when selected, initiates a change in a dictation language, and displays a keyboard mode indicator (e.g., 820) that, when selected, initiates a change in a keyboard mode (e.g., selecting the keyboard mode indicator immediately causes a change to the keyboard mode and/or selecting the keyboard mode indicator causes display of one or more selectable objects to change the keyboard mode). Ceasing to display the dictation mode indicator and a dictation language selectable object that, when selected, initiates a change in a dictation language, while displaying a keyboard mode indicator that, when selected, initiates a change in a keyboard mode in response to the detecting a change in the keyboard mode improves the computer system as it provides visual feedback that a keyboard mode has changed while still providing the user with the ability to change the keyboard mode, which improves the user interface of a computer system multiple input devices having different input languages.

In some embodiments, the user interface includes text (e.g., the text in message compose region 804 of FIG. 8I) (e.g., text within a document or text field). In some embodiments, while the dictation mode is active, the computer system detects, via an audio input device (e.g., 609 and/or 803), an utterance (e.g., 822*k*) (e.g., speech input and/or audible command) including a request to modify (e.g., add, delete, and/or change) a respective term (e.g., the word "later") (e.g., word and/or phrase) within the text. In some embodiments, in response to detecting the utterance including the request to modify the respective term within the text and in accordance with a determination that a set of term criteria is satisfied, wherein the set of term criteria includes a criterion that is satisfied when there are at least two instances of the respective term that occur in the text (e.g., there are two instances of the word "later" in FIGS. 8I-8J) (and/or in some embodiments, in accordance with a determination that a threshold number instances of the respective term occur in the text), the computer system displays, via the display generation component, a first indication (e.g., 832*a*) (e.g., symbol, number, letter, and/or color) corresponding to a first instance of the respective term (e.g., the first instance of the word later in message compose region 804 of FIG.

8J). In some embodiments, in response to detecting the utterance including the request to modify the respective term within the text and in accordance with a determination that a set of term criteria is satisfied, the computer system displays, via the display generation component, a second indication (e.g., 832*b*), different from the first indication, corresponding to a second instance of the respective term (e.g., the second instance of the word later in message compose region 804 of FIG. 8J). In some embodiments, in accordance with a determination that the set of term criteria is not satisfied (e.g., there is only a single instance of the respective term in the text and/or there is less than two instances of the respective term), the computer system forgoes displaying the first indication and forgoes displaying the second indication. In some embodiments, in accordance with a determination that the set of term criteria is not satisfied, no indication of the respective term is displayed. In some embodiments, the computer system only analyzes a currently displayed portion of text at the time the request to modify the respective term was detected (i.e., the computer system does not analyze an off-screen portion of the text). In some embodiments, the first indication is displayed at a location corresponding to a location of the first instance of the respective term. In some embodiments, the second indication is displayed at a location corresponding to a location of the second instance of the respective term. In some embodiments, the computer system displays a unique indication corresponding to specific to each instance of the respective term. Displaying a first identifier and a second identifier corresponding to a first instance and a second instance of the respective term, respectively, if the set of term criteria is satisfied improves the computer system because it performs an operation when a set of conditions has been met without requiring further user input and allows the user to disambiguate a command involving a respective term when there are at least two instances of a respective term in the text.

In some embodiments, the first indication includes a first selectable object (e.g., 832*a* is an affordance) that, when selected, initiates (e.g., immediately causes and/or initiates a process to cause) a process for modifying the first instance of the respective term (e.g., selection of 832*a* deletes the first instance of the word "later") (in some embodiments, without modifying the second instance of the respective term). In some embodiments, the second indication includes a second selectable object that, when selected, initiates (e.g., immediately causes and/or initiates a process to cause) a process for modifying the second instance of the respective term (e.g., selection of 832*b* deletes the second instance of the word "later") (in some embodiments, without modifying the first instance of the respective term). Including, in the first indication, a first selectable object that, when selected, initiates modification of the first instance of the respective term, and including, in the second indication, a second selectable object that, when selected, initiates the modification of the second instance of the respective term improves the computer system because it allows the user to provide non-verbal input to disambiguate a command involving a respective term when there are at least two instances of a respective term in the text.

In some embodiments, the first indication and the second indication are displayed in a first portion of the user interface (e.g., the portion of 804 depicted in FIG. 8J) (e.g., in a first portion of a text field, such as a text field having editable text and/or a text field of a document). In some embodiments, while displaying the first portion of the user interface (e.g., and/or while not displaying a second portion of the user interface), the computer system detects, via one or more input devices, a request (e.g., 850*j*) to navigate to a second portion of the user interface (e.g., the portion of 804 depicted in FIG. 8K) (e.g., different from the first portion) (e.g., where the second portion corresponds to a portion of the user interface that was not displayed when the request to modify the respective term was detected). In some embodiments, in response to detecting the request to navigate to the second portion of the user interface, the computer system displays, via the display generation component, a third instance of the respective term (e.g., a third instance of the word "later" is displayed in the portion of 804 depicted in FIG. 8K) while not displaying a third indication corresponding to the third instance of the respective term (e.g., device 800 does not display a third icon, such as 832*a*-832*b*, next to the third instance of the word "later," as depicted in FIG. 8K) (and/or without detecting an additional request to modify the respective term within the text) (e.g., the computer system does not display an indication for instances of the respective term that are not displayed (e.g., off-screen) when the request to modify the respective term was detected even if the user navigates to the off-screen instance of the respective term). In some embodiments, the computer system displays a unique indication corresponding to specific instances of the respective term that are currently displayed when the utterance including the request to modify the respective term is detected. In some embodiments, the set of term criteria includes a criterion that is satisfied when the at least two instances of the respective term occur in a currently displayed portion of the text when the utterance including the request to modify the respective term is detected. In some embodiments, in response to detecting the request to navigate to the second portion of the user interface, the computer system displays, via the display generation component, a third instance of the respective term with a third indication corresponding to the third instance of the respective term. Displaying a third instance of the respective term while not displaying a third indication corresponding to the third instance of the respective term in response to detecting the request to navigate to a second portion of the user interface improves the computer system because it declutters the user interface.

In some embodiments, the first indication (and/or the second indication) is displayed in a respective portion of the user interface (e.g., an upper portion of 804 including the text "Let's meet up later tonight," as depicted in FIG. 8J). In some embodiments, while displaying the respective portion of the user interface, the computer system detects, via one or more input devices, a request (e.g., 850*j*) to navigate to a portion of the user interface that does not include the first instance (and/or the second instance) of the respective term (e.g., the portion of 804 depicted in FIG. 8K). In some embodiments, in response to detecting the request to navigate to the portion of the user interface that does not include the first instance, the computer system ceases display of the first indication (e.g., 832*a* is no longer displayed, as depicted in FIG. 8K) (and/or the second indication) (e.g., the first indication and/or the second indication are shifted off-screen). In some embodiments, while displaying the portion of the user interface that does not include the first indication (and/or the second indication) (e.g., the first indication and/or the second indication are shifted off-screen), the computer system detects, via the one or more input devices, a request to navigate back to the respective portion of the user interface (e.g., a request scroll back up to the upper portion of 804 including the text "Let's meet up later tonight," as depicted in FIG. 8J). In some embodiments, in response to detecting the request to navigate back to the respective portion of the user interface, the computer system displays (e.g., re-displays) the first instance (and/or the second instance) of the respective term while not redisplaying the first indication (e.g., device 600 displays the upper portion of 804 including the text "Let's meet up later tonight," as depicted in FIG. 8J, but without indicator 832*a*) (and/or the second indication) (e.g., the first indication is not persistently displayed once the first instance of the respective term has been shifted off-screen). In some embodiments, in response to detecting the request to navigate to the respective portion of the user interface, the computer system displays the first instance (and/or the second instance) of the respective term and displays (e.g., re-displays) the first indication (and/or the second indication). Displaying the first instance (and/or the second instance) of the respective term while not redisplaying first indication (and/or the second indication) in response to detecting the request to navigate to back to the respective portion of the user interface improves the computer system because it declutters the user interface.

In some embodiments, while displaying the user interface, the computer system detects a request to modify (e.g., added, changed, and/or deleted) content (e.g., change the word today in message compose region 804 of FIG. 8G to tonight and/or 822*k*) (e.g., an alphanumeric text, a word, a phrase, and/or a symbol). In some embodiments, in response to detecting the request to modify the content and in accordance with a determination that a set of content criteria is satisfied, wherein the set of content criteria is satisfied includes a criterion that is satisfied when content (e.g., an alphanumeric text, a word, a phrase, and/or a symbol) is being modified in response to detecting a speech input (e.g., 822*k* is a speech input and not a keystroke input) (e.g., the content is modified in response to a user's utterance and/or content is modified in response on a user's speech command), the computer system displays (e.g., at least temporarily and/or for a threshold amount of time), via the display generation component, respective content (e.g., the word tonight in FIG. 8I) (e.g., content that is being modified) with a third visual characteristic (e.g., 828) (e.g., a first color, a first size, a first amount of transparent overlay, and/or the first visual effect) (e.g., at a location corresponding to the respective content). In some embodiments, in response to detecting the request to modify the content and in accordance with the determination that the set of content criteria is not satisfied (e.g., 822*k* is a keystroke input and not a speech input) (e.g., the recently modified content is modified in response to an input different from speech input), the computer system displays, via the display generation component, the respective content without the third visual characteristic (e.g., the word tonight in FIG. 8I is not displayed with 828 and/or is not visually distinguished from other text in message compose region 804 of FIG. 8I) (e.g., the respective content is displayed in a manner that the respective content would be displayed if the respective content is modified in response to an input different from the speech input). In some embodiments, in accordance with the determination that the first set of criteria is not satisfied, the computer system displays the content with a fourth visual characteristic (e.g., a fourth color, a fourth size, a fourth amount of transparent overlay, and/or a fourth visual effect) different from the third visual characteristic. Conditionally displaying respective content with a third visual characteristic when content is modified in response to detecting a speech input improves the computer system because it provides visual feedback that speech input was detected and what content was modified in response to that speech input so that the user can undo the modification if the computer system did not correctly apply the speech input.

In some embodiments, the third visual characteristic includes a transparent graphical element (e.g., 828 is a transparent overlay) (e.g., a glow, a fade, and/or shading) overlaid on the respective content. In some embodiments, the transparent graphical element is animated (e.g., gradually modified over time). In some embodiments, an amount of transparency the transparent graphical element is gradually increased (e.g., the transparent graphical element slowly disappears). In some embodiments, a size the transparent graphical element is gradually reduced (e.g., the transparent graphical element slowly shrinks). Including a transparent graphical element overlaid on the respective content as the third visual characteristic improves the computer system because it provides visual feedback that speech input was detected and what content was modified in response to that speech input so that the user can undo the modification if the computer system did not correctly apply the speech input.

In some embodiments, the first visual effect at least partially surrounds (e.g., around and/or encompassing) the insertion point indicator (e.g., 812 is displayed around a first portion and not a second portion of text cursor 806) (e.g., the first visual effect surrounds at least 25% of the insertion point indicator, at least 50% of the insertion point indicator, at least 75% of the insertion point indicator, at least 90% of the insertion point indicator, and/or 100% of the insertion point indicator). Displaying the first visual effect at least partially surrounding the insertion point indicator improves the computer system as it provides visual feedback that the dictation mode is active at the point of insertion.

In some embodiments, the first visual effect includes a first portion and a second portion (e.g., 812 includes a top portion, bottom portion, left portion, and/or right portion with respect to text cursor 806). In some embodiments, the first portion is displayed on a first side (e.g., 812 is displayed on the left and/or above text cursor 806) (e.g., a left, a right, a top, and/or a bottom portion) of the insertion point indicator. In some embodiments, the second portion is displayed on a second side (e.g., 812 is displayed on the right and/or below text cursor 806 (e.g., a left, a right, a top, and/or a bottom portion), opposite the first side, of the insertion point indicator. In some embodiments, the first portion and the second portion include the same (or different) visual characteristic (e.g., color, shape, size, transparent overlay, glow). Displaying a fourth visual characteristic and a fifth visual characteristic of the visual effect on opposite sides of the insertion point indicator improves the computer system as it provides visual feedback that the dictation mode is active.

In some embodiments, while the dictation mode is active and while the first visual effect is displayed at a location corresponding to (e.g., defined by and/or associated with) a first location of the insertion point indicator (e.g., the location of 806 depicted in FIG. 8B) (e.g., corresponding to an initial location), the computer system detects, via an audio input device (e.g., 609 and/or 803), an utterance (e.g., 850*b*) (e.g., an utterance including respective content (e.g., number, symbol, word, and/or phrase)). In some embodiments, in response to detecting the utterance (and/or while detecting the utterance), the computer system displays, via the display generation competent, the insertion point indicator at an updated location different from the first location (e.g., the location of 806 depicted in FIG. 8C) (e.g., the insertion point indicator has moved based on adding content detected in the utterance). In some embodiments, in response to detecting the utterance (and/or while detecting the utterance), the computer system displays, via the display generation competent, the first visual effect at a location corresponding (e.g., defined by and/or associated with) to the updated location of the insertion point indicator (e.g., 812 is displayed around the text cursor 806 in FIG. 8C). In some embodiments, in response to detecting the utterance (and/or while detecting the utterance), the computer system displays (e.g., at least temporarily and/or for a threshold amount of time), via the display generation competent, a second visual effect (e.g., 816 of FIGS. 8C-8D) (e.g., the same and/or different from the second visual effect) at the location corresponding to the first location of the insertion point indicator. In some embodiments, the second visual effect has a visual characteristic (e.g., color, overlay, and/or glow) that is the same as (and/or different from) the first visual effect. In some embodiments, the second visual effect includes a fading (e.g., gradual change in opacity) of the first visual effect. In some embodiments, the second visual effect is a trailing visual effect (e.g., lags and/or follows behind) the insertion point indicator when the insertion point indicator moves. In some embodiments, the computer system ceases to display the first visual effect the location corresponding to the first location of the insertion point indicator after a threshold amount of time has been met (e.g., 0.5 seconds, 1 second, and/or 2 seconds). In some embodiments, in accordance with a determination that the insertion point indicator has moved in response to an input other than an utterance (e.g., a keystroke and/or an input on the keyboard) the second visual effect is not displayed at the location corresponding to the first location of the insertion point indicator. In some embodiments, in accordance with a determination that the insertion point indicator has moved in response to an utterance (e.g., speech input and/or audio input) the second visual effect is displayed at the location corresponding to the first location of the insertion point indicator. Displaying the first visual effect at a location corresponding to the updated location of the insertion point indicator and displaying of a second visual effect at the location corresponding to the first location of the insertion point indicator improves the computer system as it provides visual feedback that an utterance was detected, provides visual feedback that the cursor has moved based on an utterance (e.g., as opposed to an input other than an utterance), and/or provides visual feedback that the computer system is processing (e.g., still processing) the utterance.

In some embodiments, in response to detecting the utterance, the computer system ceases displaying the dictation mode indicator (e.g., 814*a*-814*b* are not displayed in FIGS. 8C-8D) (e.g., the dictation mode indicator is not displayed while a dictation is being processed). In some embodiments, while the first visual effect is displayed at the location corresponding to the updated location of the insertion point indicator, the computer system detects an end of the utterance (e.g., device 800 detects an end of utterance 850*b* and/or device 800 detects silence after utterance 850*b*) (e.g., no additional utterance is detected). In response to detecting the end of the utterance, the computer system ceases display of the second visual effect (e.g., device 800 eventually ceases to display trailing glow 816 when catches up to text cursor 806) and displays (e.g., re-displays), via the display generation component, the dictation mode indicator (e.g., 812 is displayed around the text cursor 806 in FIG. 8D). In some embodiments, the computer system displays the dictation mode indicator is displayed when a set of redisplay criteria is satisfied. In some embodiments, the set of redisplay criteria includes a criterion that is satisfied when the computer system is no longer processing the utterance (and/or new utterances). In some embodiments, the dictation mode indicator is displayed at the same time (and/or within a threshold amount of time, such as 0.5 seconds and/or 1.0 second) that the second visual effect ceases to be displayed. Displaying the dictation mode indicator and ceasing to display of the second visual effect in response to detecting an end of the utterance improves the computer system because it provides visual feedback that the computer system that the end of the utterance has been detected.

Note that details of the processes described above with respect to method 900 (e.g., FIG. 9) are also applicable in an analogous manner to the methods described above and below. For example, methods 700 and 1000 optionally includes one or more of the characteristics of the various methods described above with reference to method 900. For example, methods 700 and 1000 can include displaying effects while the dictation mode is active and/or changing the dictation languages as described above. For brevity, these details are not repeated below.

FIG. 10 is a flow diagram illustrating a method for displaying a transcription when an utterance includes a command keyword, in accordance with some embodiments. Method 1000 is performed at a computer system (e.g., 100, 300, 500, 600, and/or 800) (e.g., a smartwatch, a smartphone, a tablet computer, a head mounted device (e.g., a head mounted augmented reality and/or extended reality device), and/or a laptop computer) that is in communication with a display generation component (e.g., 601 and/or 801) (e.g., a display controller, a head mounted display system, a touch-sensitive display system, and/or a monitor) and audio input device (e.g., 609 and/or 803) (e.g., audio sensor and/or microphone). Some operations in method 1000 are, optionally, combined, the orders of some operations are, optionally, changed, and some operations are, optionally, omitted.

As described below, method 1000 provides an intuitive way for displaying a transcription when an utterance includes a command keyword. The method reduces the cognitive burden on a user for viewing a transcription when an utterance includes a command keyword, thereby creating a more efficient human-machine interface. For battery-operated computing devices, enabling a user to search for relevant medications faster and more efficiently conserves power and increases the time between battery charges.

The computer system displays (1002) a user interface (e.g., 612 and/or 802) (e.g., a user interface of an application). While displaying the user interface, the computer system detects (1004), via the audio input device, a keyword (e.g., the word "send" and/or "change" as described in reference to FIG. 8H) (e.g., a set of one or more keywords) (e.g., a word or phrase associated with a command and/or a word or phrase that triggers a command) in a first portion of an utterance (e.g., "change" and/or "I need to change" in utterance 822*l* and/or "change today to tonight" in utterance 822*k*) (e.g., verbal input and/or speech input) that is potentially a command (e.g., change today to tonight, as described with reference to 822*k*) (e.g., a request to perform a specific command and/or an instruction to perform a specific command). In response to detecting the keyword in the first portion of the utterance (1006) (and while detecting a second portion of the utterance) and in accordance with a determination that the first portion of the utterance satisfies a first set of criteria, the computer system performs (1008) an operation (e.g., device 800 changes today to tonight as described with reference to FIG. 8I) (e.g., a function and/or a task) associated with (e.g., corresponding to and/or specific to) the command without displaying a transcription (e.g., alphanumeric text and/or content) of the utterance that includes the keyword (e.g., "change today to tonight" is not transcribed). In response to detecting the keyword in the first portion of the utterance (1006) (and while detecting a second portion of the utterance) and in accordance with a determination that the first portion of the utterance does not satisfy the first set of criteria, the computer system displays (1010), via the display generation component and in the user interface (e.g., in a text field of the user interface), the transcription (e.g., alphanumeric text and/or content) of the utterance that includes the keyword (e.g., device 800 begins transcribing "change" and/or "I need to change" in utterance 822*l*) while a second portion (e.g., "clothes before we meet up" in utterance 822*l*) (e.g., a second portion of the phrase, a second portion that occurs after the first portion, and/or prior to detecting an end of the utterance) (in some embodiments, detecting the end of the utterance is in accordance with a determination that the user has paused and/or is silent for a threshold amount of time) of the utterance is being detected without performing the operation associated with the command (e.g., device 800 does not modify text and/or device 800 does not perform a command associated with the command keyword "change"). In some embodiments, the computer system displays the transcription of the first portion of the utterance including the keyword prior to detecting the second portion (e.g., occurring after the first portion and/or before an end) of the utterance (e.g., prior to detecting a pause or silence for a threshold amount of time). In some embodiments, the computer system displays a transcription of the first portion of the utterance that includes the keyword prior to detecting the second portion of the utterance. In some embodiments, the keyword occurs at the beginning of the utterance (and/or phrase) (e.g., the keyword of 'send' in the phrases "Send the message." and/or "Send me your address."). In some embodiments, the keyword occurs at a location different from the beginning of the utterance (and/or phrase) (e.g., the keyword of 'send' in the phrases "Can you send it?" and/or "Send me your address."). In some embodiments, the keyword is not at a beginning of the utterance (and/or phrase). Conditionally performing an operation associated with the command without displaying a transcription of the utterance that includes the keyword or displaying the transcription of the utterance that includes the keyword while a second portion of the utterance is being detected without performing the operation associated with the command if the first portion of the utterance does (or does not) satisfy the first set of criteria improves the computer system as it provides visual feedback that the computer system has not detected a command and provides a transcription of a portion of the utterance while the utterance is still being detected.

In some embodiments, the transcription of the utterance that includes the keyword is displayed (e.g., device 800 displays a transcription of the command keyword "change" in utterance 824*l*) (e.g., begins to be displayed) within a threshold amount of time (e.g., in near real-time, in real-time, 1 second, and/or 2 seconds) of the determination that the first portion of the utterance does not satisfy the first set of criteria (e.g., device 800 displays the transcription of the command keyword "change" in utterance 822*l* around the same time that device 800 determines change and/or utterance 822*l* does not correspond to a command) (e.g., the transcription is displayed at substantially (e.g., 0.5, 1, 2, or 3 seconds) the same time as the moment it is determined that the speech input is not a command). Displaying the transcription of the utterance that includes the keyword within a threshold amount of time of the determination that the first portion of the utterance does not satisfy the first set of criteria improves the computer system as it provides visual feedback that the computer system has not detected a command and provides a transcription of the utterance as soon as possible.

In some embodiments, the first set of criteria includes a criterion (e.g., a leading pause criterion) that is satisfied when a lack of speech input preceding (e.g., immediately preceding) (e.g., coming before and/or prior to) the keyword (e.g., a pause in the utterance before the keyword and/or silence before the keyword) meets a first threshold amount of time (e.g., as described with reference to 826*b*) (e.g., a pause before the keyword will increase the likelihood that the keyword is intended to trigger a command) (e.g., "Let's catch up today. <pause> Change 'today' to tonight"). In some embodiments, the first threshold amount of time is 0.5 seconds, 0.8 seconds, 1.1 seconds, 1.4 seconds, or 2 seconds. In some embodiments, the first threshold amount of time is a value in the range of 0.5-1.1 seconds. Including a criterion that is satisfied when a lack of speech input preceding the keyword meets a first threshold amount of time improves the computer system because it helps disambiguate the user's utterance when it includes a keyword (e.g., it helps establish whether the presence of the keyword in the utterance should trigger a command).

In some embodiments, the first set of criteria includes a criterion (e.g., a trailing pause criterion) that is satisfied when a lack of speech input succeeding (e.g., immediately succeeding) (e.g., coming after and/or following) the keyword (e.g., a pause in the utterance after the keyword and/or silence after the keyword) meets a second threshold amount of time (e.g., as described with reference to 826*c*) (e.g., same as or different from the first threshold amount of time) (e.g., a pause after the keyword will increase the likelihood that the keyword is intended to trigger a command) (e.g., compare "send <pause>" with "send <no pause> me your address"). In some embodiments, the second threshold amount of time is 0.5 seconds, 0.8 seconds, 1.1 seconds, 1.4 seconds, or 2 seconds. In some embodiments, the second threshold amount of time is a value in the range of 0.5-1.1 seconds. Including a criterion in the first set of criteria that is satisfied when a lack of speech input succeeding the keyword meets a second threshold amount of time improves the computer system because it helps disambiguate the user's utterance when it includes a keyword (e.g., it helps establish whether the presence of the keyword in the utterance should trigger a command).

In some embodiments, the first set of criteria includes a criterion (e.g., a target word criterion) that is satisfied when a respective word in the utterance corresponds (e.g., matches) to a word in a text field of the user interface (e.g., as described with reference to 826*f*) (e.g., an editable text field and/or a document having editable text) (e.g., if an utterance includes a word that is found in a text field, it will increase the likelihood that the keyword is intended to trigger a command). Including a criterion in the first set of criteria that is satisfied when a respective word in the utterance corresponds to a word in a text field improves the computer system because it helps disambiguate the user's utterance when it includes a keyword (e.g., it helps establish whether the presence of the keyword in the utterance should trigger a command).

In some embodiments, the first set of criteria includes a criterion (e.g., a syntactic criterion) that is satisfied when the first portion of the utterance satisfies a set of one or more syntax (e.g., grammatical, linguistic, sentence structure, and/or word order) criteria (e.g., as described with reference to 826*e*, such as the sentence criterion and/or syntactic error criterion described with reference to FIG. 8H) (e.g., compare the syntax of the word send in the utterances "let's get going send" and "can you send it"). In some embodiments, the set of one or more syntax criteria includes a criterion that is satisfied when a syntactic break (e.g., a grammatically correct sentence and/or a complete phrase) precedes (e.g., immediately precedes) the keyword (e.g., if the keyword follows a complete sentence, it will increase the likelihood that the keyword is intended to trigger a command). In some embodiments, the set of one or more syntax criteria includes a criterion that is satisfied when the keyword does not introduce an error in syntax (e.g., the keyword does not form a grammatically correct sentence) (e.g., if the keyword introduces a syntactic error, it will increase the likelihood that the keyword is intended to trigger a command) (e.g., compare the word send in the utterances "let's get going send" and "can you send it"). Including a criterion in the first set of criteria that is satisfied when the first portion of the utterance satisfies a set of syntax criteria improves the computer system because it helps disambiguate the user's utterance when it includes a keyword and whether the syntax of the keyword should trigger a command.

In some embodiments, the first set of criteria includes a criterion (e.g., a semantic criterion) that is satisfied based on a semantic context of the keyword (e.g., as described with reference to 826*d*) (e.g., a detected meaning of the keyword based on other words in the utterance and/or linguistic meaning) (e.g., compare the semantic context of the word send in the utterances "I don't have the address. Send it when you can." and "I don't have the address. Send message"). In some embodiments, the computer system detects the semantic context of the keyword based on a word or sentence preceding the keyword (e.g., in the same sentence as the keyword and/or in a different sentence as the keyword). In some embodiments, the computer system detects the semantic context of the keyword based on a word or sentence succeeding the keyword (e.g., in the same sentence as the keyword and/or in a different sentence as the keyword). Including a criterion in the first set of criteria that is satisfied based on a semantic context of the keyword improves the computer system because it helps disambiguate the user's utterance when it includes a keyword and whether the keyword's semantic context indicates the keyword should trigger a command.

In some embodiments, the user interface includes text (e.g., the text in message compose region 804 of FIG. 8I) (e.g., text within a document or text field). In some embodiments, the computer system detects, via the audio input device, an utterance (e.g., 822*k*) (e.g., speech input and/or audible command) including a request to change modify (e.g., add, delete, and/or change) a respective term (e.g., the word "later") (e.g., word and/or phrase) within the text. In response to detecting the utterance including the request to modify the respective term within the text and in accordance with a determination that a set of term criteria is satisfied, wherein the set of term criteria includes a criterion that is satisfied when there are at least two instances of the respective term that occur in the text (e.g., there are two instances of the word "later" in FIGS. 8I-8J) (and/or in some embodiments, in accordance with a determination that a threshold number instances of the respective term occur in the text): the computer system displays, via the display generation component, a first indication (e.g., 832*a*) (e.g., symbol, number, letter, and/or color) corresponding to a first instance of the respective term (e.g., the first instance of the word later in message compose region 804 of FIG. 8J); and displays, via the display generation component, a second indication (e.g., 832*b*), different from the second indication, corresponding to a second instance of the respective term (e.g., the second instance of the word later in message compose region 804 of FIG. 8J). In some embodiments, in accordance with a determination that the set of term criteria is not satisfied (e.g., there is only a single instance of the respective term in the text and/or there is less than two instances of the respective term), the computer system forgoes displaying the first indication and forgoes displaying the second indication. In some embodiments, in accordance with a determination that the set of term criteria is not satisfied, no indication of the respective term is displayed. In some embodiments, the computer system only analyzes a currently displayed portion of text at the time the request to modify the respective term was detected (i.e., the computer system does not analyze an off-screen portion of the text). In some embodiments, the first indication is displayed at a location corresponding to a location of the first instance of the respective term. In some embodiments, the second indication is displayed at a location corresponding to a location of the second instance of the respective term. In some embodiments, the computer system displays a unique indication corresponding to specific to each instance of the respective term. Displaying a first identifier and a second identifier corresponding to a first instance and a second instance of the respective term, respectively, if the set of term criteria is satisfied improves the computer system because it performs an operation when a set of conditions has been met without requiring further user input and allows the user to disambiguate a command involving a respective term when there are at least two instances of a respective term in the text.

In some embodiments, the first indication includes a first selectable object (e.g., 832*a* is an affordance) that, when selected, initiates (e.g., immediately causes and/or initiates a process to cause) a process for modifying the first instance of the respective term (e.g., selection of 832*a* deletes the first instance of the word "later") (in some embodiments, without modifying the second instance of the respective term). In some embodiments, the second indication includes a second selectable object that, when selected, initiates (e.g., immediately causes and/or initiates a process to cause) a process for modifying the second instance of the respective term (e.g., selection of 832*b* deletes the second instance of the word "later") (in some embodiments, without modifying the first instance of the respective term). Including, in the first indication, a first selectable object that, when selected, initiates modification of the first instance of the respective term, and including, in the second indication, a second selectable object that, when selected, initiates the modification of the second instance of the respective term improves the computer system because it allows the user to provide non-verbal input to disambiguate a command involving a respective term when there are at least two instances of a respective term in the text.

In some embodiments, the first indication and the second indication are displayed in a first portion of the user interface (e.g., the portion of 804 depicted in FIG. 8J) (e.g., in a first portion of a text field, such as a text field having editable text and/or a text field of a document). In some embodiments, while displaying the first portion of the user interface (e.g., and/or while not displaying a second portion of the user interface), the computer system detects, via one or more input devices, a request (e.g., 850*j*) to navigate to a second portion of the user interface (e.g., the portion of 804 depicted in FIG. 8K) (e.g., different from the first portion) (e.g., where the second portion corresponds to a portion of the user interface that was not displayed when the request to modify the respective term was detected). In some embodiments, in response to detecting the request to navigate to the second portion of the user interface, the computer system displays, via the display generation component, a third instance of the respective term (e.g., a third instance of the word "later" is displayed in the portion of 804 depicted in FIG. 8K) while not displaying a third indication corresponding to the third instance of the respective term (e.g., device 800 does not display a third icon, such as 832a-832b, next to the third instance of the word "later," as depicted in FIG. 8K) (and/or without detecting an additional request to modify the respective term within the text) (e.g., the computer system does not display an indication for instances of the respective term that are not displayed (e.g., off-screen) when the request to modify the respective term was detected even if the user navigates to the off-screen instance of the respective term). In some embodiments, the computer system displays a unique indication corresponding to specific instances of the respective term that are currently displayed when the utterance including the request to modify the respective term is detected. In some embodiments, the set of term criteria includes a criterion that is satisfied when the at least two instances of the respective term occur in a currently displayed portion of the text when the utterance including the request to modify the respective term is detected. In some embodiments, in response to detecting the request to navigate to the second portion of the user interface, the computer system displays, via the display generation component, a third instance of the respective term with a third indication corresponding to the third instance of the respective term. Displaying a third instance of the respective term while not displaying a third indication corresponding to the third instance of the respective term in response to detecting the request to navigate to a second portion of the user interface improves the computer system because it declutters the user interface.

In some embodiments, the first indication (and/or the second indication) is displayed in a respective portion of the user interface (e.g., an upper portion of 804 including the text "Let's meet up later tonight," as depicted in FIG. 8J). In some embodiments, while displaying the respective portion of the user interface, the computer system detects, via one or more input devices, a request (e.g., 850j) to navigate to a portion of the user interface that does not include the first instance (and/or the second instance) of the respective term (e.g., the portion of 804 depicted in FIG. 8K). In some embodiments, in response to detecting the request to navigate to the portion of the user interface that does not include the first instance, the computer system ceases displaying the first indication (e.g., 832a is no longer displayed, as depicted in FIG. 8K) (and/or the second indication) (e.g., the first indication and/or the second indication are shifted off-screen). In some embodiments, while displaying the portion of the user interface that does not include the first indication (and/or the second indication) (e.g., the first indication and/or the second indication are shifted off-screen), the computer system detects, via the one or more input devices, a request to navigate back to the respective portion of the user interface (e.g., a request scroll back up to the upper portion of 804 including the text "Let's meet up later tonight," as depicted in FIG. 8J). In some embodiments, in response to detecting the request to navigate back to the respective portion of the user interface, the computer system displays (e.g., re-displays) the first instance (and/or the second instance) of the respective term while not redisplaying the first indication (e.g., device 600 displays the upper portion of 804 including the text "Let's meet up later tonight," as depicted in FIG. 8J, but without indicator 832a) (and/or the second indication) (e.g., the first indication is not persistently displayed once the first instance of the respective term has been shifted off-screen). In some embodiments, in response to detecting the request to navigate to the respective portion of the user interface, the computer system displays the first instance (and/or the second instance) of the respective term and displays (e.g., re-displays) the first indication (and/or the second indication). Displaying the first instance (and/or the second instance) of the respective term while not re-displaying (e.g., does not re-display) the first indication (and/or the second indication) in response to detecting the request to navigate to back to the respective portion of the user interface improves the computer system because it declutters the user interface.

Note that details of the processes described above with respect to method 1000 (e.g., FIG. 10) are also applicable in an analogous manner to the methods described above. For example, methods 700 and 900 optionally includes one or more of the characteristics of the various methods described above with reference to method 1000. For example, methods 700 and 900 can include displaying a transcription in the manner described above and/or using various criteria for determining whether or not an utterance including a command keyword is a command. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of input modes or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content regarding various input modes that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing input modes, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and/or information regarding specific input modes can be selected and delivered to users by inferring preferences based on non-personal information data or a bare minimum amount of personal information, such as the content being requested by the device associated with a user, other non-personal information available to input modes services, or publicly available information.

What is claimed is:

1. A computer system configured to communicate with a display generation component, comprising:
   one or more processors; and
   memory storing one or more programs configured to be executed by the one or more processors, the one or more programs including instructions for:
      displaying, via the display generation component, a user interface including an insertion point indicator, wherein displaying the user interface includes:
         in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator, wherein the first visual effect is displayed at least on opposite sides of the insertion point indicator; and
         in accordance with a determination that the first set of criteria is not satisfied:
            forgoing display of the dictation mode indicator; and
            forgoing display of the insertion point indicator concurrently with the first visual effect at the location corresponding to the insertion point indicator.

2. The computer system of claim 1, wherein the first visual effect is an animated effect.

3. The computer system of claim 2, wherein the animated effect includes a pulse.

4. The computer system of claim 1, the one or more programs further including instructions for:
   while the dictation mode is active, detecting, via an audio input device, a respective characteristic of an utterance;
   in response to detecting the respective characteristic of the utterance:
      in accordance with a determination that the respective characteristic of the utterance satisfies a first set of utterance input criteria, displaying the first visual effect with a first visual characteristic; and
      in accordance with a determination that the respective characteristic of the utterance meets a second set of utterance input criteria different from the first set of utterance input criteria, displaying the first visual effect with a second visual characteristic different from the first visual characteristic.

5. The computer system of claim 1, wherein displaying the dictation mode indicator and the insertion point indicator concurrently with the first visual effect includes displaying a transparent overlay.

6. The computer system of claim 1, the one or more programs further including instructions for:

while the dictation mode is active, detecting, via one or more input devices, a request to change a keyboard mode; and in response to detecting the request to change the keyboard mode, displaying, via the display generation component, a keyboard mode indicator that, when selected, initiates a change in a keyboard mode, wherein the keyboard mode is concurrently displayed with the dictation mode indicator.

7. The computer system of claim 1, wherein the user interface includes text, the one or more programs further including instructions for:

while the dictation mode is active, detecting, via an audio input device, an utterance including a request to modify a respective term within the text; and in response to detecting the utterance including the request to modify the respective term within the text:

in accordance with a determination that a set of term criteria is satisfied, wherein the set of term criteria includes a criterion that is satisfied when there are at least two instances of the respective term that occur in the text:

displaying, via the display generation component, a first indication corresponding to a first instance of the respective term; and displaying, via the display generation component, a second indication, different from the first indication, corresponding to a second instance of the respective term.

8. The computer system of claim 7, wherein the first indication includes a first selectable object that, when selected, initiates a process for modifying the first instance of the respective term, and wherein the second indication includes a second selectable object that, when selected, initiates a process for modifying the second instance of the respective term.

9. The computer system of claim 7, wherein the first indication and the second indication are displayed in a first portion of the user interface, the one or more programs further including instructions for:

while displaying the first portion of the user interface, detecting, via one or more input devices, a request to navigate to a second portion of the user interface; and in response to detecting the request to navigate to the second portion of the user interface, displaying, via the display generation component, a third instance of the respective term while not displaying a third indication corresponding to the third instance of the respective term.

10. The computer system of claim 7, wherein the first indication is displayed in a respective portion of the user interface, the one or more programs further including instructions for:

while displaying the respective portion of the user interface, detecting, via one or more input devices, a request to navigate to a portion of the user interface that does not include the first instance of the respective term;

in response to detecting the request to navigate to the portion of the user interface that does not include the first instance, ceasing displaying the first indication;

while displaying the portion of the user interface that does not include the first indication, detecting, via the one or more input devices, a request to navigate back to the respective portion of the user interface; and in response to detecting the request to navigate back to the respective portion of the user interface, displaying the first instance of the respective term while not redisplaying the first indication.

11. The computer system of claim 1, the one or more programs further including instructions for:

while displaying the user interface, detecting a request to modify content; and in response to detecting the request to modify the content:

in accordance with a determination that a set of content criteria is satisfied, wherein the set of content criteria is satisfied includes a criterion that is satisfied when content is being modified in response to detecting a speech input, displaying, via the display generation component, respective content with a third visual characteristic; and in accordance with the determination that the set of content criteria is not satisfied, displaying, via the display generation component, the respective content without the third visual characteristic.

12. The computer system of claim 11, wherein the third visual characteristic includes a transparent graphical element overlaid on the respective content.

13. The computer system of claim 1, wherein the first visual effect at least partially surrounds the insertion point indicator.

14. The computer system of claim 1, the one or more programs further including instructions for:

while the dictation mode is active and while the first visual effect is displayed at a location corresponding to a first location of the insertion point indicator, detecting, via an audio input device, an utterance; and in response to detecting the utterance:

displaying, via the display generation component, the insertion point indicator at an updated location different from the first location;

displaying, via the display generation component, the first visual effect at a location corresponding to the updated location of the insertion point indicator; and displaying, via the display generation component, a second visual effect at the location corresponding to the first location of the insertion point indicator.

15. The computer system of claim 14, the one or more programs further including instructions for:

in response to detecting the utterance, ceasing displaying the dictation mode indicator;

while the first visual effect is displayed at the location corresponding to the updated location of the insertion point indicator, detecting an end of the utterance; and in response to detecting the end of the utterance:

ceasing display of the second visual effect; and displaying, via the display generation component, the dictation mode indicator.

16. A non-transitory computer-readable storage medium storing one or more programs configured to be executed by one or more processors of a computer system that is in communication with a display generation component, the one or more programs including instructions for:

displaying, via the display generation component, a user interface including an insertion point indicator, wherein displaying the user interface includes:

in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator, wherein the first visual effect is displayed at least on opposite sides of the insertion point indicator; and in accordance with a determination that the first set of criteria is not satisfied:

forgoing display of the dictation mode indicator; and forgoing display of the insertion point indicator concurrently with the first visual effect at the location corresponding to the insertion point indicator.

17. The non-transitory computer-readable storage medium of claim 16, wherein the first visual effect is an animated effect.

18. The non-transitory computer-readable storage medium of claim 17, wherein the animated effect includes a pulse.

19. The non-transitory computer-readable storage medium of claim 16, the one or more programs further including instructions for:

while the dictation mode is active, detecting, via an audio input device, a respective characteristic of an utterance;

in response to detecting the respective characteristic of the utterance:

in accordance with a determination that the respective characteristic of the utterance satisfies a first set of utterance input criteria, displaying the first visual effect with a first visual characteristic; and in accordance with a determination that the respective characteristic of the utterance meets a second set of utterance input criteria different from the first set of utterance input criteria, displaying the first visual effect with a second visual characteristic different from the first visual characteristic.

20. The non-transitory computer-readable storage medium of claim 16, wherein displaying the dictation mode indicator and the insertion point indicator concurrently with the first visual effect includes displaying a transparent overlay.

21. The non-transitory computer-readable storage medium of claim 16, the one or more programs further including instructions for:

while the dictation mode is active, detecting, via one or more input devices, a request to change a keyboard mode; and in response to detecting the request to change the keyboard mode, displaying, via the display generation component, a keyboard mode indicator that, when selected, initiates a change in a keyboard mode, wherein the keyboard mode is concurrently displayed with the dictation mode indicator.

22. The non-transitory computer-readable storage medium of claim 16, wherein the user interface includes text, the one or more programs further including instructions for:

while the dictation mode is active, detecting, via an audio input device, an utterance including a request to modify a respective term within the text; and in response to detecting the utterance including the request to modify the respective term within the text:

in accordance with a determination that a set of term criteria is satisfied, wherein the set of term criteria includes a criterion that is satisfied when there are at least two instances of the respective term that occur in the text:

displaying, via the display generation component, a first indication corresponding to a first instance of the respective term; and displaying, via the display generation component, a second indication, different from the first indication, corresponding to a second instance of the respective term.

23. The non-transitory computer-readable storage medium of claim 22, wherein the first indication includes a first selectable object that, when selected, initiates a process for modifying the first instance of the respective term, and wherein the second indication includes a second selectable object that, when selected, initiates a process for modifying the second instance of the respective term.

24. The non-transitory computer-readable storage medium of claim 22, wherein the first indication and the second indication are displayed in a first portion of the user interface, the one or more programs further including instructions for:

while displaying the first portion of the user interface, detecting, via one or more input devices, a request to navigate to a second portion of the user interface; and in response to detecting the request to navigate to the second portion of the user interface, displaying, via the display generation component, a third instance of the respective term while not displaying a third indication corresponding to the third instance of the respective term.

25. The non-transitory computer-readable storage medium of claim 22, wherein the first indication is displayed in a respective portion of the user interface, the one or more programs further including instructions for:

while displaying the respective portion of the user interface, detecting, via one or more input devices, a request to navigate to a portion of the user interface that does not include the first instance of the respective term;

in response to detecting the request to navigate to the portion of the user interface that does not include the first instance, ceasing displaying the first indication;

while displaying the portion of the user interface that does not include the first indication, detecting, via the one or more input devices, a request to navigate back to the respective portion of the user interface; and in response to detecting the request to navigate back to the respective portion of the user interface, displaying the first instance of the respective term while not redisplaying the first indication.

26. The non-transitory computer-readable storage medium of claim 16, the one or more programs further including instructions for:

while displaying the user interface, detecting a request to modify content; and in response to detecting the request to modify the content:

in accordance with a determination that a set of content criteria is satisfied, wherein the set of content criteria is satisfied includes a criterion that is satisfied when content is being modified in response to detecting a speech input, displaying, via the display generation component, respective content with a third visual characteristic; and in accordance with the determination that the set of content criteria is not satisfied, displaying, via the display generation component, the respective content without the third visual characteristic.

27. The non-transitory computer-readable storage medium of claim 26, wherein the third visual characteristic includes a transparent graphical element overlaid on the respective content.

28. The non-transitory computer-readable storage medium of claim 16, wherein the first visual effect at least partially surrounds the insertion point indicator.

29. The non-transitory computer-readable storage medium of claim 16, the one or more programs further including instructions for:

while the dictation mode is active and while the first visual effect is displayed at a location corresponding to a first location of the insertion point indicator, detecting, via an audio input device, an utterance; and in response to detecting the utterance:

displaying, via the display generation component, the insertion point indicator at an updated location different from the first location;

displaying, via the display generation component, the first visual effect at a location corresponding to the updated location of the insertion point indicator; and displaying, via the display generation component, a second visual effect at the location corresponding to the first location of the insertion point indicator.

30. The non-transitory computer-readable storage medium of claim 29, the one or more programs further including instructions for:

in response to detecting the utterance, ceasing displaying the dictation mode indicator;

while the first visual effect is displayed at the location corresponding to the updated location of the insertion point indicator, detecting an end of the utterance; and in response to detecting the end of the utterance:

ceasing display of the second visual effect; and displaying, via the display generation component, the dictation mode indicator.

31. A method, comprising:

at a computer system that is in communication with a display generation component:

displaying, via the display generation component, a user interface including an insertion point indicator, wherein displaying the user interface includes:

in accordance with a determination that a first set of criteria is satisfied, wherein the first set of criteria includes a criterion that is satisfied when a dictation mode is active, displaying a dictation mode indicator and the insertion point indicator concurrently with a first visual effect at a location corresponding to the insertion point indicator, wherein the first visual effect is displayed at least on opposite sides of the insertion point indicator; and in accordance with a determination that the first set of criteria is not satisfied:

forgoing display of the dictation mode indicator; and forgoing display of the insertion point indicator concurrently with the first visual effect at the location corresponding to the insertion point indicator.

32. The method of claim 31, wherein the first visual effect is an animated effect.

33. The method of claim 32, wherein the animated effect includes a pulse.

34. The method of claim 31, further comprising:

while the dictation mode is active, detecting, via an audio input device, a respective characteristic of an utterance;

in response to detecting the respective characteristic of the utterance:

in accordance with a determination that the respective characteristic of the utterance satisfies a first set of utterance input criteria, displaying the first visual effect with a first visual characteristic; and in accordance with a determination that the respective characteristic of the utterance meets a second set of utterance input criteria different from the first set of utterance input criteria, displaying the first visual effect with a second visual characteristic different from the first visual characteristic.

35. The method of claim 31, wherein displaying the dictation mode indicator and the insertion point indicator concurrently with the first visual effect includes displaying a transparent overlay.

36. The method of claim 31, further comprising:

while the dictation mode is active, detecting, via one or more input devices, a request to change a keyboard mode; and in response to detecting the request to change the keyboard mode, displaying, via the display generation component, a keyboard mode indicator that, when selected, initiates a change in a keyboard mode, wherein the keyboard mode is concurrently displayed with the dictation mode indicator.

37. The method of claim 31, wherein the user interface includes text, the method further comprising:

while the dictation mode is active, detecting, via an audio input device, an utterance including a request to modify a respective term within the text; and in response to detecting the utterance including the request to modify the respective term within the text:

in accordance with a determination that a set of term criteria is satisfied, wherein the set of term criteria includes a criterion that is satisfied when there are at least two instances of the respective term that occur in the text:

displaying, via the display generation component, a first indication corresponding to a first instance of the respective term; and displaying, via the display generation component, a second indication, different from the first indication, corresponding to a second instance of the respective term.

38. The method of claim 37, wherein the first indication includes a first selectable object that, when selected, initiates a process for modifying the first instance of the respective term, and wherein the second indication includes a second selectable object that, when selected, initiates a process for modifying the second instance of the respective term.

39. The method of claim 37, wherein the first indication and the second indication are displayed in a first portion of the user interface, the method further comprising:

while displaying the first portion of the user interface, detecting, via one or more input devices, a request to navigate to a second portion of the user interface; and in response to detecting the request to navigate to the second portion of the user interface, displaying, via the display generation component, a third instance of the respective term while not displaying a third indication corresponding to the third instance of the respective term.

40. The method of claim 37, wherein the first indication is displayed in a respective portion of the user interface, the method further comprising:

while displaying the respective portion of the user interface, detecting, via one or more input devices, a request to navigate to a portion of the user interface that does not include the first instance of the respective term;

in response to detecting the request to navigate to the portion of the user interface that does not include the first instance, ceasing displaying the first indication;

while displaying the portion of the user interface that does not include the first indication, detecting, via the one or more input devices, a request to navigate back to the respective portion of the user interface; and in response to detecting the request to navigate back to the respective portion of the user interface, displaying the first instance of the respective term while not redisplaying the first indication.

41. The method of claim 31, further comprising:

while displaying the user interface, detecting a request to modify content; and in response to detecting the request to modify the content:

in accordance with a determination that a set of content criteria is satisfied, wherein the set of content criteria is satisfied includes a criterion that is satisfied when content is being modified in response to detecting a speech input, displaying, via the display generation component, respective content with a third visual characteristic; and in accordance with the determination that the set of content criteria is not satisfied, displaying, via the display generation component, the respective content without the third visual characteristic.

42. The method of claim 41, wherein the third visual characteristic includes a transparent graphical element overlaid on the respective content.

43. The method of claim 31, wherein the first visual effect at least partially surrounds the insertion point indicator.

44. The method of claim 31, further comprising:

while the dictation mode is active and while the first visual effect is displayed at a location corresponding to a first location of the insertion point indicator, detecting, via an audio input device, an utterance; and in response to detecting the utterance:

displaying, via the display generation component, the insertion point indicator at an updated location different from the first location;

displaying, via the display generation component, the first visual effect at a location corresponding to the updated location of the insertion point indicator; and displaying, via the display generation component, a second visual effect at the location corresponding to the first location of the insertion point indicator.

45. The method of claim 44, further comprising:

in response to detecting the utterance, ceasing displaying the dictation mode indicator;

while the first visual effect is displayed at the location corresponding to the updated location of the insertion point indicator, detecting an end of the utterance; and in response to detecting the end of the utterance:

ceasing display of the second visual effect; and displaying, via the display generation component, the dictation mode indicator.

* * * * *